US012183261B2

(12) United States Patent
Baumheinrich et al.

(10) Patent No.: US 12,183,261 B2
(45) **Date of Patent: *Dec. 31, 2024**

(54) VIDEO WALL, DRIVER CIRCUITS, CONTROLS AND METHOD THEREOF

(71) Applicant: OSRAM Opto Semiconductors GmbH, Regensburg (DE)

(72) Inventors: Thorsten Baumheinrich, Altdorf (DE); Christopher Soell, Veitsbronn (DE)

(73) Assignee: OSRAM OPTO SEMICONDUCTORS GMBH, Regensburg (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/426,520

(22) PCT Filed: Jan. 29, 2020

(86) PCT No.: PCT/EP2020/052195

§ 371 (c)(1),
(2) Date: Jul. 28, 2021

(87) PCT Pub. No.: WO2020/157152

PCT Pub. Date: Aug. 6, 2020

(65) Prior Publication Data

US 2022/0101781 A1 Mar. 31, 2022

Related U.S. Application Data

(60) Provisional application No. 62/937,552, filed on Nov. 19, 2019.

(30) Foreign Application Priority Data

Jan. 29, 2019 (DK) ............................ PA201970060
Jan. 29, 2019 (DK) ............................ PA201970061
(Continued)

(51) Int. Cl.
*G09G 3/32* (2016.01)

(52) U.S. Cl.
CPC ......... *G09G 3/32* (2013.01); *G09G 2300/026* (2013.01); *G09G 2300/0857* (2013.01); *G09G 2330/021* (2013.01)

(58) Field of Classification Search
None
See application file for complete search history.

(56) References Cited

U.S. PATENT DOCUMENTS 4,897,614 A * 1/1990 Nishio .................... G05F 3/265 330/288
4,979,002 A 12/1990 Pankove
(Continued)

FOREIGN PATENT DOCUMENTS

DE 19744793 A1 4/1998
DE 19751649 A1 5/1999
(Continued)

OTHER PUBLICATIONS

Buljan et al., "Ultra-Compact Multichannel Freeform Optics for 4xWUXGA OLED Microdisplays," Proc. SPIE 10676, Digital Optics for Immersive Displays, 9 pages (2018).
(Continued)

*Primary Examiner* — Christopher R Lamb
(74) *Attorney, Agent, or Firm* — ArentFox Schiff LLP

(57) ABSTRACT

The invention relates to various driver circuits, controls and arrangements for supplying loads, in particular light-emitting diodes, displays or even video walls.

16 Claims, 32 Drawing Sheets

(30) Foreign Application Priority Data

| | | |
|---|---|---|
| Jan. 31, 2019 | (DE) | 10 2019 102 509.5 |
| Apr. 23, 2019 | (DE) | 10 2019 110 497.1 |
| May 9, 2019 | (DE) | 10 2019 112 124.8 |
| Jun. 7, 2019 | (DE) | 10 2019 115 479.0 |
| Jan. 29, 2020 | (WO) | PCT/EP2020/052191 |

(56) References Cited

U.S. PATENT DOCUMENTS

| | | | | |
|---|---|---|---|---|
| 5,103,271 | A | 4/1992 | Izumiya et al. | |
| 5,526,063 | A | 7/1996 | Joubert et al. | |
| 5,537,171 | A | 7/1996 | Ogino et al. | |
| 5,858,814 | A | 1/1999 | Goossen et al. | |
| 6,048,751 | A | 4/2000 | D'Asaro et al. | |
| 6,316,286 | B1 | 11/2001 | Trezza | |
| 6,527,456 | B1 | 3/2003 | Trezza | |
| 7,067,339 | B2 | 6/2006 | Biwa et al. | |
| 7,254,282 | B2 | 8/2007 | Sathyanarayana | |
| 7,808,005 | B1 | 10/2010 | Fattal et al. | |
| 8,049,233 | B2 | 11/2011 | Fukshima et al. | |
| 8,349,116 | B1 | 1/2013 | Bibl et al. | |
| 8,536,026 | B2 | 9/2013 | Park et al. | |
| 8,586,965 | B2 | 11/2013 | Toyoda et al. | |
| 9,202,988 | B2 | 12/2015 | Yoshida et al. | |
| 9,318,645 | B2 | 4/2016 | Tani et al. | |
| 9,368,683 | B1 | 6/2016 | Meitl et al. | |
| 9,437,782 | B2 | 9/2016 | Bower et al. | |
| 9,444,015 | B2 | 9/2016 | Bower et al. | |
| 9,472,734 | B1 | 10/2016 | Chen et al. | |
| 9,520,537 | B2 | 12/2016 | Bower et al. | |
| 9,698,308 | B2 | 7/2017 | Bower et al. | |
| 9,705,042 | B2 | 7/2017 | Bower et al. | |
| 9,923,013 | B1 | 3/2018 | Yamashita et al. | |
| 9,991,423 | B2 | 6/2018 | Bower et al. | |
| 9,997,102 | B2 | 6/2018 | Rotzoll et al. | |
| 10,069,036 | B2 | 9/2018 | Atanackovic | |
| 10,096,585 | B2 | 10/2018 | Tanaka et al. | |
| 10,147,849 | B2 | 12/2018 | Xu et al. | |
| 10,162,182 | B2 | 12/2018 | Jepsen | |
| 10,177,195 | B2 | 1/2019 | Ahmed et al. | |
| 10,224,460 | B2 | 3/2019 | Bower et al. | |
| 10,395,589 | B1 | 8/2019 | Vahid Far et al. | |
| 10,396,241 | B1 | 8/2019 | Perkins | |
| 10,405,406 | B2 | 9/2019 | Liszt | |
| 10,418,517 | B2 | 9/2019 | Atanackovic | |
| 10,446,719 | B2 | 10/2019 | Bower et al. | |
| 10,466,487 | B2 | 11/2019 | Blum et al. | |
| 10,490,695 | B2 | 11/2019 | Gomez-Iglesias et al. | |
| 10,522,787 | B1 | 12/2019 | Montgomery et al. | |
| 10,622,514 | B1 | 4/2020 | Atanackovic | |
| 10,802,334 | B2 | 10/2020 | Kim et al. | |
| 10,833,225 | B2 | 11/2020 | Bower et al. | |
| 10,903,193 | B2 | 1/2021 | Yamada | |
| 10,963,103 | B1 | 3/2021 | Shahmohammadi | |
| 10,985,143 | B2 | 4/2021 | Bower et al. | |
| 11,156,759 | B2 | 10/2021 | Brick et al. | |
| 11,367,807 | B2 | 6/2022 | Wada et al. | |
| 11,513,275 | B2 | 11/2022 | Brick et al. | |
| 11,538,852 | B2 | 12/2022 | Varghese et al. | |
| 11,552,057 | B2 | 1/2023 | Chae et al. | |
| 2002/0072138 | A1 | 6/2002 | Trezza et al. | |
| 2002/0074553 | A1 | 6/2002 | Starikov et al. | |
| 2003/0013230 | A1 | 1/2003 | Dudoff et al. | |
| 2003/0141507 | A1 | 7/2003 | Krames et al. | |
| 2003/0189125 | A1 | 10/2003 | Trierenberg | |
| 2004/0146219 | A1 | 7/2004 | Sathyanarayana | |
| 2004/0189627 | A1 | 9/2004 | Shirasaki et al. | |
| 2005/0194598 | A1 | 9/2005 | Kim et al. | |
| 2005/0237488 | A1 | 10/2005 | Yamasaki et al. | |
| 2005/0264472 | A1 | 12/2005 | Rast | |
| 2006/0002247 | A1 | 1/2006 | Kim et al. | |
| 2006/0164345 | A1 | 7/2006 | Sarma et al. | |
| 2006/0192225 | A1 | 8/2006 | Chua et al. | |
| 2007/0057249 | A1 | 3/2007 | Kim et al. | |
| 2007/0096127 | A1 | 5/2007 | Pattison et al. | |
| 2008/0061304 | A1 | 3/2008 | Huang et al. | |
| 2008/0160725 | A1 | 7/2008 | Byun et al. | |
| 2009/0045416 | A1 | 2/2009 | Bierhuizen et al. | |
| 2009/0229097 | A1 | 9/2009 | Crandemire | |
| 2009/0291237 | A1 | 11/2009 | Park et al. | |
| 2009/0315054 | A1 | 12/2009 | Kim et al. | |
| 2010/0019693 | A1 * | 1/2010 | Hoogzaad .......... | H05B 45/3725 315/294 |
| 2010/0019697 | A1 | 1/2010 | Korsunsky et al. | |
| 2010/0163894 | A1 | 7/2010 | Jemura et al. | |
| 2010/0252103 | A1 | 10/2010 | Yao et al. | |
| 2010/0317132 | A1 | 12/2010 | Rogers et al. | |
| 2011/0151602 | A1 | 6/2011 | Speier | |
| 2011/0156070 | A1 | 6/2011 | Yoon et al. | |
| 2011/0156616 | A1 | 6/2011 | Anderson et al. | |
| 2011/0204327 | A1 | 8/2011 | Hiruma et al. | |
| 2011/0254043 | A1 | 10/2011 | Negishi et al. | |
| 2011/0263054 | A1 | 10/2011 | Yu et al. | |
| 2012/0126229 | A1 | 5/2012 | Bower | |
| 2012/0223289 | A1 | 9/2012 | Gwo et al. | |
| 2012/0223873 | A1 | 9/2012 | Ohta | |
| 2013/0063413 | A1 | 3/2013 | Miyake | |
| 2013/0063815 | A1 | 3/2013 | Kubota | |
| 2013/0082624 | A1 | 4/2013 | Brassfield et al. | |
| 2013/0119424 | A1 | 5/2013 | Kang et al. | |
| 2013/0154498 | A1 | 6/2013 | Missbach | |
| 2013/0249972 | A1 | 9/2013 | Nishino et al. | |
| 2013/0328066 | A1 | 12/2013 | Sabathil et al. | |
| 2014/0008677 | A1 | 1/2014 | Zhu et al. | |
| 2014/0054619 | A1 | 2/2014 | Tseng et al. | |
| 2014/0111559 | A1 | 4/2014 | Yang et al. | |
| 2014/0131753 | A1 | 5/2014 | Ishida et al. | |
| 2014/0159064 | A1 | 6/2014 | Sakariya et al. | |
| 2014/0319560 | A1 | 10/2014 | Tischler | |
| 2014/0340900 | A1 | 11/2014 | Bathurst et al. | |
| 2015/0103070 | A1 | 4/2015 | In et al. | |
| 2015/0103404 | A1 | 4/2015 | Rudy et al. | |
| 2015/0162560 | A1 | 6/2015 | Chen et al. | |
| 2015/0186099 | A1 | 7/2015 | Hall | |
| 2015/0187991 | A1 | 7/2015 | McGroddy et al. | |
| 2015/0207399 | A1 * | 7/2015 | Li ........................ | H02M 3/156 315/210 |
| 2015/0280086 | A1 | 10/2015 | Jang et al. | |
| 2015/0293302 | A1 | 10/2015 | Czornomaz et al. | |
| 2016/0013167 | A1 | 1/2016 | Sakariya et al. | |
| 2016/0155892 | A1 | 6/2016 | Li et al. | |
| 2016/0172253 | A1 | 6/2016 | Wu et al. | |
| 2016/0240159 | A1 | 8/2016 | Ohkawa et al. | |
| 2016/0315218 | A1 | 10/2016 | Bour et al. | |
| 2016/0341942 | A1 | 11/2016 | Cheon et al. | |
| 2016/0351539 | A1 | 12/2016 | Bower et al. | |
| 2017/0005151 | A1 | 1/2017 | Kim et al. | |
| 2017/0061878 | A1 | 3/2017 | Park et al. | |
| 2017/0082263 | A1 | 3/2017 | Byrnes et al. | |
| 2017/0084775 | A1 | 3/2017 | Li et al. | |
| 2017/0133357 | A1 | 5/2017 | Kuo et al. | |
| 2017/0170360 | A1 | 6/2017 | Bour et al. | |
| 2017/0179097 | A1 | 6/2017 | Zhang et al. | |
| 2017/0179192 | A1 | 6/2017 | Zhang et al. | |
| 2017/0186740 | A1 | 6/2017 | Cok et al. | |
| 2017/0186908 | A1 | 6/2017 | Robin et al. | |
| 2017/0236885 | A1 | 8/2017 | Koshihara et al. | |
| 2017/0254518 | A1 | 9/2017 | Vasylyev | |
| 2017/0270852 | A1 | 9/2017 | Meitl et al. | |
| 2017/0278733 | A1 | 9/2017 | Chang et al. | |
| 2017/0287402 | A1 | 10/2017 | Toyomura et al. | |
| 2017/0352309 | A1 | 12/2017 | Chang et al. | |
| 2017/0352313 | A1 | 12/2017 | Miyake | |
| 2017/0371087 | A1 | 12/2017 | You et al. | |
| 2018/0005562 | A1 | 1/2018 | Lin et al. | |
| 2018/0012540 | A1 | 1/2018 | Hosoyachi et al. | |
| 2018/0024412 | A1 | 1/2018 | Kim et al. | |
| 2018/0033768 | A1 | 2/2018 | Kumar et al. | |
| 2018/0075798 | A1 | 3/2018 | Nho et al. | |
| 2018/0084614 | A1 | 3/2018 | Bower et al. | |
| 2018/0097033 | A1 | 4/2018 | Ahmed et al. | |
| 2018/0114878 | A1 | 4/2018 | Danesh et al. | |
| 2018/0180249 | A1 | 6/2018 | Yamada et al. | |
| 2018/0182298 | A1 | 6/2018 | Jang et al. | |

(56) References Cited

U.S. PATENT DOCUMENTS

| | | | |
|---|---|---|---|
| 2018/0190712 | A1 | 7/2018 | Xu et al. |
| 2018/0211595 | A1 | 7/2018 | Takahashi et al. |
| 2018/0211945 | A1 | 7/2018 | Cok et al. |
| 2018/0219144 | A1 | 8/2018 | Perkins et al. |
| 2018/0226386 | A1 | 8/2018 | Cok |
| 2018/0247586 | A1 | 8/2018 | Vahid Far et al. |
| 2018/0275410 | A1 | 9/2018 | Yeoh et al. |
| 2018/0301433 | A1 | 10/2018 | Robin et al. |
| 2018/0308832 | A1 | 10/2018 | Shin et al. |
| 2018/0323116 | A1 | 11/2018 | Wu et al. |
| 2018/0331258 | A1 | 11/2018 | Halbritter et al. |
| 2018/0342492 | A1 | 11/2018 | Lu |
| 2018/0358339 | A1 | 12/2018 | Iguchi |
| 2018/0358340 | A1 | 12/2018 | Wong et al. |
| 2018/0367769 | A1 | 12/2018 | Greenberg |
| 2019/0012957 | A1 | 1/2019 | Liu et al. |
| 2019/0012965 | A1 | 1/2019 | Fu et al. |
| 2019/0013439 | A1 | 1/2019 | Sung et al. |
| 2019/0044023 | A1 | 2/2019 | Cheng et al. |
| 2019/0058081 | A1 | 2/2019 | Ahmed et al. |
| 2019/0066571 | A1 | 2/2019 | Goward |
| 2019/0066587 | A1 | 2/2019 | Han |
| 2019/0113199 | A1 | 4/2019 | Pellarin et al. |
| 2019/0113727 | A1 | 4/2019 | Tamma |
| 2019/0115508 | A1 | 4/2019 | Lin et al. |
| 2019/0137757 | A1 | 5/2019 | Rousseau |
| 2019/0148606 | A1 | 5/2019 | Racz et al. |
| 2019/0165209 | A1 | 5/2019 | Bonar et al. |
| 2019/0174079 | A1 | 6/2019 | Anthony et al. |
| 2019/0195466 | A1 | 6/2019 | Shimizu et al. |
| 2019/0198716 | A1 | 6/2019 | Gordon et al. |
| 2019/0229097 | A1 | 7/2019 | Takeya et al. |
| 2019/0235234 | A1 | 8/2019 | Hu et al. |
| 2019/0235677 | A1 | 8/2019 | Liu et al. |
| 2019/0258346 | A1 | 8/2019 | Cheng et al. |
| 2019/0273471 | A1* | 9/2019 | Ahmed ............... H03F 3/45183 |
| 2019/0293939 | A1 | 9/2019 | Sluka |
| 2019/0302917 | A1 | 10/2019 | Pan |
| 2019/0305035 | A1 | 10/2019 | Cho et al. |
| 2019/0305036 | A1 | 10/2019 | Ahn et al. |
| 2019/0305185 | A1 | 10/2019 | Lauermann et al. |
| 2019/0335553 | A1 | 10/2019 | Ahmed et al. |
| 2019/0347979 | A1 | 11/2019 | Ahmed |
| 2019/0378674 | A1 | 12/2019 | Chou et al. |
| 2019/0383474 | A1 | 12/2019 | Vasylyev |
| 2019/0386173 | A1 | 12/2019 | Chen et al. |
| 2019/0393198 | A1 | 12/2019 | Takeya |
| 2020/0052033 | A1 | 2/2020 | Iguchi |
| 2020/0105184 | A1 | 4/2020 | Shao et al. |
| 2020/0119233 | A1 | 4/2020 | Dupont |
| 2020/0203580 | A1 | 6/2020 | Marutani |
| 2020/0219855 | A1 | 7/2020 | Chen et al. |
| 2020/0227594 | A1 | 7/2020 | Kuo |
| 2020/0251638 | A1 | 8/2020 | Morris et al. |
| 2020/0342194 | A1 | 10/2020 | Bhat et al. |
| 2020/0343230 | A1 | 10/2020 | Sizov et al. |
| 2020/0356016 | A1 | 11/2020 | Sampayan et al. |
| 2020/0357103 | A1 | 11/2020 | Wippermann et al. |
| 2020/0366067 | A1 | 11/2020 | David et al. |
| 2021/0005775 | A1 | 1/2021 | Chen et al. |
| 2021/0043617 | A1 | 2/2021 | Onuma et al. |
| 2021/0124247 | A1 | 4/2021 | Mezouari et al. |
| 2021/0134624 | A1 | 5/2021 | Zhang |
| 2021/0136966 | A1 | 5/2021 | Jang et al. |
| 2021/0242370 | A1 | 8/2021 | Lee et al. |
| 2021/0272938 | A1 | 9/2021 | Chang et al. |
| 2021/0313497 | A1 | 10/2021 | Pourquier |
| 2021/0325594 | A1 | 10/2021 | Meng et al. |
| 2021/0375833 | A1 | 12/2021 | Lee et al. |
| 2021/0391514 | A1 | 12/2021 | Koyama et al. |
| 2021/0405276 | A1 | 12/2021 | Brick et al. |
| 2022/0051614 | A1 | 2/2022 | Baumheinrich et al. |
| 2022/0093833 | A1 | 3/2022 | Takiguchi et al. |
| 2022/0101781 | A1 | 3/2022 | Baumheinrich et al. |
| 2022/0102583 | A1 | 3/2022 | Baumheinrich et al. |
| 2022/0123046 | A1 | 4/2022 | Behringer et al. |
| 2022/0231193 | A1 | 7/2022 | Boss et al. |
| 2022/0262850 | A1 | 8/2022 | Behringer et al. |
| 2022/0262851 | A1 | 8/2022 | Behringer et al. |
| 2022/0262852 | A1 | 8/2022 | Behringer et al. |
| 2022/0271084 | A1 | 8/2022 | Behringer et al. |
| 2022/0271085 | A1 | 8/2022 | Behringer et al. |
| 2022/0285430 | A1 | 9/2022 | Behringer et al. |
| 2022/0285591 | A1 | 9/2022 | Biebersdorf et al. |
| 2022/0285592 | A1 | 9/2022 | Biebersdorf et al. |
| 2022/0293829 | A1 | 9/2022 | Biebersdorf et al. |
| 2022/0293830 | A1 | 9/2022 | Biebersdorf et al. |
| 2022/0310888 | A1 | 9/2022 | Biebersdorf et al. |
| 2022/0352436 | A1 | 11/2022 | Biebersdorf et al. |
| 2022/0375991 | A1 | 11/2022 | Behringer et al. |

FOREIGN PATENT DOCUMENTS

| | | | |
|---|---|---|---|
| DE | 19911717 | A1 | 9/2000 |
| DE | 10009782 | A1 | 9/2001 |
| DE | 102006045702 | A1 | 4/2008 |
| DE | 102007043877 | A1 | 1/2009 |
| DE | 102007046339 | A1 | 4/2009 |
| DE | 102005063159 | B4 | 5/2009 |
| DE | 102012008833 | A1 | 11/2012 |
| DE | 102013104273 | A1 | 10/2014 |
| DE | 102017106755 | A1 | 10/2018 |
| DE | 102017109083 | A1 | 10/2018 |
| DE | 102018108022 | A1 | 10/2018 |
| DE | 102017114369 | A1 | 1/2019 |
| DE | 102018113363 | A1 | 12/2019 |
| DE | 102018119312 | A1 | 2/2020 |
| DE | 102018119376 | A1 | 2/2020 |
| EP | 0488772 | A1 | 6/1992 |
| EP | 1544660 | A1 | 6/2005 |
| EP | 1553640 | A1 | 7/2005 |
| EP | 1887634 | A2 | 2/2008 |
| EP | 2323185 | A2 | 5/2011 |
| EP | 2396818 | A2 | 12/2011 |
| EP | 2430652 | A1 | 3/2012 |
| EP | 2609624 | | 3/2012 |
| EP | 2477240 | A1 | 7/2012 |
| EP | 2506321 | A1 | 10/2012 |
| EP | 2642537 | A2 | 9/2013 |
| EP | 2685155 | A2 | 1/2014 |
| EP | 2750208 | A2 | 7/2014 |
| EP | 2838130 | A1 | 2/2015 |
| EP | 2924490 | A2 | 9/2015 |
| EP | 2980866 | A1 | 2/2016 |
| EP | 2986082 | A1 | 2/2016 |
| EP | 3010048 | A1 | 4/2016 |
| EP | 3031086 | A1 | 6/2016 |
| EP | 2676528 | B1 | 8/2017 |
| EP | 3226042 | A1 | 10/2017 |
| EP | 2704215 | B1 | 4/2018 |
| EP | 3367374 | A1 | 8/2018 |
| JP | S62269385 | A | 11/1987 |
| JP | 64-002386 | A | 1/1989 |
| JP | H06244457 | A | 9/1994 |
| JP | 2004-228297 | A | 8/2004 |
| JP | 2005244220 | A | 9/2005 |
| JP | 2005346066 | A | 12/2005 |
| JP | 2007264610 | A | 10/2007 |
| JP | 2007324416 | A | 12/2007 |
| JP | 2009141254 | A | 6/2009 |
| JP | 2009186794 | A | 8/2009 |
| JP | 2009260357 | A | 11/2009 |
| JP | 2010272245 | A | 12/2010 |
| JP | 2013048282 | A | 3/2013 |
| JP | 2013110154 | A | 6/2013 |
| JP | 2014019436 | A | 2/2014 |
| JP | 2015099238 | A | 5/2015 |
| JP | 2016208012 | A | 12/2016 |
| JP | 2019009438 | A | 1/2017 |
| JP | 2017152655 | A | 8/2017 |
| JP | 2017-533453 | A | 11/2017 |
| JP | 2017535966 | A | 11/2017 |
| JP | 2018063975 | A | 4/2018 |
| JP | 2018-191006 | A | 11/2018 |

(56) References Cited

FOREIGN PATENT DOCUMENTS

| | | | |
|---|---|---|---|
| JP | 2019029473 | A | 2/2019 |
| KR | 20130052944 | A | 5/2013 |
| WO | 2004084318 | A1 | 9/2004 |
| WO | 2006035212 | A1 | 4/2006 |
| WO | 2007001099 | A1 | 1/2007 |
| WO | 2009082121 | A2 | 7/2009 |
| WO | 2010019594 | A2 | 2/2010 |
| WO | 2010132552 | A1 | 11/2010 |
| WO | 2010149027 | A1 | 12/2010 |
| WO | 2011069747 | A1 | 6/2011 |
| WO | 2011117056 | A1 | 9/2011 |
| WO | 2011160051 | A2 | 12/2011 |
| WO | 2012014857 | A1 | 2/2012 |
| WO | 2013026440 | A2 | 2/2013 |
| WO | 2014047113 | A1 | 3/2014 |
| WO | 2014093063 | A1 | 6/2014 |
| WO | 2015138102 | A1 | 9/2015 |
| WO | 2016025325 | A1 | 2/2016 |
| WO | 2016054092 | A1 | 4/2016 |
| WO | 2016060677 | A1 | 4/2016 |
| WO | 2017087312 | A1 | 5/2017 |
| WO | 2017111827 | A1 | 6/2017 |
| WO | 2017120320 | A1 | 7/2017 |
| WO | 2017120341 | A1 | 7/2017 |
| WO | 2017197576 | A1 | 11/2017 |
| WO | 2018117382 | A1 | 6/2018 |
| WO | 2018123280 | A1 | 7/2018 |
| WO | 2018179540 | A1 | 10/2018 |

OTHER PUBLICATIONS

Fortuna, “Integrated Nanoscale Antenna-LED for On-Chip Optical Communication,” UC Berkeley, 146 pages (2017).

Li et al., “Waveguiding in Vertical Cavity Quantum-Well Structure Defined by Ion Implantation,” J. Lightwave Technol. 16, pp. 1498-1508 (1998).

Ogihara et al., “1200 Dots-Per-Inch Light Emitting Diode Array Fabricated by Solid-Phase Zinc Diffusion,” IEICE Transactions on Electronics, 80;3, pp. 489-497 (1997).

Stevens et al., “Varifocal Technologies Providing Prescription and VAC Mitigation In HMDs Using Alvarez Lenses,” Proc. SPIE 10676, Digital Optics for Immersive Displays, 18 pages (2018).

Tomioka et al., “Selective-Area Growth of III-V Nanowires and Their Applications,” Journal of Materials Research, 26 (17), pp. 2127-2141 (2011).

Waldern et al., “DigiLens Switchable Bragg Grating Waveguide Optics for Augmented Reality Applications,” Proc. SPIE 10676, Digital Optics for Immersive Displays, 17 pages (2018).

Wheelwright et al., “Field of View: Not Just a Number,” Proc. SPIE 10676, Digital Optics for Immersive Displays, 8 pages (2018).

Yu et al., “Hybrid LED Driver for Mulit-Channel Output with High Consistency,” 2015 IEEE 11th International Conference on ASIC (ASICON), Chengdu, 4 pages (2015).

Huang et al., “Metasurface holography: from fundamentals to applications,” Nanophotonics. 7(6), pp. 1169-1190 (2018).

Mingzeng Peng, Yan Zhang, Yudong Liu, Ming Song, Junyi Zhai, Zhong Lin Wang, “Magnetic-Mechanical-Electrical-Optical Coupling Effects in GaN-Based LED/Rare-Earth Terfenol-D Structures,” vol. 26, Issue 39, Oct. 22, 2014, pp. 6767-6772.

Volz et al., “Influence of annealing on the optical and structural properties of dilute N-containing III/V semiconductor heterostructures,” Journal of Crystal Growth, Jan. 2007, vol. 298, pp. 126-130.

* cited by examiner

VIDEO WALL, DRIVER CIRCUITS, CONTROLS AND METHOD THEREOF

This patent application claims the priorities of German applications DE 10 2019 102 509.5 of Jan. 31, 2019, DE 10 2019 110 497.1 of Apr. 23, 2019, DE 10 2019 115 479.0 of Jun. 7, 2019, and DE 10 2019 112 124.8 of May 9, 2019, the disclosure contents of which are hereby incorporated by reference back, and the priorities of Danish applications DK PA201970060 of Jan. 29, 2019, and DK PA201970061 dated Jan. 29, 2019, the disclosure contents of which are hereby incorporated by reference back, and the priority of U.S. application U.S. 62/937,552 dated Nov. 19, 2019, the disclosure contents of which are hereby incorporated by reference back, and the priority of international application PCT/EP2020/052191 dated Jan. 29, 2020, the disclosure of which are hereby incorporated by reference. Additionally, this patent application is related to the following co-pending patent applications: U.S. application Ser. No. 17/038,283, entitled "μ-LED, μ-LED Device, Display and Method for the Same," filed Sep. 30, 2020; U.S. application Ser. No. 17/039,283, entitled "μ-LED, μ-LED Device, Display and Method for the Same," filed Sep. 30, 2020; U.S. application Ser. No. 17/039,097, entitled "μ-LED, μ-LED Device, Display and Method for the Same," filed Sep. 30, 2020; U.S. application Ser. No. 17/039,422, entitled "μ-LED, μ-LED Device, Display and Method for the Same," filed Sep. 30, 2020; U.S. application Ser. No. 17/039,482, entitled "μ-LED, μ-LED Device, Display and Method for the Same," filed Sep. 30, 2020; and U.S. application Ser. No. 17/426,456, entitled "μ-LED, μ-LED Device, Display and Method for the Same," filed Jul. 28, 2021.

BACKGROUND

The ongoing current developments within the Internet of Things and the field of communications has opened the door for various new applications and concepts. For development, service and manufacturing purposes, these concepts and applications offer increased effectiveness and efficiency.

One aspect of new concepts is based on considerations of power or voltage supply and control of various loads. Often, a supply from the main grid is not guaranteed; instead, the power supply is generally provided by energy storage devices such as batteries, accumulators or even supercapacitors.

In the area of displays, the energy supply may not be a major problem at first, but here, too, the lowest possible consumption of the control elements is very important. In addition, even larger displays are becoming thinner and thinner, so that on the one hand less space is available, and on the other hand the waste heat generated has to be removed. This is not only true for displays or video walls, but also for a multitude of other loads.

SUMMARY

In the following summary, various aspects of the control of large to very large displays or screens, in particular video walls, are explained. Control circuits and power supplies of such devices are listed and explained by means of various examples. It should be emphasized at this point that although many aspects in the examples refer to display devices or arrangements, they are not limited to these, but also apply to other loads.

For the considerations of the following solutions, some terms and expressions shall be explained in order to define a common and equal understanding. The listed terms are generally used with this understanding in the present document. In individual cases, however, the interpretation may deviate, in which case the deviation is marked.

"Active Matrix Display" The term "active matrix display" was originally used for liquid crystal displays that contain a matrix of thin-film transistors used to drive LCD pixels. Each individual pixel has a circuit with active components (usually transistors) and power supply connections. At present, however, this technology is not intended to be limited to liquid crystals, but also to drive LEDs, displays or video walls in particular.

"Active Matrix Carrier Substrate". "Active matrix carrier substrate" or "active matrix backplane" refers to a control of light-emitting diodes of a display with thin-film transistor circuits. Here, the circuits can be integrated into the backplane or applied to it. The active matrix carrier substrate has one or more interface contacts that form an electrical connection to an LED display structure. An "active matrix carrier substrate" can thus be part of or carry an active matrix display.

"Augmented Reality (AR).

This is an interactive experience of the real environment, whereby its recording object is located in the real world and is extended by computer-generated perceptible information. Augmented reality is the computer-generated extension of the perception of reality by means of this computer-generated perceptual information. The information can address all human sensory modalities. However, augmented reality is often understood to mean only the visual representation of information, i.e. the addition of computer-generated supplementary information or virtual objects to images or videos by means of superimposition.

"Automotive" Automotive generally refers to the motor vehicle or automotive industry. The term is therefore intended to include this branch, but also all other industries that include displays or generally light displays with very high resolution and LEDs.

"Flip-Flop" A flip-flop, often also called bistable flip-flop, is an electronic circuit that has two stable states of the output signal. The current state depends not only on the currently present input signals, but also on the state that existed before the point in time under consideration. There is no dependence on time, but only on events. Due to the bistability, the toggle stage can store a data quantity of one bit over an unlimited time. In contrast to other memory types, however, the voltage supply must be guaranteed continuously. As the basic building block of sequential circuits, the flip-flop is an indispensable component of digital technology and thus a fundamental component of many electronic circuits from quartz clocks to microprocessors. In particular, as an elementary one-bit memory, it is the basic element of static memory devices for computers. Some embodiments may use various types of flip-flops or other buffer circuits to store state information. Their respective input and their output signals are digital, meaning that they alternate between logical "false" and logical "true". These values are also referred to as "low" 0 and "high" 1.

"Head-up display" The head-up display is a display system or projection device that allows the user to maintain their head position or viewing direction as information is projected into their field of view. The head-up display is an augmented reality system. In some cases, a head-up display has a sensor to determine the direction of gaze or orientation in space.

"Display".

A display or LED array is a matrix with a large number of pixels arranged in defined rows and columns. In terms of functionality, an LED array often forms more of a matrix of LEDs of the same type and color. It therefore provides more of an illuminated surface. The purpose of a display, however, is among other things to transmit information, which often results in the requirement for different colors or an addressable control for each individual pixel or subpixel. A display can be formed of several LED arrays, which are formed together on a backplane or other carrier. However, one LED array can also form a display.

Displays or LED arrays can be formed from the same, i.e. from one workpiece. The LEDs of the LED array can be monolithic. Such displays or LED arrays are referred to as monolithic LED arrays or displays.

Alternatively, both assemblies can be formed by growing LEDs individually on a substrate and then arranging them individually or in groups on a carrier at a desired distance from each other using a so-called pick & place process. Such displays or LED arrays are referred to as non-monolithic. In the case of non-monolithic displays or LED arrays, other distances between individual LEDs are also possible. These distances can be chosen flexibly depending on the application and design. Thus, such displays or LED arrays can also be called pitch-expanded. In pitch-expanded displays or LED arrays, pitch-expanded means that the LEDs are spaced further apart than on the grow-up substrate when transferred to a carrier. In a non-monolithic display or LED array, each individual pixel may include one blue light emitting LED and one green light emitting LED, as well as one red light emitting LED.

In order to use different advantages of monolithic LED arrays and non-monolithic LED arrays in a single module, monolithic LED arrays can be combined with non-monolithic LED arrays in one display. This allows displays with different functions or applications to be realized. Such a display is called a hybrid display "Optoelectronic Device"

An optoelectronic device is a semiconductor body, which, in operation, generates and emits light by recombination of charge carriers. The light generated can range from the infrared to the ultraviolet range, with the wavelength depending on various parameters, including the material system used and the doping. An optoelectronic device is also called a light-emitting diode.

For the purpose of this disclosure, the term optoelectronic component or light-emitting component is used synonymously. An LED is thus a special optoelectronic component in terms of its geometry. In displays or video walls, optoelectronic components are usually monolithic or individual components placed on a matrix.

"Passive Matrix Backplane" or "Passive Matrix Support Substrate".

A passive matrix display is a matrix display in which the individual pixels are controlled passively (without additional electronic components at the individual pixels). A light emitting diode of a display or a video wall can be controlled by means of IC circuits. In contrast, displays with actively controlled pixels via transistors are called active-matrix displays. A passive matrix substrate is a component of a passive matrix display and supports it.

"Pixel"

Pixel, image point, image cell or image element refers to the individual color values of a digital raster graphic as well as the surface elements required to capture or display a color value in an image sensor or screen with raster control. A pixel is thus an addressable element in a display device and comprises at least one light-emitting device. A pixel has a certain size and adjacent pixels are separated by a defined distance or pixel space. In displays or, for example, video walls, three (or, in the case of additional redundancy, several) subpixels of different colors are often combined into one pixel.

"Planar Array"

Planar array is an essentially flat surface. It is often smooth and without prominent structures. Roughness of the surface is usually not desired and has no desired functionality. For example, a planar array is a monolithic planar array with multiple optoelectronic devices.

"Pulse Width Modulation"

Pulse width modulation or PWM is a type of modulation for controlling a component, in this case in particular an LED. Here, the PWM signal controls a switch that is configured to switch a current through the respective LED on and off so that the LED either emits light or does not emit light. With the PWM, the output provides a square wave signal at a fixed frequency f. The relative amount of on-time versus off-time during each period T (=1/f) determines the brightness of the light emitted by the LED. The longer the on-time, the brighter the light.

"Refresh Time"

Refresh time is the time after which a cell of a display or similar must be written to again so that the cell either does not lose the information or is predetermined by external circumstances.

"Subpixel"

A subpixel describes the inner structure of a pixel. As a rule, the term subpixel is associated with a higher resolution than can be expected from a single pixel. A pixel can also consist of several smaller subpixels, each of which emits a single color. The overall color impression of a pixel is created from the mixture of the individual subpixels. Thus, a subpixel is the smallest addressable unit in a display device. Likewise, a subpixel comprises a specific size that is smaller than the size of the pixel to which the subpixel is assigned.

"Virtual Reality"

Virtual reality, or VR for short, is the representation and simultaneous perception of reality and its physical properties in a real-time computer-generated, interactive virtual environment. A virtual reality can completely replace the real environment of an operator with a fully simulated environment.

One point of view relates to the Control of the light-emitting elements in a display or video wall. On the one hand, the control and supply modules used should not be too large. And on the other hand, the most efficient possible use of the available space without a great loss of performance is also important for displays or video walls. The possibility of scaling can reduce the demands on the technology.

Some previous conventional approaches and techniques may be of limited use for various reasons. Accordingly, the following aspects and various concepts address the challenges mentioned.

For example, driver circuits can be suitable for providing frame rates from 60 Hz to 240 Hz. In this context, it is necessary or at least appropriate, especially for video walls and other displays, to achieve a large brightness dynamic range (1:100,000) or 100 dB per individual pixel. This range is necessary to achieve sufficient contrast and brightness of the image under different external light influences in the area of video walls, which are influenced by external light influences, for example. The same applies in the automotive sector.

For monolithic arrays, digitally generated pulse width modulation, PWM, seems to be appropriate. Accordingly, the technology should be scalable with respect to both pixel array size and CMOS technology. A digitally generated PWM also allows calibration to be achieved for non-uniformity of both pixel array and pixel current. A digital nonlinear PWM can process digital codes so that the pulse width can be generated by a nonlinear transfer function of the codes to pulse width. In the following, several concepts are presented, which are suitable for implementation in monolithic displays as well as pixelated arrays with LEDs due to their scalability.

Typically, in a pulse width modulation (PWM) implementation, a standard pixel cell circuit is switched to "off" and "rated current" alternately very quickly. For this purpose, conventional circuits use a so-called 2T1C circuit. However, especially for displays with a high number of rows and columns, the programming frequency is very high in order to achieve a sufficient so-called "refresh rate" of the display. The problem was solved in the past by a second transistor, which however consumes additional space and generates additional waste heat or represents a failure risk. Especially with the video walls shown here or also the space "under" the LEDs, the space may be insufficient. In addition, depending on the wiring (i.e. position of the LED within the current path), a higher inaccuracy and thus intensity fluctuations may occur. Accordingly, in the following a cCurrent driver for LEDs with backgate is presented, which reduces these problems.

According to an aspect described herein, a device is proposed for electronically driving an LED comprising a data signal line, a threshold signal line, and a select signal line. Further provided is an LED electrically connected in series with a dual-gate transistor and together therewith between first and second potential terminals. A first control gate of the dual gate transistor is connected to the threshold line. The device also includes a select latch circuit comprising a charge latch connected to a second control gate of the dual gate transistor and to a current line contact of the dual gate transistor, and a control transistor comprising a control terminal connected to the select signal line.

Instead of an additional transistor for pulse width modulation (PWM), the additional control gate of a dual-gate transistor can now be modulated with a PWM signal as an existing driver transistor.

According to a second aspect, a device is also proposed wherein an LED and a dual-gate transistor are arranged in series in a current path. An analog data drive signal is applied to one side of the dual gate transistor via a select hold circuit to color control the LED using the select signal. A coupled pulse width modulation signal to the other side of the dual gate transistor is used to control the brightness of the LED.

Advantageously, a back gate transistor is used as the dual gate transistor.

The modulation of the back gate of the driver transistor can also be used as an actuator for the current control path to feed back a feedback signal, for example the forward voltage of the light emitting diode, and thus achieve a current feedback to a light emitting diode temperature drift. By modulating the voltage at the back gate of the driver transistor, a light-emitting diode current can be pulse-width modulated easily and, most importantly, in a space-saving manner, especially in the TFT (Thin Film Transistor) pixel cell. For RGB cells, this results in a saving of three power transistors.

A weak modulation of the voltage at the back gate can be used to make the current in the LED, essentially independent of the LED temperature. This is particularly useful when using an NMOS cell with the LED on the low side of the driver transistor, because of the common cathode. Such cells have intrinsically poor current accuracy, so by means of the idea of the present invention such cells can be significantly improved.

On the one hand, this allows pulse width modulation via the backgate of the main transistor instead of via an additional transistor in addition to the main transistor. On the other hand, the use of a backgate transistor in displays or video walls allows temperature stabilization by operating the back-gate "not digitally" with pulse width modulation, but with an analog voltage. This is derived from the forward voltage Vf of the light emitting diode, which is used as a feedback loop of a control system. Such a temperature stabilization improves the color accuracy and stability of the LED.

In some aspects, the dual gate transistor can include a back gate transistor where the back gate forms the first control gate. This is a compact embodiment. The dual-gate transistor can be formed as a thin-film (thin film) transistor having two opposing control gates. This allows reliable and compact fabrication. The first control gate of the dual-gate transistor can be designed to set a threshold voltage. In this way, modulation can be performed. Alternatively, a switching signal (PWM signal) can be applied to the first control gate during operation. This allows simple brightness control.

In further aspects, the LED may have its first terminal connected to the first potential terminal, and the dual-gate transistor may have its current conducting contacts disposed between a second terminal of the LED and the second potential terminal. The select latch circuit may have the charge latch connected to the second control gate of the dual-gate transistor and to the second terminal of the LED. This embodiment can be easily fabricated using NMOS technology.

In further aspects, the LED may be connected with its first terminal to a second current conducting contact of the dual-gate transistor and with its second terminal to the second potential terminal. The dual-gate transistor has its current conducting contacts connected between a first terminal of the LED and the first potential terminal. The charge storage of the selection hold circuit is connected to the second control gate of the dual-gate transistor as well as to the first potential terminal. As a result, the forward voltage of the light-emitting diode does not affect a gate-source voltage of the dual-gate transistor.

Another aspect deals with the realization in P-Mos technology. There, the LED is connected with its first terminal to the first potential terminal and the dual-gate transistor is connected with its current line contacts between a second terminal of the LED and the second potential terminal. The selection hold circuit can be connected to the charge storage with the second control gate of the dual-gate transistor as well as to the second potential terminal.

In a further aspect, the selection hold circuit comprises a further control transistor connected in parallel with the LED, the control terminal of which may be connected to the selection signal line.

According to a further embodiment, the charge storage may be connected to the second control gate of the dual-gate transistor as well as to the first potential terminal, and further comprise a temperature compensation circuit with a negative feedback based on the detection of a forward voltage by the LED, wherein the temperature compensation circuit may form the threshold line on the output side. This allows an additional weak modulation to be induced on the backgate transistor.

In some aspects, the temperature compensation circuit may include a control path that may be arranged in parallel with the dual gate transistor and may include two paths connected in series. This is a simple embodiment. According to a further embodiment, from a node between the two controlled paths provided by means of a third control transistor and a fourth control transistor, the threshold line may be connected to the first control gate of the dual-gate transistor. By means of the node, the back gate can be effectively controlled. According to a further embodiment, the control terminal of the fourth control transistor may be connected to the second potential terminal. In this way, the gate of the transistor is stably set to the high potential of the second potential terminal.

In another aspect, the temperature compensation circuit may include a second charge storage that may be connected to a control terminal of one of the two path providing control transistors and to the first potential terminal. This can be used to buffer the gate voltage of the third transistor.

A second data signal line is coupled to the second charge memory and the third control transistor. A signal on this line is used to program a negative feedback factor. The second data signal line can thus also be used for fine adjustment of the temperature compensation. Depending on the application, this fine adjustment can be switched on or off by means of a further control transistor.

According to another advantageous embodiment, the control terminal of the third control transistor in the temperature compensation circuit, may be connected to the second potential terminal. In this way, the gate voltage of the third control transistor is advantageously determined clearly and stably.

According to a further advantageous embodiment, a fifth control transistor can be connected in parallel to the LED, to whose control terminal a switching signal (PWM signal) is applied during operation. In this way, the light emitting diode can be switched on and off directly and without charge storage, in particular by means of pulse width modulation. The dual-gate transistor can then operate as a temperature-stabilized current source.

Also a Control for one brightness setting or a dimming of pixels is of importance. Such dimming can be relevant for video walls, for example, in order to be able to switch between a day and night view. Basically, such dimming can be useful and advantageous if contrasts have to be adjusted or if external light makes it necessary to regulate the brightness of a display or video wall in order not to dazzle a user or to be able to show information safely.

For the aforementioned reasons, various technical solutions are known for controlling lighting units with LEDs, in particular to operate displays or video walls at different brightness levels. For example, control circuits are known for controlling matrix displays, with which the individual pixels of the rows formed by several rows and columns are specifically controlled. Likewise, control circuits are known with which the LED current is specifically reduced or dimmed. This so-called current dimming is used, for example, in displays with liquid crystal displays or OLEDs.

Due to the limited space available behind the LED, solutions with a large number of components are difficult to implement.

This can make the circuits very complex in some cases. Based on this, the following aspects are intended to build the control of a lighting unit with LEDs further for varying the brightness in such a way that a comparatively simple, accurate and reliable change in the brightness of the light emitted by the LEDs is achieved. In particular, the above-mentioned dimming or operation in different brightness and contrast levels is to be made possible.

Thus, a control circuit for changing the brightness of a lighting unit is proposed, which has a voltage source for supplying the lighting unit with electrical energy and at least one energy storage. The latter sets a current for the illuminants of the lighting unit. Further, a control element is provided which temporarily varies a voltage of a voltage signal generated by the voltage source based on which an LED current flowing through the at least one LED is adjustable. According to the proposed principle, the control circuit has been further configured such that the control element is arranged to operate the lighting unit at at least two different brightness levels by transmitting, during a period, i.e. in a repeating period, a first and a second voltage signal having different voltages to the lighting unit and adjusting the brightness level depending on the voltage of the first voltage signal.

It is thus essential for this concept that a pulsed voltage signal is applied to the lighting unit, with a current flowing through the at least one LED of the lighting unit as a function of the voltage signal, which causes the LED to light up. During a period, a first voltage signal, in particular a switch-on voltage signal, and a second voltage signal, in particular a switch-off voltage signal, are provided in an advantageous manner, the at least one LED provided in the lighting unit being supplied with a current proportional to the voltage or having a current proportional to the voltage flowing through it during the application of the first voltage signal. In principle, it is irrelevant here whether the lighting unit has one or a plurality of LEDs. In one aspect, the switching element has a transistor via which the at least one LED of the lighting unit is supplied with electrical energy as a function of the respective voltage signal and through which an LED current flows so that it preferably emits visible light.

According to the proposed concept, the lighting unit is controlled in such a way that, within a period, a first voltage signal is transmitted to the lighting unit in a first phase of the period and then a second voltage signal is transmitted to the lighting unit in a second phase of the period, with a current flow through the at least one LED of the lighting unit being effected as a function of the voltage of the respective voltage signal. Of importance here is that the voltage or the voltage value of the second voltage signal is significantly lower than the voltage of the first voltage signal. Preferably, the voltage of the second voltage signal is at least almost zero.

The concept presented allows different brightness ranges to be set depending on the application, whereby the brightness can be dimmed in each range. This makes it possible, for example, to react to changes in lighting conditions for video walls or in the automotive sector without requiring a great deal of additional circuitry.

In the first phase of the period in which the first voltage signal is transmitted to the light unit, the energy storage of the light unit is charged. At the same time, a current proportional to the voltage of the voltage signal flows through the LED, which then emits visible light. While in the second phase of the period the second voltage signal is transmitted to the light unit, the potential in the energy storage, preferably a capacitor, is maintained, so that until the beginning of the following period a current caused by this flows through the LED, which thus continues to emit light. Although the magnitude of the current flowing through the LED during the first phase of the period should theoretically be equal to the magnitude of the current flowing through the LED during the second phase of the period, in practice this is not the case. This is due to the fact that the control circuit usually has a second capacitance in addition to the capacitance of the energy storage device, in particular a capacitor, and in this way a capacitive voltage divider is created so that the voltage across the energy storage device during the second phase of the period is lowered relative to the voltage during the first phase of the period. Such a second capacitance is provided, for example, by the capacitance of the transistor, in particular the so-called gate-source capacitance.

In this context, it is quite significant that the size of the current flowing through the LED during the first phase of the period in which the first voltage signal is transmitted to the lighting unit is different from the size of the current flowing through the LED during the second phase of the period in which the second voltage signal is transmitted to the lighting unit, namely smaller. However, an observer will not recognize this difference, which results in a difference in the maximum brightness of the LED during a period, but will only perceive the light output averaged over the period.

In order to use this effect in a suitable way for the control of lighting units, which are used for example in displays, it is advantageous if the first and the second voltage signal are repeated with a frequency of 60 Hz, which corresponds to the usual refresh rate of displays. This means that a first and a second voltage signal are transmitted to the lighting unit sixty times each within one second, with an LED current flowing through the at least one LED of the lighting unit depending on the voltage of the respective voltage signal.

In further aspects, it is provided that while the second voltage signal is being transmitted to the lighting unit, the LED is supplied with the electrical energy required to excite a light emission from an energy storage device configured as a capacitor. Since the voltage of the capacitor is lowered with respect to the first phase of the period, the LED in this operating state has a current flowing through it with a lower size compared to the first phase of the period, so that the LED is less bright.

Furthermore, it is conceivable in this way that the control element is arranged to generate the first voltage signal with a duty cycle of 0.0025 to 0.003, where the duty cycle corresponds to the ratio of the duration of the first voltage signal to the duration of the period. Thus, the duty cycle indicates the ratio of the duration of the first voltage signal to the period duration. With a repetition frequency for the first and the second voltage signal of 60 Hz, this means that the control element according to this embodiment of the invention is set up such that a period within which the first and the second voltage signal are transmitted to the lighting unit is 0.0166 s or 16.6 ms long. In a preferred further embodiment, the first voltage signal is transmitted to the lighting unit for a period of no more than 0.050 ms, which corresponds to a duty cycle of about 0.003 or 1:333. In this case, the second voltage signal is transmitted to the light unit for a period of 16.6 ms. The duty cycle with respect to this signal is therefore approximately equal to 1.

Since the brightness of an LED perceived by an observer depends on the average brightness or light output emitted during a period, a current flow in the LED during the second phase of a period and thus the proportion of light emitted by the at least one LED in the second, comparatively long phase of the period has a significant, disproportionately strong influence on the average light output of an LED of the lighting unit.

According to some aspects, it is conceivable that the control circuit is arranged to operate the lighting unit at a first, darker brightness level by setting the voltage of the first voltage signal to a voltage value lying within a first voltage interval and to operate the lighting unit at least at a second, brighter brightness level by setting the voltage of the first voltage signal to a voltage value lying within at least a second voltage interval whose voltages are higher than those of the first voltage interval. According to this embodiment, two voltage intervals or voltage ranges are thus provided for driving a lighting unit, each of which has different voltages with which the first voltage signal is generated and which are at different voltage levels. Depending on the level of the voltage of the first voltage signal, the lighting unit is thus operated either at a first, darker brightness level or at a second, brighter brightness level. If the lighting unit is to be operated at the brighter brightness level, the lighting unit is controlled on the basis of a first voltage signal whose voltage lies in the second voltage interval and thus in that voltage interval which comprises the higher value.

In another aspect, the control element is arranged to operate the lighting unit at the same brightness level when the voltage of the first voltage signal is selectively varied within one of the at least two defined voltage intervals. This means that, in an advantageous manner, the first voltage signal, in particular its voltage, is varied between two successive periods only to such an extent that the corresponding voltage is still within the same voltage interval and it is ensured that the lighting unit is still operated at the same brightness level despite a slight change in brightness. It is thus possible to dim the lighting unit, in particular the at least one LED provided within the lighting unit, at at least two different brightness levels, i.e. to provide an at least largely stepless range at at least two different brightness levels in each case, in which the brightness of the at least one LED of a lighting unit is specifically changed.

According to a further embodiment, it is provided that the first voltage interval or the first voltage range has voltage values at least in the range of 1.3 V to 3.0 V. Furthermore, it is preferably provided that the second voltage interval or the second voltage range has voltage values at least in the range of 4.0 V to 10.0 V. In this way, two ranges at different brightness levels are realized, within which the brightness of the light unit can again be steplessly changed or dimmed in a targeted manner.

With respect to the previously described embodiment, again the idea may be considered that—once a comparatively small first voltage signal is applied to the lighting unit—the total current flowing through the LED during a period is largely determined by the current flowing through the LED during the first phase of the period in which the first voltage signal is applied to the lighting unit. In this case, the lighting unit is operated at a comparatively low brightness and the emission of light due to a current flow through the LED caused by the second voltage signal applied to the lighting unit during the second phase of the period can be neglected in this operating condition.

If, on the other hand, a first voltage signal with a comparatively high voltage is transmitted to the lighting unit, the total current flowing through the LED during one period is largely determined by the current flowing through the LED during the second phase, i.e. while the second voltage signal is applied to the lighting unit. In this case, the lighting unit is operated at a high brightness level and can be dimmed in this range by selectively varying the first voltage signal.

The presented control circuit can be used, in a display, a monitor or for example in a video wall for image generation. These can be part of a larger screen or display device, for example in a motor vehicle. Also a realization in AR or VR glasses or another device is conceivable. Again, it is essential that a control is used that enables the operation of a display of a monitor or, for example, a video wall at at least two different brightness levels.

In addition to a specially designed control circuit, some aspects also relate to a method for selectively changing the brightness of a lighting unit, in which a voltage source supplies the lighting unit with electrical energy and at least one LED as a luminaire of the lighting unit is at least temporarily supplied with electrical energy from an energy storage device of the lighting unit. Furthermore, in this method, a voltage signal is transmitted to the lighting unit at least temporarily and the LED current flowing through the at least one LED is adjusted on the basis of the voltage signal.

The method is characterized in that the lighting unit is operated at at least two different brightness levels by transmitting a first and a second voltage signal, which have different voltages, to the lighting unit during a period and adjusting the brightness level as a function of the voltage of the first voltage signal. In turn, it is essential to the invention that the brightness of an LED, which is significantly determined by the total current flowing through at least one LED during a period, can be selectively changed by transmitting a first voltage signal, which is transmitted to the lighting unit in a first phase of the period. To drive the lighting unit, a first voltage signal is applied to the lighting unit in a first phase of the period such that initially, while the first voltage signal is applied to the lighting unit, the energy storage of the lighting unit is charged and the at least one LED of the lighting unit has current flowing through it proportional to the voltage of the voltage signal. In a second phase of the period, a second voltage signal with a significantly lowered voltage compared to the voltage of the first voltage signal, which is preferably close to zero, is transmitted to the lighting unit. This first lowers the potential of the energy storage device, in particular a capacitor, which also correspondingly lowers the strength of the current flowing through the LED.

Compared to the first phase of the period, the LED thus shines less brightly in the second phase, but this over a comparatively long period of time. Here, depending on the level of the voltage value of the first voltage signal, the lighting unit can be operated at a high brightness level with comparatively high average light output or at a low brightness level with comparatively low average light output. In this context, it should be taken into account that in the case of a first voltage signal with a comparatively low voltage, the influence of the first phase of the period on the average light output of the LED is comparatively high, while in the case of a first voltage signal with a high voltage value, the second phase of the period in which the second voltage signal is applied to the lighting unit is of decisive importance for the average light output of the LED.

In this way, it is provided that the LED of the light unit, while the second voltage signal is applied to the light unit, is supplied with electrical energy from an energy storage device designed as a capacitor. In addition, it is advantageous if the lighting unit is operated at least temporarily at a first, darker brightness level by setting the voltage of the first voltage signal to a voltage value lying within a first voltage interval and the lighting unit is operated at least temporarily at at least a second, brighter brightness level by setting the voltage of the first voltage signal to a voltage value lying within at least a second voltage interval whose voltages are higher than those of the first voltage interval.

In one embodiment, it is provided that the voltage of the first voltage signal is varied between two successive periods without changing the brightness level at which the light unit is operated. Thus, a variation of the average light output of an LED occurs while the LED is operated at a constant brightness level. The voltage of the first voltage signal is thus varied between two successive periods within the voltage interval or voltage range provided for the corresponding brightness level.

Besides the question of a temperature stability and a drift of an input voltage or a current through the diode due to process fluctuations, the used pulse modulation is also a point of view to be considered. In current displays the light emitting diodes are usually operated in pulse width modulation, i.e. switched on and off in rapid succession for contrast and brightness adjustment. The frequency is several 100 kHz up to the MHz range. The switching processes have a feedback effect on the current source. Thus the precision as well as the stability of the current source can suffer. For control loops within the current source, the switching processes lead to spikes or other behavior, which can bring the control loop out of its control range.

Following these considerations, a regulated current source for LEDs which controls a current source in such a way that its output current remains in its control state and follows a setpoint value even during PWM modulation and in particular during switching operations. The current source and in particular the feedback loop is suitable for all types of loads, in particular but not limited to those disclosed in this application.

For this purpose, the output current or a signal derived from it is fed to the control loop, which compares it with the setpoint. If the current source is now switched off or operated in On/Off mode (intermittent operation), a substitute signal is fed to the control loop while the output current is switched off. The substitute signal keeps the control loop in its modulation range. It is convenient that the substitute signal corresponds to, or is similar to, an expected output current or the signal derived therefrom. Overall, continuous control in the modulation range is achieved in this way, independent of the switching state of a current source. The precision and stability of the supply circuit is maintained.

In one embodiment, a supply circuit is proposed that includes an error correction detector having a reference signal input, an error signal input, and a correction signal output. Furthermore, a controllable current source with a current output and a control signal terminal is provided. The control signal terminal is connected to the correction signal output to form a control loop for the controllable current source. In other words, the error correction detector controls the output current of the current source within certain limits. The current source is thus designed to provide a current at the current output in response to a signal at the control signal terminal.

According to the proposed principle, the supply circuit comprises a substitute source with an output, which is designed to provide a backup signal. Finally, a switching device is arranged in operative connection with the controllable current source and the error correction detector, so that the switching device, in dependence on a switching signal, supplies to the error signal input either a signal derived from the current at the current output or the substitute signal with additional separation of the current output of the current source. In other words, the switching device is coupled to the controllable current source and the error correction detector and is adapted to supply either a signal derived from the current at the current output or the substitute signal to the error signal input. In addition, the switching device is adapted to de-energize the current output in the latter case.

This provides an arrangement that keeps the control loop in a modulation range independent of the operating state of the current source. The current source can thus be operated in a PWM or other intermittent mode in addition to being controlled by the control loop and the error correction detector.

It is convenient if the substitute signal essentially corresponds to the signal derived from the current signal. In this way, the control loop and especially the error correction detector are given a signal that hardly differs from that of the current source, so that the control and the modulation remain intact.

In one aspect, the controllable current source comprises a current mirror having a switchable output branch. This is connected to or forms the current output. The output branch may comprise one or more output transistors whose control terminals or gates are connected to a control terminal of a current mirror transistor arranged on the input side.

In a further aspect, the output transistor of the output branch, has its control terminal connected to the switching device. The switching device is configured to connect to a fixed potential for opening the output transistor, or to connect the control terminal of the current mirror transistor arranged on the input side to a fixed potential, depending on the switching signal of the output transistor. When the control terminal is at the fixed potential, the output transistor opens or blocks, i.e. it no longer conducts current and the load and the output of the supply circuit are switched currentless.

In another aspect, the switching device is arranged in the output branch and adapted to isolate the current output or output transistors from the load. In this aspect, the tap for the error signal input of the error correction detector is arranged between the switching device and the load.

In another aspect, the controllable current source comprises an input branch. A reference current signal can be applied to the input branch so that the current source provides an output current dependent thereon. The input branch of the controllable current source further comprises a node, which is connected to the reference signal input of the error correction detector. Thus, for example, the reference current supplied to the current source for deriving the output current can also serve as a reference signal for the error correction detector.

The controllable current source may further comprise a current mirror, wherein the control signal terminal is connected to the control terminal of an output transistor of the current mirror. As a result, a current through the output transistor can be varied with a control signal to provide regulation. A coupling of the control terminal of the output transistor of the current mirror with the current mirror transistor of the current mirror is performed by a capacitor in positive coupling. The capacitor is used for frequency compensation and thus improves the stability of the control.

Another aspect relates to the differential amplifier. This may comprise a differential amplifier whose two branches are connected together to a supply potential via a current mirror. Optionally, the two branches of the differential amplifier may each comprise an input transistor, which have different geometrical parameters. Together with the current mirror, different fixed factors between reference and error signal can thus be taken into account.

In another aspect, the substitute source comprises a voltage generation element coupled to the output such that the substitute signal is substantially the same as the signal derived from the current signal. This allows the substitute signal to simulate the current flowing through the load during regular operation, thereby maintaining the control loop in the modulating region.

In one aspect, the substitute source may comprise a series connection of a current providing element and a voltage providing element, with the output disposed between the two elements. Similarly, in another aspect, the substitute source may comprise a transistor having a control terminal connected to the control terminal of the current mirror transistor of the current source.

Another aspect relates to the switching device comprising one or more transmission gates. The supply circuit may comprise a reference current mirror configured to supply a defined current on the input side to the error correction detector and to the current source on the output side.

Another aspect relates to the use of a supply circuit for a power supply of an LED. This is operated by the supply circuit in an on/off mode. That is, the LED is operated by a signal modulating the power supply pulse-width. This operation is not unusual for optoelectronic devices, yet the supply circuit generates a stable and precise output current during this pulse-width modulated operation.

Another aspect relates to a method for supplying power to an LED. Here, a supply current is detected by the load. This may be done by detecting the current through the LED. Alternatively, a signal may be derived from the current that has a known relationship to the current through the load. The supply current or the signal derived from it is compared with a reference signal and a correction signal is generated from this comparison. With the aid of the correction signal, the supply current through the load is controlled to a setpoint value, if necessary.

It is now provided that the load is switched off at certain intervals, i.e. disconnected from the supply current. In such a case, instead of the signal derived from the supply current, a substitute signal is generated and used for the comparison step. In other words, instead of the supply current or a signal derived from it, the substitute signal is compared with the reference signal and a correction signal is generated from this comparison. This makes the control independent of whether the load is supplied with current or not for the first time. The substitute signal can essentially correspond to a supply current through the load or a signal derived from it.

Another aspect lies in a realization of a Driver circuit with low own power consumption, but which can still drive a variety of optoelectronic elements and LEDs in particular.

In a first aspect of the present application, a driver circuit for driving or controlling a plurality of optoelectronic elements is provided. The optoelectronic elements are configured as LEDs and are arranged in an array having rows and columns, forming, for example, a video wall. Each LED may represent one pixel. Alternatively, if each pixel includes a plurality of subpixels, for example three, each LED may form one of the subpixels.

The driver circuit includes a plurality of first memory cells, each of the first memory cells being associated with a respective one of the LEDs. Further, each memory cell includes two inputs, referred to as a set input and a reset input, and an output. The first memory cells may be latches and may be configured as 1-bit memories. Each first memory cell may have two different states at the output, a first state and a second state, where the first state may be a high state and the second state may be a low state.

A set signal received from one of the first memory cells at the set input triggers the first memory cell at the output to the first state. The first memory cell holds the first state until reset to the second state by a reset signal received at the reset input. The output, in particular the output signal provided at the output, of each first memory cell is configured to control or drive a respective one of the LEDs. In particular, the output signal determines whether the LED is on and emitting light or is off and not emitting light.

For manufacturing the driver circuit and also the first memory cells and their associated circuits, CMOS technology, among others, would be particularly suitable. The driver circuit according to the first aspect is a digital driver circuit and requires lower power and less area compared to conventional driver circuits. In addition, the driver circuit according to the first aspect provides better linearity. Each first memory cell may provide a pulse width modulation, PWM, signal at its output.

In one embodiment, each first memory cell comprises two cross-coupled NOR gates or two cross-coupled NAND gates. Each of the NOR or NAND gates comprises two inputs and one output. The output of each of the NOR or NAND gates is coupled to one of the inputs of the other NOR or NAND gate. The other input of one of the NOR or NAND gates receives the set signal, and the other input of the other of the NOR or NAND gates receives the reset signal.

In an alternative embodiment, each first memory cell comprises an N-type metal oxide semiconductor transistor, NMOS transistor, and a P-type metal oxide semiconductor transistor, PMOS transistor, connected in series, meaning that the channels of the two transistors are connected in series. Also, an input of an inverter is connected between the NMOS transistor and the PMOS transistor, and an output of the inverter is connected to the gates of the NMOS and PMOS transistors. The driver circuit may include a plurality of loadable counters, each configured to activate a set signal to turn on a current through the respective LED when data, such as a pulse width value, is loaded into the respective counter. The counter counts until the current value reaches the loaded data value. Then the counter activates a reset signal to turn off the current through the respective LED.

If an array of LEDs arranges them into N columns of pixels, the driver circuit may include N counters that generate PWM signals for N columns of pixels simultaneously per a selected row. The driver circuit may further comprise a single common counter configured to generate a common or global dimming signal for the plurality of LEDs.

To pattern out dark pixels, the driver circuitry may include a plurality of second memory cells. Each second memory cell may be coupled to a respective one of the first memory cells and configured to override an output signal of the respective first memory cell when needed, such that the respective LED remains off. In other words, the second memory cells prevent the respective first memory cells from turning on the respective LEDs when those optoelectronic elements display dark pixels during a frame.

An optoelectronic device or display or video wall according to a second aspect of the present application comprises a plurality of LEDs and a driver circuit for driving the plurality of LEDs according to the first aspect as described above. The LEDs may be arranged in an array and may form a display or a portion of a display. Each of the LEDs may form a pixel of the array. Alternatively, each LED may form a sub-pixel. For example, in an RGB pixel array, a pixel may include three optoelectronic elements or LEDs that emit red, green, and blue light, respectively. Alternatively, converter materials may be provided such that at least two of the three LEDs emit light of the same color, which is converted by the converter material.

The LEDs may be arranged via an integrated circuit, IC, which is located below the LED, among other things. The circuit may be formed in another material system.

In a third aspect, a method of operating an optoelectronic device or display or video wall according to the second aspect is provided. At the beginning of a frame, a global reset is performed and the pixel stream is turned off so that all optoelectronic elements are turned off. Next, dark pixel loading is performed line by line. Thus, the optoelectronic elements that are dark during the frame are controlled using the second memory cells. Next, line-by-line content-dependent PWM, such as grayscale PWM, is performed. Thus, the current through the optoelectronic elements is controlled by means of the first memory cells.

In addition, after the global reset at the beginning of a frame, the pixel current can remain off until the start of a common or global dimming. The common dimming of the optoelectronic elements can be performed before the current through the optoelectronic elements is controlled using the first memory cells. The global dimming data can be combined with the grayscale data in the video/image signal processor IC or by the LED driver IC, so that no separate global dimming pulse is needed and then only the grayscale data is updated line by line. The optoelectronic device according to the second aspect and the method according to the third aspect may comprise the embodiments disclosed above in connection with the driver circuit according to the first aspect.

A novel concept for driving loads, in particular light-emitting diodes, e.g. for pixels, is based on a analog ramp for light control. For a control circuit for a display matrix such as a video wall, which includes a plurality of optoelectronic devices arranged in rows and columns, pulse width modulation can be used to adjust the on/off behavior of each pixel. Although the principle seems to be similar to conventional pulse width modulation schemes, the implementation is different.

A control circuit for a matrix display, in particular an LED matrix display such as a video wall includes a row select input for a row select signal, a column data input for a data signal, a ramp signal input for a ramp signal, and a trigger input for a trigger signal. For purposes of explanation, a ramp signal is a signal that varies over time from a first value to a second value. Usually, a ramp signal is periodic. The circuit includes a column data buffer configured to buffer the data signal in response to the row select signal. In some variations, the level of the column data signal may correspond to the brightness of the light emitting device. A pulse generator is coupled to the column data buffer and the ramp signal input and configured to provide a buffered output signal to control the on/off ratio of at least one of the plurality of light emitting devices in response to the trigger signal, the data signal, and the ramp signal.

The proposed principle implements an analog pulse generator. Since the ramp signal can be multiplexed spatially and temporally, artifacts caused by activation of different pixels can be suppressed. Furthermore, temporal multiplexing results in different switching behaviors of the pixels when the ramp signal is used. That is, the LED associated with the pixels is switched at different times, which causes a more uniform power distribution and prevents current peaks.

In some embodiments, the pulse generator includes a comparator device to compare the buffered data signal to the ramp signal. The result is provided to an output buffer coupled to an output of the comparator and the trigger input. The column data buffer may act as an input buffer in such embodiments. Together with the output buffer of the pulse generator, double buffering is implemented, allowing the circuit to be implemented in displays that use a longer duty cycle, reducing refresh rates and the like. In general, this concept will further reduce power consumption, which is preferred in extended reality applications.

The output buffer may include a single memory stage, such as a flip-flop. In some variants, the buffer may include an RS flip-flop whose inputs are coupled to the output of the comparator device and correspondingly to the trigger input. In this regard, it should be noted that depending on the current implementation and the sign of the corresponding data and trigger signals (positive or negative), inverted inputs of the corresponding flip-flops may also be used. In some embodiments, the column data buffer includes a capacitor to store the data signal and a switch located between the capacitor and the column data input. The capacitor may have a small capacitance, such as the input buffer may only apply a voltage signal on the order of a few volts, and the comparator device has a very high input impedance. The comparator may be implemented using a differential amplifier. For example, an inverting input of the comparator may be coupled to the data column buffer and its non-inverting input may be coupled to the ramp signal input.

Depending on the implementation, the LED coupled to the control circuit may only be active for a short period of time. In some variants, the LED may only be active for about 50% of a normal cycle. In such cases, it is useful to be able to disable unneeded parts of the control circuit. For this purpose, the comparator device may have a power control input coupled to the trigger input for adjustment of its power consumption based on the trigger signal. Alternatively, the comparator device may be coupled to the output buffer to control its power consumption based on an output state of the output buffer. In this regard, the output buffer may be configured to maintain its output state independent of its input coupled to the comparator device until it is reset or triggered by the trigger signal.

In another aspect, the ramp signal is generated. In some variations, the control circuitry includes a ramp generator to provide the ramp signal to the ramp signal input, wherein the ramp generator is configured to generate a varying signal between a start value and an end value in response to a trigger signal. The ramp generator may be implemented as a global ramp generator that sends a common ramp signal to various other control circuits. Alternatively, a number of ramp generators may be provided, with each individual ramp generator driving a number of lines and their respective pixels. Such an implementation allows the ramp signals to be multiplexed at times, thereby reducing artifact. Further, a ramp signal provided by a ramp generator may also be multiplexed before being applied to the ramp signal input.

Another aspect relates to a method of controlling illumination of a light emitting device in a matrix display having a plurality of light emitting devices arranged in addressable rows and columns. In accordance with the proposed principle, the method comprises providing a trigger signal and a data signal for a selected row and at least one light emitting device. A level of the data signal is then converted to a pulse with respect to the trigger signal. More specifically, in some variations, the level of the data signal is converted to a pulse width with respect to a trigger signal. The pulse is used to control the on/off ratio of the light emitting device with a pulse.

In some aspects, converting a level of the data signal includes generating a ramp signal between a first value and a second value. The data signal is compared to the ramp signal to generate a state signal. The state signal may be a digital signal.

The pulse signal is then based on the trigger signal and a change in the state signal. Essentially, the pulse signal is set or reset from HIGH to LOW in response to the change in the state signal between a LOW and a HIGH value. Of course, this principle of setting the value and resetting the value can be interchanged.

The ramp signal can be generated or initiated in response to the trigger signal. In some variants, both signals may be derived from a common signal. Supplying a data signal may include, in some variants, pre-buffering the data signal. For example, the data signal may be pre-buffered in a storage device such as a capacitor or the like.

Another aspect deals with the correction of errors in LEDs of a display, in particular a video wall, or a display module that occur during their manufacture, by means of redundant LED branches with selection fuse.

In the case of displays, especially video walls, an LED can fail during production. This can be caused, for example, by faulty assembly or, in the case of monolithic display modules, by a defect in one of the layers. In the case of such a defect, there are essentially two variants. One is an open contact, referred to as "open", or a short circuit between anode and cathode, referred to as "short". Both lead to the failure of the light emitting diode of the cell.

To reduce the probability of failure of a subpixel or a pixel, redundant LEDs are provided for each subpixel. In the event of a defect, appropriate circuitry measures are taken to ensure that the cell does not fail, i.e. the defective LED can be decoupled from the power source. In some variants, however, this results in both LEDs being supplied by the same current source in a fault-free case, namely both the typical and the redundant LEDs. This in turn leads to a color shift resulting from a dependence between the transverse current and the dominant wavelength. In addition, due to the process technology used for displays, especially video walls, or modules thereof, it is often only possible to implement a common cathode for all light-emitting diodes. Depending on the further design of the backplane (e.g. TFT backplane), this can mean that only NMOS transistors (N-type metal oxide semiconductor transistors) can be used to build the pixel cell. With a conventional 2T1C (2 transistors, 1 capacitor) cell, this leads to a clear dependency between the cross current of the light emitting diode and its forward voltage.

There are several approaches to solve these difficulties, but most of them involve additional effort or require additional space. According to the principle proposed here, a solution is given where, on the one hand, redundancy is provided, but halving of an electric current flowing through a light emitting diode is avoided. In addition, PMOS transistors can be used, which increases flexibility.

A device for the electronic control of a plurality of LEDs of a pixel cell or a sub-pixel, in particular as a 2T1C cell, is created. By means of a first transistor and an electronic imprint component associated with the LED, a current flow is generated which triggers the fuse connected in series with this LED.

Accordingly, a device for electronically driving a plurality of LEDs of a pixel cell or a subpixel comprises a first and at least one second branch, each with one LED connected therein, and an electronic fuse arranged in series with the LED. The first and the at least one second branch are connected to a potential connection on one side. Furthermore, a driver circuit with a data signal input, a selection signal input and a driver output is provided. The driver output is connected to the other side of the first branch and the at least one second branch. Finally, the device comprises an imprint component associated with the at least one second branch, the imprint component being adapted to generate a current flow that triggers the series-arranged electronic fuse.

A characterizing feature thus consists in the introduction of an additional imprint signal line in combination with an additional electronic imprint component, which can be designed in particular as a transistor or as a diode. This ensures that after an End-Of-Line (EOL) test only one light emitting diode is active per color and pixel, and this also in the case of a defect-free pixel. In other words, in the event of an error, the LED that is still working is selected. If, on the other hand, there is no error, i.e. if both LEDs of a branch are working, one of the two will still be switched off permanently.

Thus, in a method of electronically configuring a plurality of LEDs, a test of a function of the LED of each of the first branch and the second branch is first performed. If both LEDs of the first branch and the second branch function, an imprint signal is applied to the electronic imprint device. Then, a current flow that triggers the fuse connected in series with the LED of the second branch is impressed into the second branch of a fuse. For this purpose, the fuse is usually designed as a fusible link.

Depending on the embodiment, the imprint component may have an imprint transistor with its current line contacts electrically connected in parallel to the LED with which the imprint component is associated and its control contact connected to an imprint signal line. Alternatively, the imprint component may be formed with an imprint diode having one terminal connected to the second terminal of the LED with which the imprint component is associated. The other terminal of the imprint diode is connected to the imprint signal line.

The proposed arrangement makes it possible to design the LED as a so-called common anode or common cathode. That is, depending on the design, the led of each branch is connected either between the supply potential and the current source or between the current source and the reference potential terminal. Thus, in one case, the LED is connected to the supply potential terminal and the electronic fuse. In the other case, the LED is connected between the fuse and the reference potential terminal. The current source is always connected to the electronic fuse of the respective branch. The charge storage of the 2T1C cell is connected to the gate of the current source transistor and the fixed potential, i.e. to the potential terminal to which the current source transistor is also connected.

In a further aspect, a display, in particular a video wall, or a display module, in particular a module of a video wall, having a plurality of the devices described above is proposed, wherein pixel cells of the display are each electrically connected along a row and/or along a column to a common imprint signal line. Each pixel cell of a column is electrically connected to the supply potential connection by means of a common supply line to a switching transistor arranged on a common carrier outside the display.

In addition to the various concepts for driving and providing redundancy circuitry, another consideration is to connect the carrier with the LEDs or the monolithic array with a carrier that contains the driver. There are concepts that attempt to implement both LEDs and the IC circuits in the same material system. This in itself is to be advocated and can also be realized at least in parts. However, the material systems for LEDs have disadvantages, so that they are only suitable for IC circuits to a limited extent.

Another aspect is to create different material systems for generating the drive circuits on one side and the LEDs in a matrix array on the other side. There are essentially two ways to do this. One is to start with one material system and fabricate the devices, then create a transition to the other material system and provide the other devices in it. Feed lines through the material systems and the transition connect the devices. In this approach, one difficulty is to select and adjust the different process parameters so that fabrication of one “side” is possible without damaging the other “side.” For example, the process temperature (e.g., for diffusion or implating processes) varies widely so that no diffusion or undesirable diffusion occurs depending on the temperature. In this way, devices can be damaged. In some aspects, it is proposed to fabricate the actuation in one technology; for example, silicon-based and then grow different material systems as rods or the like.

Another approach suggests manufacturing the control and pixel array separately and then connecting them electrically and mechanically. In this way, the needs and requirements can be adapted to the specific situation and manufacturing can be optimized. On the other hand, the use of digital driving techniques allows reducing the number of necessary contact pads between the carriers without limiting the functionality. For the manufacture of displays such as video walls or even display devices and matrices, novel digital and analog concepts developed.

One aspect of constructing an LED display relates to controlling the light emitting elements or LEDs in a display or video wall. Thus, the display comprises a plurality of LEDs arranged in rows and columns. In some aspects, the LEDs can be grouped into subunits. This makes them easier to manufacture, test and process.

In one embodiment, a display is provided having a plurality of pixels arranged in rows and columns. A first substrate structure is fabricated in a first material system and comprises a plurality of LEDs. The LEDs are individually addressable by lines in and/or on the first substrate structure. A plurality of contacts is arranged on a surface of the first substrate structure facing away from the main radiation direction.

Furthermore, the display comprises a second substrate structure comprising a plurality of digital circuits for addressing the LEDs. The second substrate structure is manufactured in a different material system compared to the first substrate structure. On a surface, the second substrate structure comprises a plurality of contacts corresponding to the contacts of the first substrate structure. According to the proposed principle, the first and second substrate structures are now both mechanically and electrically connected to each other so that the contact areas correspond to each other. According to this concept, it is proposed to manufacture digital and analog elements of a display separately in different material systems and then connect them together. This allows the optimum technology to be used in each case.

In this context, the first substrate structure with LEDs can be constructed as a monolithic module. In addition, a modular design could be used. As a result, the first substrate structure would itself be a carrier for modules comprising the various LEDs. In some aspects, the first substrate structure includes analog circuitry, such as a power source for each pixel. Likewise, the redundancy circuits and driver circuits provided herein are conceivable. It is possible to implement these circuits in thin film technology, provided that the requirements for a current carrying capability do not become too stringent. Where possible, in some aspects it may be convenient to provide multiplexers or other circuitry in the first substrate structure. This may reduce the number of contact areas between the first and second substrate structures. Simple switches, each selecting one of two LEDs, reduce the number of necessary contact areas by about half. In other aspects, it may be possible to combine contacts, for example by using a common cathode layer for the LEDs.

In terms of material systems, the choice is flexible, with each technology and material system bringing its own advantages and challenges. The second substrate structure is based on single crystal, polycrystalline or amorphous silicon, among others. Implementing digital circuits in these material systems is well understood and can be scaled if needed. Similarly, indium gallium zinc oxide, GaN or GaAs are suitable as material systems for the second substrate structure. At least one of the following compounds can be used as the material system for the first substrate structure: GaN, GaP, GaInP, InAlP, GaAlP, GaAlInP, GaAs, or AlGaAs. One aspect could be the different thermal expansions and crystallographic parameters depending on the material systems used. Therefore, both substrate structures are often not bonded directly but via several intermediate layers.

The second substrate structure with the digital circuits, in addition to the supply lines, can also contain a plurality of digital circuits for generating a PWM-like signal from a clock signal and a data word for each pixel. Furthermore, it is possible to implement series-connected shift registers whose respective length corresponds to the data word for a pixel, each shift register being connected to a buffer for intermediate storage.

For the aforementioned reduction of contact areas, the second substrate structure may include one or more multiplexers electrically coupled to a demultiplexer in the first substrate structure for driving multiple LEDs.

BRIEF DESCRIPTION OF THE DRAWINGS

In the following section, some of the aspects mentioned and summarized above are explained in more detail, using various embodiments and examples.

FIG. 34 shows a sixth embodiment of a circuit with redundant LEDs, in which a defect in one LED is compensated for;

DETAILED DESCRIPTION

For displays and video walls, respectively, a cControl of each pixel individually and separately from a second pixel to provide the appropriate flexibility to visualize any type of information. Simply speaking, it requires to separately drive a matrix of 1920×1080 pixels as in conventional TVs or monitors with approximately 2 million pixels.

New concepts are therefore required, which can be roughly divided into two areas. The first area refers to new designs of transistors, capacitors or other elements. The second area relates to circuit technology and the principles of driving LED pixels. Simply put, digital transmission lines to address the pixels in rows and columns takes up space as does the corresponding row and column decoding. The same is true for the implementation of power sources or buffers to apply the necessary current to the individual LEDs. The construction in monolithic as well as in single placement of LEDs can allow different concepts to achieve good visual impression with new approaches in addressing of LEDs in a display.

Figure 1A:
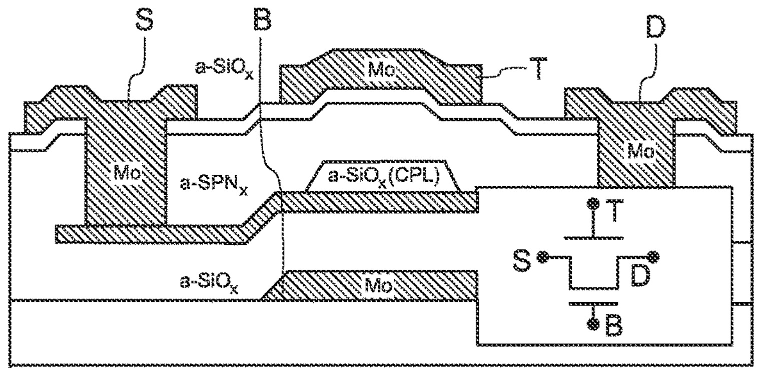
FIG. 1A illustrates an embodiment of a dual-gate transistor in cross-section.

FIG. 1A shows an embodiment of a Current driver for LEDs with backgate or dual-gate transistor, which is designed in NMOS technology. This design can be implemented with a small number of components.

Such a back-gate transistor is often used as a current driver transistor or current source. Among other things, it is constructed in TFT (thin-film technology) and has a second control terminal, also known as a back gate, in addition to its standard control terminal or gate. This additional back-gate can be used to change the transistor's conducting channel, as explained below. Instead of an additional transistor for pulse width modulation (PWM), the back gate of an already existing dual gate transistor can now be modulated with a PWM signal.

FIG. 1A shows a cross-section of a back-gated NMOS field effect transistor. On the left side is a source region S, on the right side is a drain region D, with a current conducting channel provided between the two regions. The resistance of the channel, i.e. its ability to conduct current, is changed in a normal field effect transistor by a single gate. In the dual-gate transistor, a change in the channel is provided by a first bottom gate B and a second top gate T. The gates are located on different sides of the channel. In the embodiment shown, the top gate (upper gate) provides the additional backside contact or backgate contact.

Figure 1B:
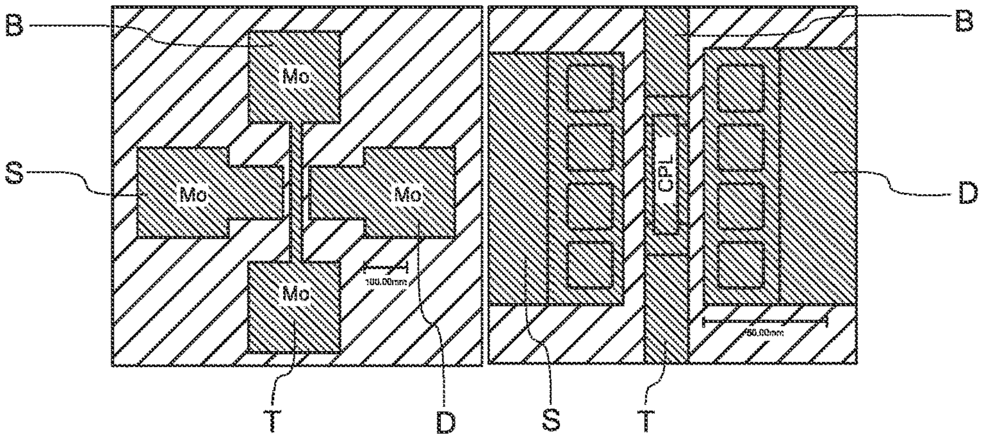
FIG. 1B shows two top views of the dual-gate transistor.

FIG. 1B shows two top views of the dual-gate transistor according to FIG. 1A. As shown in the left illustration, a left source region S and a right drain region D can be controlled by means of the top gate T and/or the bottom gate B. The right illustration in FIG. 1B shows a section of the arrangement according to FIG. 1A. The right-hand illustration in FIG. 1B shows a section of the arrangement according to FIG. 1A.

Figure 1C:
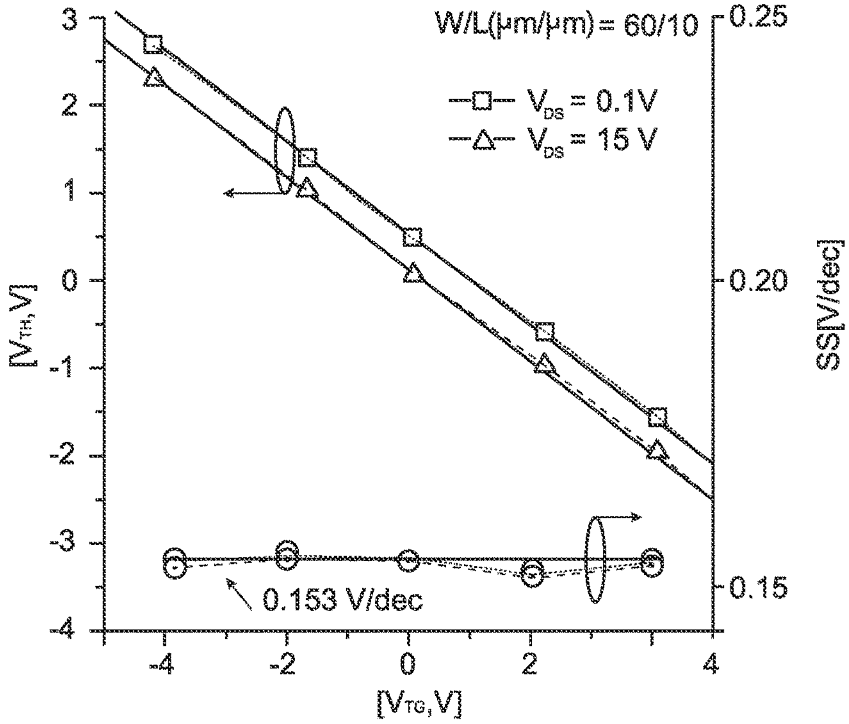
FIG. 1C illustrates a plot for the dependence of a threshold voltage on a top gate voltage.

FIG. 1C shows an illustration of the dependence of a threshold voltage on a top gate voltage $V_{TG}$ and thus the interaction of a backside contact with the threshold voltage VTH. In particular, the threshold voltage $V_{TH}$ is the gate-source voltage $V_{GS}$ at which the field effect transistor becomes current conducting. In FIG. 1C, the x-axis, shows the voltage $V_{TG}$ applied to a top gate T. As a function of this, the y-axis shows the threshold voltage $V_{TH}$ for changing the conductivity of the channel of the controlled NMOS field effect transistor. For example, a topgate voltage of 0 V provided a threshold voltage for current conduction of 0.5 V. By means of the additional top gate of the insulated-gate ZO NMOS transistor, the threshold voltage $V_{TH}$ of the transistor can be shifted almost linearly in a wide range.

Figure 2:
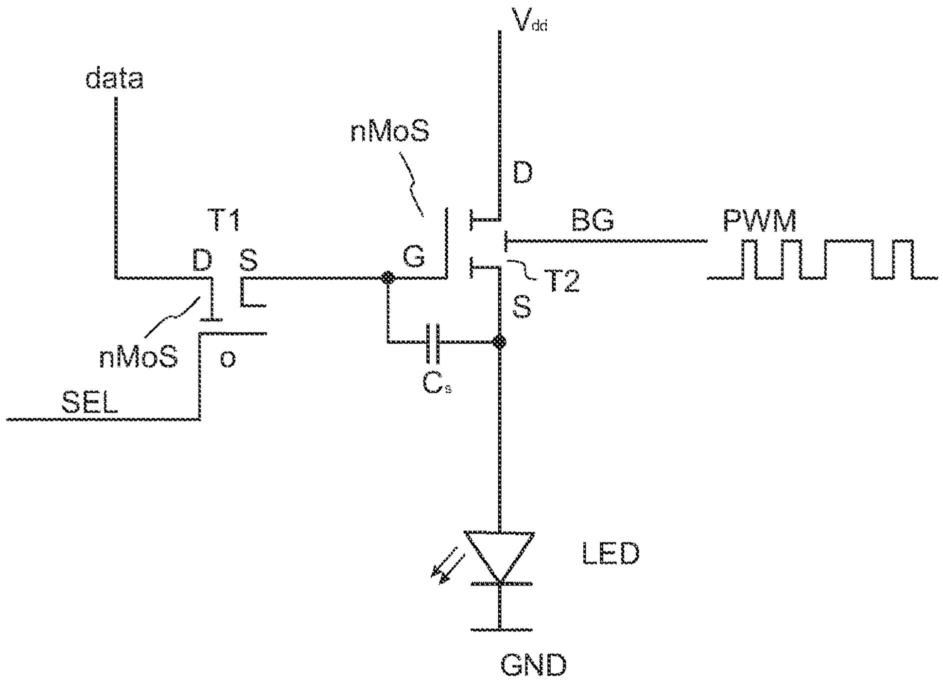
FIG. 2 shows a first embodiment of a drive circuit for an LED with some aspects according to the proposed concept.

FIG. 2 shows a first embodiment of a device for the electronic control of an LED, in particular a pixel or subpixel for a display or a video wall. The LED is connected in series with a dual gate transistor between a first potential GND and a second potential Vdd. The arrangement comprises a threshold line PWM connected to the first control gate or back-gate BG of the dual-gate transistor T2. This has an additional control electrode. This back gate BG with a back side contact is shown in FIG. 1A and FIG. 1B. According to the illustration in FIG. 1C, the threshold voltage can be shifted significantly via the back gate contact, i.e. the output current can be modulated by means of the additional gate BG while the voltage $U_{GS}$ between gate G and source S remains constant. In principle, the gate G and the back gate BG can also be used in reverse. That is, the current adjustment can be performed by means of the first gate BG and the pulse width modulation by means of the second gate G. By means of the wide dynamic range provided by the circuit, the threshold voltage can be shifted into ranges that lead to a safe turn-off of the second transistor T2.

This enables pulse width modulation (PWM) operation.

Another advantage is the speed of the proposed circuit using the dual-gate transistor T2. Fast switching is executable. Since, in contrast to modulation via the "Data" line, no memory capacity is used, it is possible to modulate significantly faster with the same driver power.

Furthermore, the arrangement comprises a data signal line data and a selection signal line sel. Finally, the arrangement also comprises a selection hold circuit with a charge memory Cs and a control transistor T1. The charge storage device is arranged between a second control gate G of the dual-gate transistor T2 and a terminal of the LED. The control terminal of the control transistor T1 is connected to selection signal line Sel. In operation, a datum data is impressed on the data signal line via the selection signal line to the gate G of the dual-gate transistor T2. The voltage UGS is stored in the capacitor Cs and is present even after the selection transistor T1 is switched off. The voltage is specified by means of the data signal, whereby addressing is performed by means of the selection signal Sel.

The gate G thus generates a fixed channel and thus a constant current through the current path. In this way, a constant current source is provided by transistor T2, which is additionally pulse-width modulated by a PWM signal at the back gate of transistor T2. The LED thus switches back and forth by the PWM signal between a current specified by the datum in the charge memory and the "off" state. In some embodiments, since the LED has a slight dependence of color by the impressed current, the color may be impressed to a small extent by the data signal and the intensity may be impressed by the PWM signal. If the color dependency is low, the intensity can also be set by the date with a fixed PWM.

The embodiment of FIG. 2 shows a pulse width modulation of an adjustable constant current source with a NMOS TFT (Thin Film) transistor T2 without GND-based programming. However, this embodiment is not temperature stabilized. The temperature instability results from the fact that the voltage across the charge storage Csvaries slightly due to the temperature dependence of the voltage drop across the light emitting diode.

Figure 3:
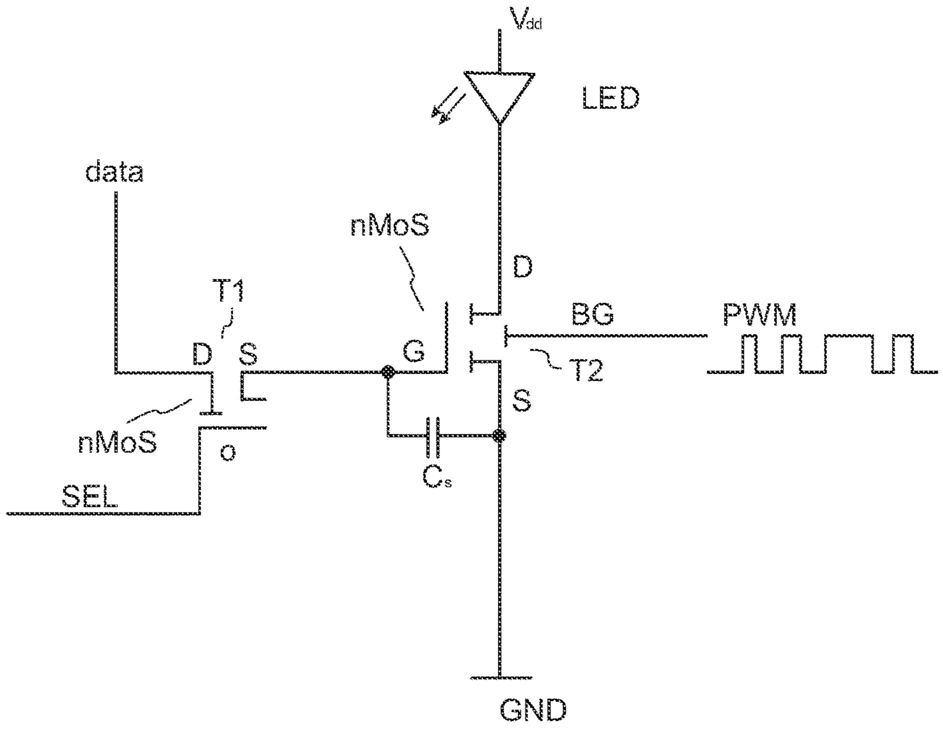
FIG. 3 forms a second embodiment of a drive circuit for an LED with further aspects.

FIG. 3 shows a second embodiment of a device for electronically driving an LED pixel cell provided in NMOS technology.

Similar to the previous embodiment, the current path includes an LED and a dual gate transistor T2 connected in series between the first potential terminal GND and the second terminal Vdd. The charge storage Cs of the selection signal holding circuit has one terminal connected to the gate G of transistor T2 and its other terminal connected between source S and first potential GND. As a result, the voltage across the charge storage Cs remains constant and is no longer dependent on the light emitting diode forward voltage and thus is no longer so temperature dependent. The selection signal holding circuit is programmed GND.

On the other side, the LED is connected between the drain terminal D and the supply potential Vdd. Thus, the LED is arranged on the side of the second potential terminal Vdd, which provides the electrically higher potential. The arrangement is the same as in FIG. 2, but the LED is not on the low side, i.e. not with the cathode connected to GND (ground), but on the high side of transistor T2. Thus, the cathode of the light emitting diode is connected to the drain of transistor T2 and its anode is connected to the second potential terminal Vdd. Accordingly, the LED shows, for example, a common anode topology instead of a previous common cathode.

Figure 4:
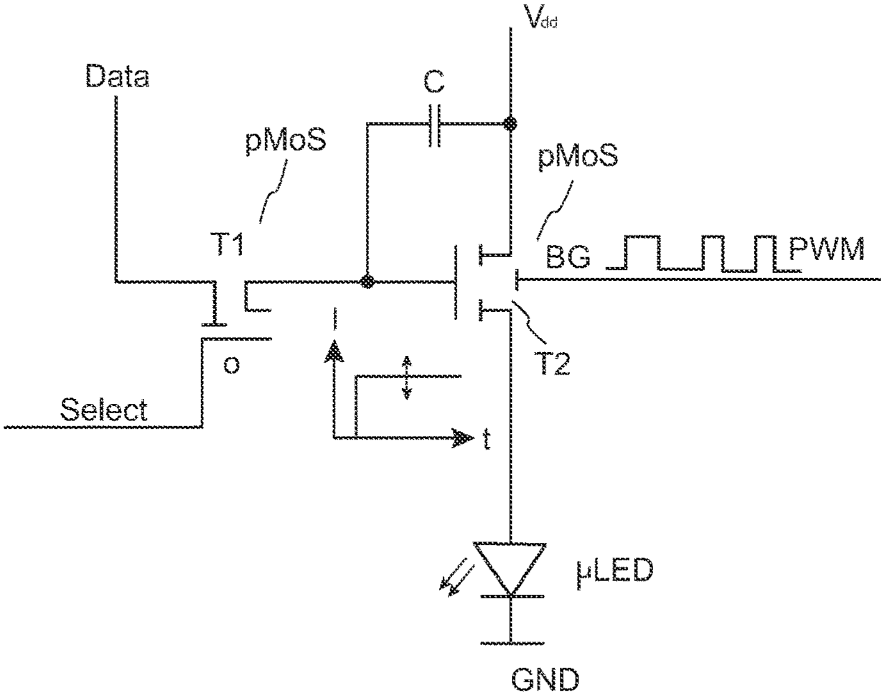
FIG. 4 is a third embodiment of a drive circuit for an LED according to some aspects according to the proposed concept.

FIG. 4 shows a third embodiment of a device, namely an embodiment according to FIG. 2, but now implemented using PMOS thin-film transistors instead of NMOS thin-film transistors (TFT). Thus, only PMOS transistors are used. In this embodiment, the charge storage is accordingly connected between the source of the dual-gate transistor T2 and the first potential Vdd.

The embodiments shown in FIGS. 2 to 4 allow a classical control in a pixel matrix. Here, the "front gate" (normal) gate G of transistor T2 is written with a voltage value Data, the holding capacitor Cs stores this voltage value and controls the second transistor T2 accordingly. This is used, for example, to adjust a color mix in an RGB pixel. A pulse width modulation (PWM) voltage is now applied to the second transistor T2 via the back gate BG, which modulates the light emitting diode current in time via pulse width modulation (PWM) and is used, for example, to change a general brightness of a pixel at a previously programmed color. The previous programming of the color is done by the first transistor T1 and the capacitor Cs. Likewise, for example, the same pulse width modulation signal can be applied to the respective back gate at all transistors of a display line. Thus, a whole line is "dimmed".

It is also possible to control all backgates of a complete display, i.e. all columns and all rows, with a common pulse width modulation signal PWM, so that the complete display or video wall is "dimmed" without changing its image content. This can be used, for example, for a day/night mode for a display in a car or also for a video wall. In this way, the brightness can be dynamically and continuously adjusted to an external brightness. In the Video Wall area, it may also be possible to control parts of the Video Wall individually in such a way that dark areas can be brightened and brighter areas darkened.

Figure 5:
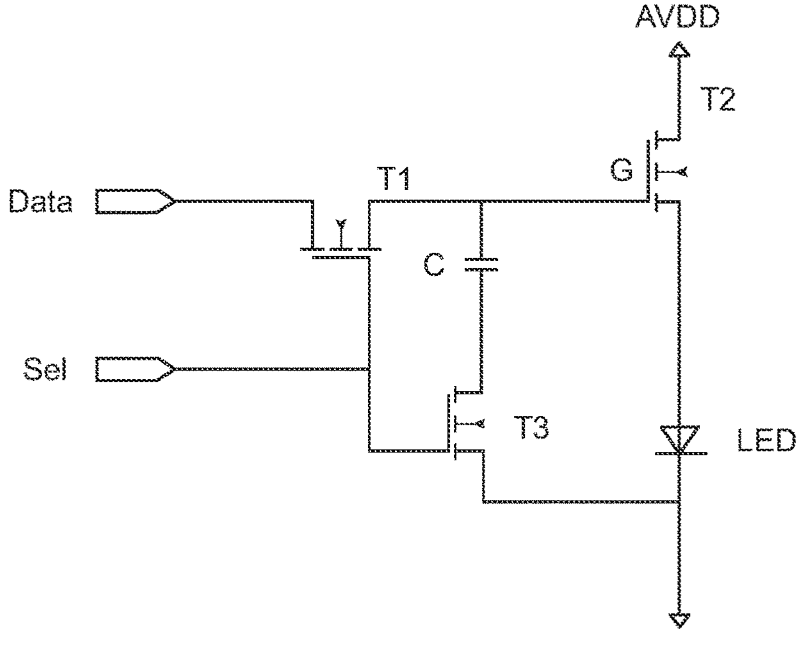
FIG. 5 shows another embodiment of a drive circuit for an LED with further aspects.

FIG. 5 shows a third embodiment of a device, namely a further embodiment of an embodiment of a control device. In addition to the representation of the device shown in FIG. 2, a third transistor T3 is connected in parallel to the LED, with the control terminal of the third transistor T3 being connected to the selection signal line Sel. The transistor T2 as constant current source is designed here only with a gate. By means of such an arrangement, programming can be performed independently of the anode potential of the LED. The device presented here results from a combination of NMOS-based IGZO processes and the requirement of a common cathode from process technology regarding an assembly of LEDs. On this basis, an implementation of a 2T1C (two transistors and one capacitance) current source is possible.

If a high potential Vdd is applied to the selection signal line Sel, the first transistor T1 is connected to the data signal line $V_{data}$, and in addition the third transistor T3 becomes current conducting, thus bypassing the light emitting diode and connecting the capacitor C to reference potential GND. In this way, the capacitor is programmed with the voltage $V_{data}$, referenced to the reference potential GND of the lower, first potential terminal and not to the anode potential of the LED. If the potential of the selection signal line Sel is at the reference potential GND, the first transistor T1 and the third transistor T3 are disabled, so that the capacitor C holds its previously programmed voltage, which corresponds to the gate-source voltage $U_{gs}$ of the second transistor T2. If the anode potential shifts, the gate potential to the second transistor T2 also shifts as a result of the isolation of $V_{data}$, so that the gate-source voltage $U_{gs}$ of transistor T2 remains constant. In this way, the second transistor T2 can operate as a current source.

Figure 6:
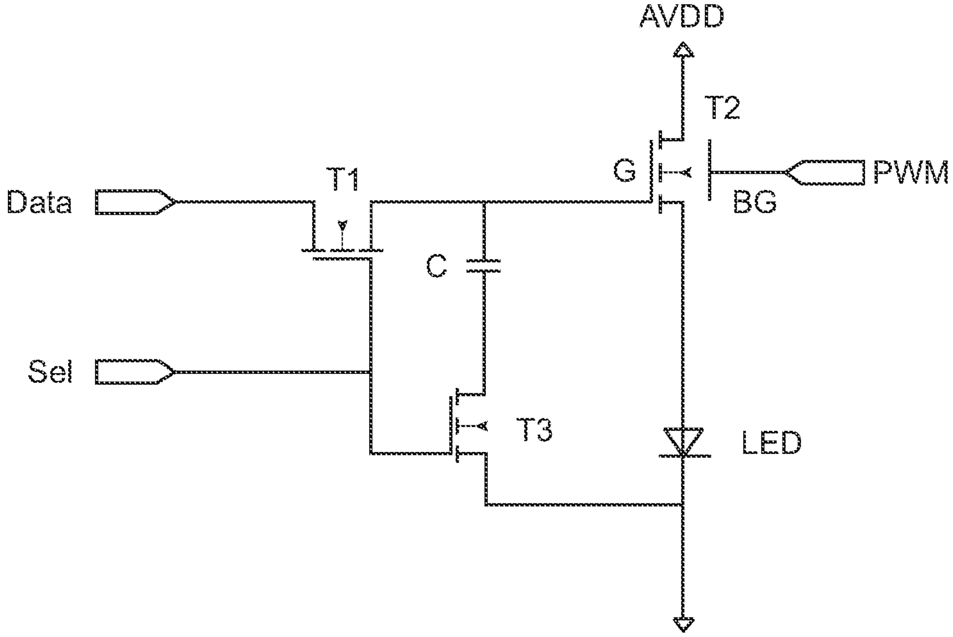
FIG. 6 illustrates another embodiment of a drive circuit for an LED according to some aspects of the proposed concept.

FIG. 6 shows a fifth embodiment of a device, namely in the form of a subpixel cell. FIG. 6 shows an arrangement according to FIG. 5 with the difference that the second transistor T2 is here designed as a dual gate transistor whose additional gate terminal BG is connected to a threshold line PWM for the application of a pulse width modulation. The front gate G is connected to the charge memory C, the back gate BG is supplied with the pulse width modulated signal.

The transistors T1 to T3 in combination with the holding capacitor C1 form a 3T1C cell in NMOS configuration. The 2T1C cell consisting of transistor T1 and transistor T2 can also be designed as a PMOS configuration. Then, for example, the third transistor T3 is not required. Transistor T2 is designed as a so-called "dual gate transistor".

Figure 7:
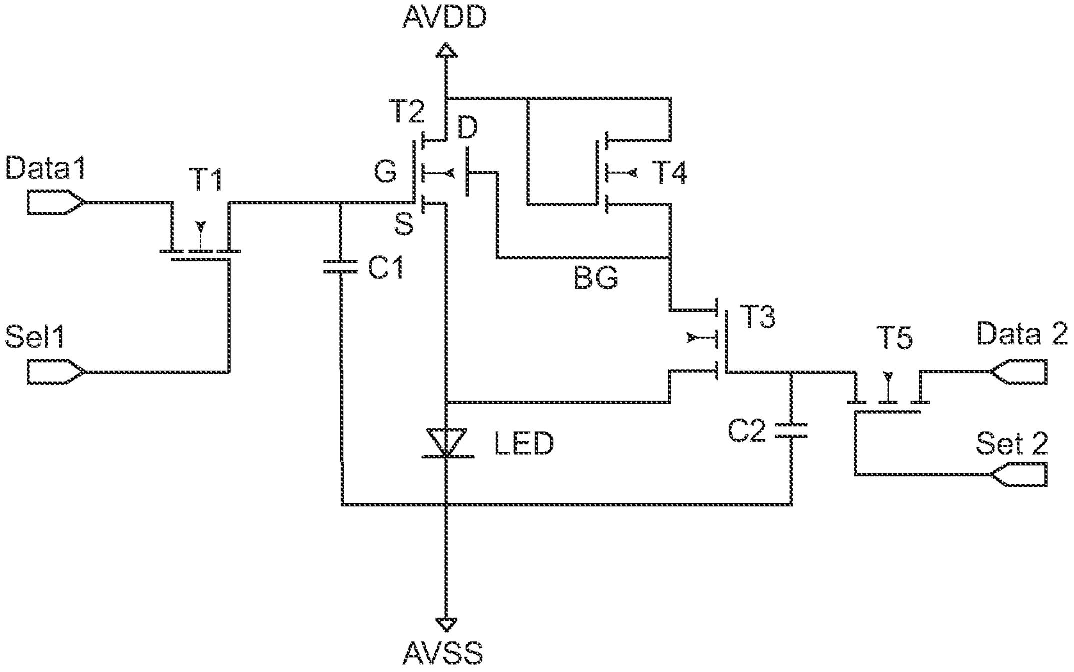
FIG. 7 shows a further example of an embodiment in addition to the preceding figure.

FIG. 7 shows an illustration of an example of a device in which additional temperature stabilization is provided. The transistors T1 and T2 in combination with the holding capacitor C1 provide a 2T1C cell in NMOS configuration. The light emitting diode is placed on the low side of transistor T2 because a "common cathode" is provided for process reasons. The T2 is designed as a "dual gate transistor" and thus comprises two control electrodes. Similar to some previous examples, the gate (corresponding to the bottom gate in FIG. 1A) of the dual-gate transistor T2 is part of the topology of the 2T1C cell and sets the color and general brightness of the LED via the ground-related programming of the charge storage C1 and the signal on the Data1 line. Via the back gate BG (front gate of FIG. 1A) a PWM signal can be applied to the transistor T2 working as current source.

The gate-source voltage of transistor T2 is thus dependent on the forward voltage of the light emitting diode. Since the voltage drop across the light emitting diode depends on the cross current as well as on the temperature, this results in an output current which deviates considerably from the actual expected value of the programming. This can be described by means of the following formula:

$$I_{LED}=K(U_{data}-U_{LED}(T,I)-U_{th})^2 \quad \text{(Formula 1)}$$

Here $U_{data}$ is the voltage across the charge storage C1. When the LED self-heats, its forward voltage decreases, which leads to an increase in current through transistor T2. Due to the lack of negative feedback, a change in the operating parameters of the LED therefore has a significant effect on the current and thus the brightness or color of the LED.

Therefore, a negative feedback is proposed which exploits the functionality of transistor T2 as a dual-gate transistor and allows compensation of such effects. The negative feedback comprises a holding capacitor C2, which is connected between the reference potential AVSS and a control terminal of a transistor T3. This forms the control for the back gate BG of the dual gate transistor T2 with its first terminal and is connected to the source S of the dual gate transistor T2 with its other terminal. The negative feedback includes another transistor T4 whose control and drain terminals are connected to the supply potential AVDD. Its source terminal is connected to the back gate BG and drain of transistor T3. Finally, for optional programming of a compensation, a fifth transistor T5 is provided which stores a compensation value on the Data 2 line based on a selection signal Set2 in the holding capacitor C2.

The gate-source voltage of the transistor T3 corresponds to the voltage of the holding capacitor C2 minus the forward voltage of the light emitting diode. If this forward voltage $V_f$_LED increases, the gate-source voltage $U_{GS}$ of the third transistor T3 decreases, since the stored charge on the capacitor C2 remains the same. Thus, the current through the third transistor T3 decreases. Since this current also flows through transistor T4, there is a smaller voltage drop $U_{DS}$ across the fourth transistor T4 due to its coupling of its gate to the supply potential. This results in a higher voltage at the node to the back gate of transistor T2. This in turn results in a lower threshold voltage at transistor T2. By means of a corresponding design of transistors T3 and T4 according to the following formula 2

$$\beta=-\sqrt{\frac{W_4\cdot L_3}{W_3\cdot L_4}},$$

where $$U_{th}\cdot I_{T2}=U_{th}*U_{th}*I_{Nom}\cdot+\beta\cdot U_{BG\text{-}S}-S \quad \text{(Formula 2)}$$

an almost complete compensation of the described reaction of the light emitting diode forward voltage can be achieved. Typical values for β=−0.52 this results in W3=3.69*$W_4$ with $L_3=L_4=L_{min}$.

The fifth transistor T5 and the capacitance C2 can be used to fine-tune Data2 of the pixel cell, including the feedback. In the embodiment shown in FIG. 7, a significant improvement of the current stability is achieved without complex pre-calculation. The compensation of the current instability is achieved by few components and without complex pre-calculation of the "Data" signal. Thus, temperature fluctuations during operation can be compensated. Furthermore, a reduction of the quiescent current caused by the third transistor T3 can be effected, namely by the additional control input Data2 via Sel2.

Figure 8:
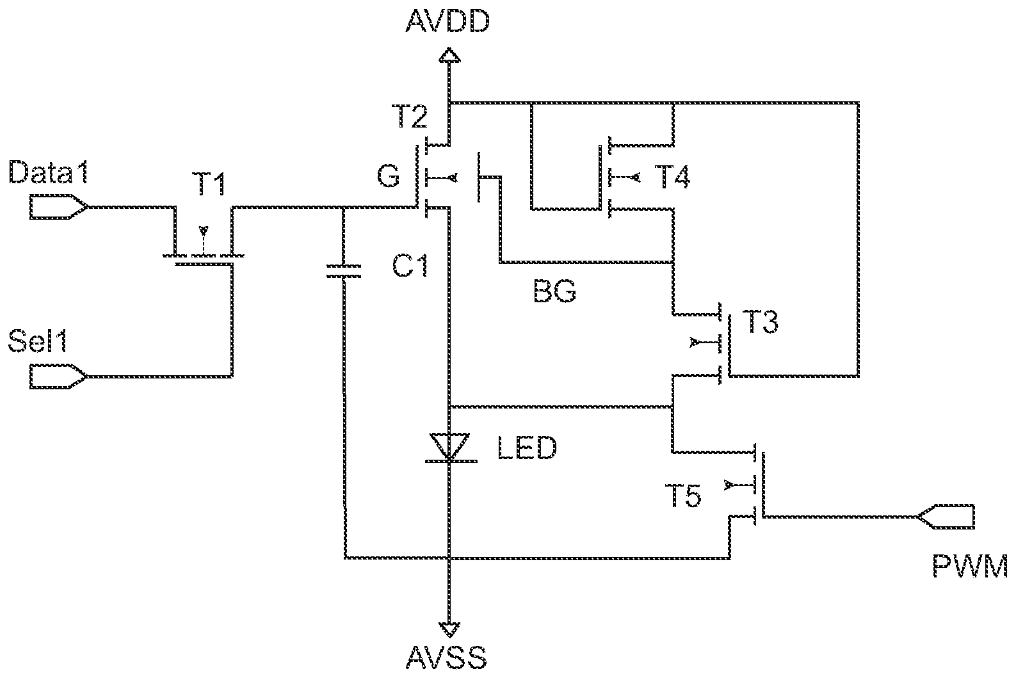
FIG. 8 shows a fifth embodiment of a drive circuit for an LED according to some aspects.

FIG. 8 shows a sixth embodiment of a control device for an LED. As in the previous examples, the LED can be part of a display or a module of, for example, a video wall. In addition to the embodiment according to FIG. 2, further changes have been made for temperature compensation and influence of the forward voltage through the LED.

The embodiment comprises a third electronic switch T3 having a first power line contact connected to the second terminal of the LED, a second power line contact of the third electronic switch T3 connected to the first control terminal BG of the second electronic switch T2. The device further comprises a fourth electronic switch T4. A control terminal of the third electronic switch T3 is connected to a second power line contact of the fourth electronic switch T4, which are jointly connected to the supply potential AVDD. Also, a control terminal of the fourth electronic switch T4 is connected to the supply potential AVD. Finally, the fourth electronic switch T4 has its first power line contact connected to the second power line contact of the third electronic switch T3.

A fifth electronic switch T5 is provided to control the second electronic switch T2 via the first control terminal BG. This is connected in parallel with the LED. In addition, it is connected with its second current line contact to the first current line contact of the third electronic switch T3. The control terminal of the fifth electronic switch T5 is electrically connected to a terminal for supplying a pulse width modulation signal PWM.

The behavior of the device shown in FIG. 8 as well as its function is similar to the device shown in FIG. 7. However, in contrast to FIG. 7, the gate of the third transistor T3 is electrically connected to a fixed electrical potential Vdd. Optionally, an additional fifth transistor T5 can be provided for safe shutdown of the light emitting diode without a cross current from the third transistor T3. A fifth transistor T5 is not required if a cross current from the third transistor T3 into the LED is not a problem. According to the device presented here, pulse width modulation PWM control is performed without a holding capacitor. In this way, a possible pulse width modulation resolution can be increased for the same cycle time. Likewise, a reloading of a storage capacitor is not necessary, whereby the switching speed can be increased.

In a further aspect, the following relates to a Control for one brightness setting or dimming of pixels or the associated LEDs. Such dimming is not only frequently used in the automotive sector, for example to switch between day and night vision, but also for video walls. Basically, such dimming can be useful and advantageous when contrasts have to be adjusted or when external light makes it necessary to control the brightness of a display in order not to dazzle a user or to be able to show information safely.

Conventionally, this problem can be addressed with PWM control and current dimming, but external parameters of the LED often change, which makes complex compensation circuits necessary. Alternatively, so-called 2T1C circuits can be used, to which the control signal for driver control is applied and stored in a capacitor. The brightness is then adjusted by the voltage applied to the capacitor. The invention now takes advantage of an aspect that often occurs rather as a parasitic undesired effect, namely the gate-source capacitance of the driver transistor. This forms a capacitive voltage divider with the capacitance of the capacitor, so that the voltage at the gate of the transistor drops. With a suitable choice of the gate-source capacitance, the brightness can be adjusted over a wider range.

In one aspect, a control circuit for adjusting a brightness of at least one LED comprises a current driver element having a control terminal. The control terminal is connected in series with the LED and has its first terminal connected to a first potential. A charge storage device is arranged between the control terminal and the first potential and forms a capacitive voltage divider with a defined capacitance between the control terminal and the first terminal.

According to the invention, a control element is now provided which supplies a control signal to the control terminal during a first time period, on the basis of which a current flowing through the at least one LED can be set during the first time period. During a second time period following the first time period, the current flowing through the LED is now fixed by a reduced control signal resulting from the control signal during the first time period and the capacitive voltage divider.

As a result, when the control element selects the control signal, it can adjust the brightness of the LED so that it is substantially dependent on either the current during the first time period or the current through the LED during the subsequent second time period.

In other words, the control signal determines the total current through the LED during the first and second time periods and, if the control signal is appropriately selected, depends substantially on the current flowing through the LED during the first time period or the current flowing through the LED during the second time period.

Thus, the control element is arranged to provide a first or a second control signal during the first time period to operate the LED at at least two different brightness levels throughout the time period. For this purpose, for example, the second control signal is greater than the first control signal so that the reduced control signal derived from the second control signal is sufficient to drive the current driver to provide a current sufficient to operate the LED.

As mentioned, the current driver element may comprise a field effect transistor having a gate forming the control terminal and having a gate-source capacitance predetermined by design.

Accordingly, during the second time period, the reduced control signal applied to the control terminal of the transistor or current driver results from the control signal during the first time period and the ratio of a capacitance of the charge storage device and the sum of the capacitance of the charge storage device and the defined capacitance.

Such a circuit is operated at a certain frequency so that first and second time periods follow each other periodically. This frequency may be 60 Hz, or often 100 Hz or 120 Hz, or may be in the range of 60 Hz to 150 Hz. In one aspect, the control element is configured to make a ratio of the second time period to the first time period adjustable, wherein the ratio may be in the range of 300:1 to 100:1, particularly in the range of 100:1. For this purpose, the control element comprises a control transistor, at the control terminal of which the first and second time periods, and thus the duty cycle, can be adjusted by means of a signal.

A brightness level can now be selected by different control signals during the first time interval of a period. To this end, in one aspect, it is provided to operate the LED at a first, darker brightness level when a voltage of the first control signal is within a first voltage interval, and to operate the LED at at least a second, brighter brightness level when a voltage of second voltage signal is within a second voltage interval that is at least partially above the first voltage interval.

In this context, the brightness is determined by the current flowing through the LED during the entire time interval. For a control signal that is within the first voltage interval, the total current is essentially determined by the current during the first time interval, since due to the capacitive voltage divider and the associated drop in a voltage of the reduced control signal during the second time interval, the current through the LED during this time interval is only very small and not sufficient or relevant for operation. The current driver is not or only very slightly controlled during this time period, the LED is hardly or not at all illuminated.

In contrast, the total current over a period is essentially determined by the current during the second time period if the control signal is within the second voltage interval during the first time period. In this case, despite the capacitive voltage divider and the associated drop in a voltage of the reduced control signal during the second time interval, the current driver is still driven sufficiently so that a sufficiently high current flows through the LED to operate it. Typical possible values for the first voltage interval are in the range of 1.3 V to 4.5 V. The second voltage interval has a range of 4.0 V to 10.0 V.

Another aspect relates to a method for adjusting a brightness of at least one LED connected to a current driving element having a control terminal, a first terminal of which is connected to a first potential, and wherein a charge storage device is connected between the control terminal and the first potential so as to form a capacitive voltage divider with a defined capacitance between the control terminal and the first terminal.

The method comprises applying a control signal to the control terminal during a first time period, thereby adjusting a current flowing through the at least one LED during the first time period. During the second time period following the first time period, the control signal is turned off, whereby the current flowing through the LED is set by a reduced control signal resulting from the control signal during the first time period and the capacitive voltage divider. In this context, switching off the control signal is understood to mean disconnecting the control signal from the control terminal, so that thereafter only a reduced signal acts on the control terminal, which results from the control signal during the first time period and the capacitive voltage divider.

This reduced control signal is thus smaller than the control signal by the ratio of the capacitive voltage divider. In particular, in one aspect, the reduced signal present at the control terminal during the second time period is derived from the control signal during the first time period by the ratio of a capacitance of the charge storage device and the sum of the capacitance of the charge storage device and the defined capacitance.

At this point, a further aspect is mentioned, namely that a ratio of the second time interval to the first time interval is in the range of 300:1 to 100:1, in particular in the range of 100:1. In another aspect, it is proposed to operate the LED at a first, darker brightness level when a voltage of the first control signal is within a first voltage interval, and to operate the LED at at least a second, brighter brightness level when a voltage of second voltage signal is within a second voltage interval that is at least partially above the first voltage interval.

In this context, in the proposed method, the brightness is determined by the current flowing through the LED during the entire time interval. For a control signal that is within the first voltage interval, the total current is essentially determined by the current during the first time interval, since due to the capacitive voltage divider and the associated drop in a voltage during the second time interval, the current through the LED during this time interval is very small. The current driver is not or only very slightly modulated during this time period.

In contrast, the total current is essentially determined by the current during the second time period when the control signal is within the second voltage interval during the first time period. In this case, despite the capacitive voltage divider and the associated drop in a voltage of the control signal during the second time period, the current driver is still sufficiently driven so that a sufficiently high current flows through the LED to operate it. Typical possible values for the first voltage interval are in the range of 1.3 V to 4.5 V. The second voltage interval comprises a range from 4.0 V to 10.0 V.

The first or second control signal required for control can be obtained from a digital control word by digital/analog conversion. For this purpose, the digital control word comprises a number of n bits. The least significant m bits ($M<n$, e.g. $m=n-2$ bits) correspond to the first control signal, i.e. the most significant bits are 0. In other words, n bits correspond to the second control signal. In another aspect, the most significant bits are used for coarse brightness adjustment, and the least significant bits are used for more precise range adjustment.

Figure 17:
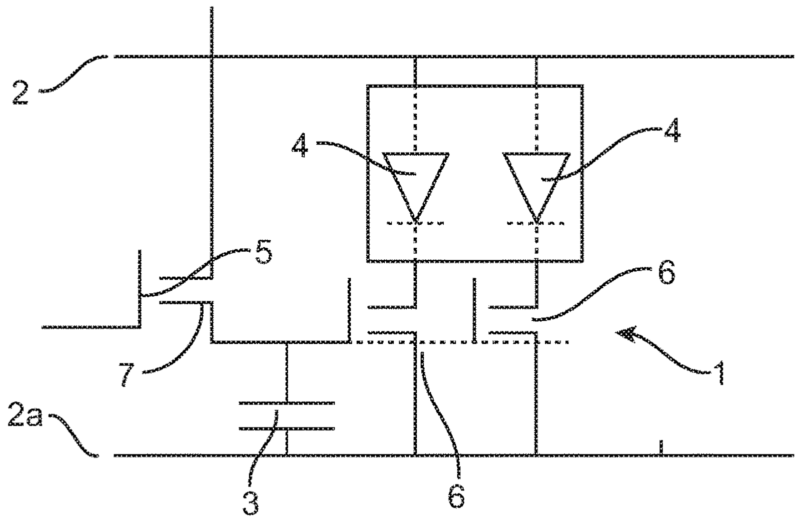
FIG. 17 shows a schematic diagram of a driver circuit for two LEDs to explain some aspects of dimmable control according to some aspects.

FIG. 17 shows a control circuit for a lighting unit 1 that has two LEDs 4 as illuminants. In terms of its basic structure, the control circuit can be implemented in a 2T1C architecture as shown here. However, other architectures are also conceivable.

Even if two LEDs 4 are provided according to the embodiment shown in order to ensure redundancy with regard to light generation, it is generally irrelevant for the realization of the invention whether one LED 4 or a plurality of µ-LEDs 4 are used as illuminants. The lighting unit 1 or the LEDs 4 may, for example, be a lighting unit or LEDs of one color of one pixel.

In the example shown in FIG. 17, the two LEDs 4 connected in parallel are each supplied with the electrical energy required to excite a light emission via a current-driving transistor 6. In addition to a transistor 6 for each LED, a common current source can also be provided for both LEDs 4. Current driving transistor 6 is connected in series with LED 4 between supply potential terminal 2 and reference potential terminal 2*a*. Supply potential terminal 2 provides the electrical power or voltage required for operation of the light unit 1.

A capacitor storing the brightness value is connected between the gate of the current driving transistors 6 and the reference potential terminal 2*a*. It forms a 2T1C cell together with the control transistor 7. A pulse signal is applied to its gate, which applies a control signal 8 from the other terminal of transistor 7 to the control terminal of current driving transistor 6.

For operation according to the proposed concept in a circuit shown in FIG. 17, a pulse signal is now applied to the gate of transistor 7. The On/Off duty cycle can be, for example, 200:1, i.e. at a repetition frequency of 60 Hz the ON pulse duration is approx. 50 µs, while the Off pulse duration is approx. 16.6 ms.

Within a period, the control transistor is now closed via the pulse signal during a first time period (ON pulse duration), and the control transistor is opened again during a second time period (Off pulse duration). During the first time period, the control signal 8 is thus applied to the control terminal of the current driver transistor 6 and via the capacitor 3. The control signal controls the current drive transistor 6 and a current flows through the LED due to the control signal 8. At the same time, a charge is applied to the capacitor until the voltage of the control signal is established via the capacitor (relative to the potential at connection 2*a*).

After the first time period, the control transistor 7 is opened again. The voltage of the control signal 8 is now stored in the capacitor and should continue to drive the current driver transistor. In practical application, however, this is not the case, because in the second time period, a capacitive voltage divider is formed, consisting of the capacitance of the storage capacitor 3 and the capacitance formed by the gate and the source of the transistor 7. This regularly results in the effective voltage 9 across the capacitor 3 being reduced by a discrete value. The reduced effective voltage 9 results from the voltage of the control signal multiplied by $C1/C1+Cp$, where C1 is the capacitor capacitance and Cp is the gate-source capacitance. Thus, a slightly smaller control signal 9 (or slightly smaller voltage) is applied to the driver transistor 6 compared to the first time period, resulting in a lower current flowing through the LEDs 4. The brightness of the LEDs 4 thus decreases somewhat during the second time span of a period. However, this is not perceived by an observer, since only the average light output present in relation to the period is decisive for the perception of brightness.

Thus, the control signal 8 is present at the control terminal for the entire period during the first time span and the reduced control signal 9 is present during the second time span. At a frequency of 60 Hz, this would be 0.05 ms to 0.06 ms for the first time period and approximately 16.6 ms for the second time period. In terms of the average light output of the LED, this means that light emitted by the LED during the second time period has a comparatively high proportion of the average light output of the LED during one period.

This is equivalent to the average current through the LED. The current flowing through the LED during the second period has a relatively high share in the average current during the whole period.

It follows that if a low voltage is selected for the control signal 8, the total current flowing through the LEDs 4 during a period, and thus the average light output, is determined by the strength of the current flowing through the LEDs 4 while the control signal 8 is present in the first period. If a low voltage value is selected for the control signal 8, the lighting unit 1 can therefore be operated at a low brightness level and dimmed as required within this low brightness range.

In contrast, if a high voltage is selected for the first voltage signal 8, for example 8V, the total current flowing through the LED during a period is largely determined by the current during the second time period of the period in which the reduced control signal 9 is applied to the current drive transistor 6. When a high control signal 8, i.e. a larger voltage, is selected, the lighting unit 1 is operated at a high brightness level and can be dimmed at this brightness level as required. During the second time period in which the reduced control signal 9 is applied to the light unit, a current greater than 1 μA still flows through the LED in this operating state, so that particularly effective operation of the LEDs 4 is possible.

Furthermore, a photonic crystal 32 is incorporated into the LED module. This crystal extends just above the active layer 20 and changes the emission properties there, for example in the area above the active layer, and can thus have an emission-promoting effect there.

Figure 18:
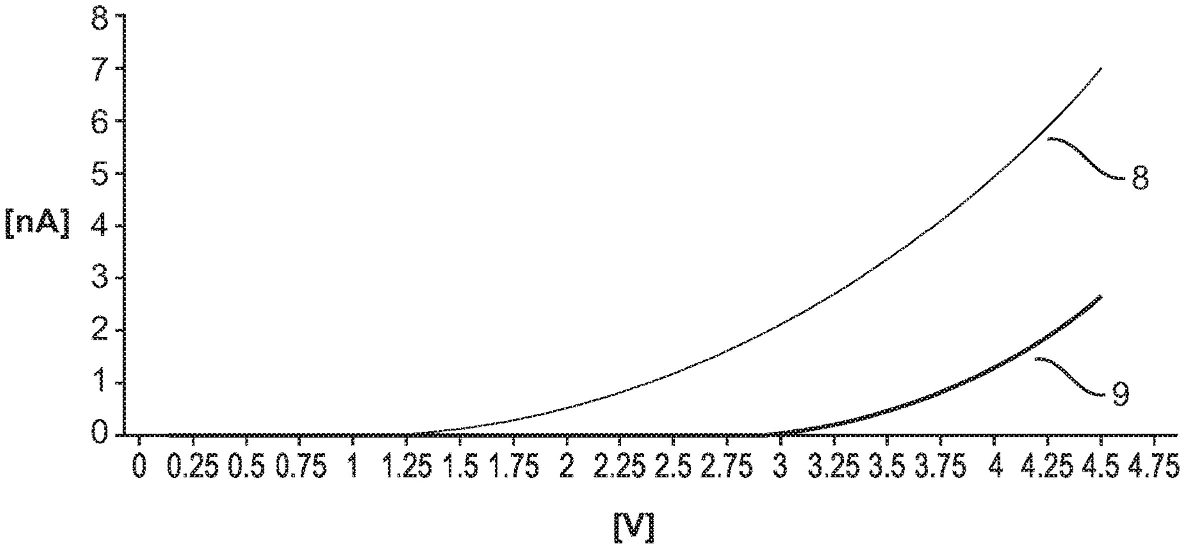
FIG. 18 is a diagram of the LED current flowing through the LED as a function of different capacitor voltages.

FIG. 18 shows a graph in which the strength of the current flowing through the LEDs 4 is listed as a function of the voltage of the control signal 8 and the reduced control signal 9. It can be clearly seen that when a control signal 8 with a voltage value of about 1V to 3V is applied during the first time period, the current flowing through the LEDs 4 is largely determined by the first voltage signal 8 applied during the first time period of the period. Meanwhile, in the second time period of the period, the applied control signal 9 reduced by the capacitive voltage divider and thus the current flowing through the LEDs 4 is almost zero.

Only when the voltage of the control signal during the first period is about 3.0 V does the voltage of the reduced control signal 9 also increase, and so does the magnitude of the current flowing through the LEDs 4 during the second phase.

It must be taken into account here in each case that due to the different length of the two phases of a period, namely a short first phase, in which the control signal 8 is applied to the light unit 1 and a long second phase, in which the reduced control signal 9 is applied to the current driver transistor 6, the influence of the second period on the average light output of the LEDs 4 is significantly greater. It follows that the total current through the LED during a period increases significantly at voltages of the control signal 8 above 3.0 V. From this circumstance it follows that with a control signal, with a comparatively high voltage greater than 3.0 V or 3.5 V, the proportion of the total current flowing through the LEDs 4 during a period is largely determined by the proportion of the current during the second time period.

Figure 19:
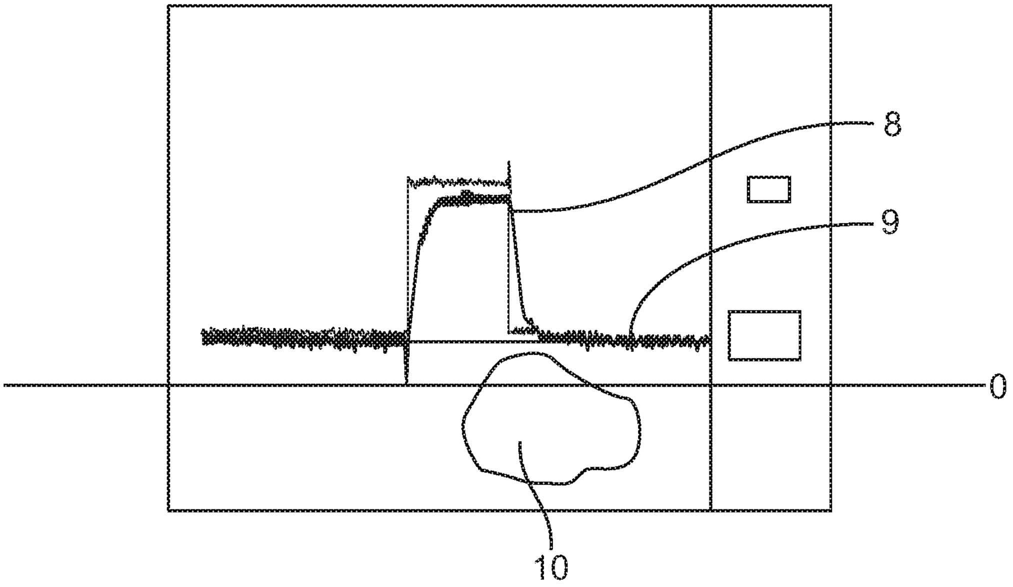
FIG. 19 shows a schematic representation of the brightness of a light unit with LED when controlled with a comparatively high first voltage signal.

FIG. 19 also shows a schematic representation of the time characteristic of the control signals 8, 9 and the resulting light spot 10 when a control signal 8 with a comparatively high voltage is applied. The control signal 8, which is transmitted to the light unit, comprises a voltage of 10 V in the embodiment example shown. Incidentally, the voltage of the reduced control signal 9 applied to the lighting unit during the second phase is lowered, but still exhibits a voltage that is significantly above 0 V. Due to such a voltage curve of the control signals 8, 9, a bright light spot 10 is formed, and the lighting unit is thus operated at a high brightness level.

Figure 20:
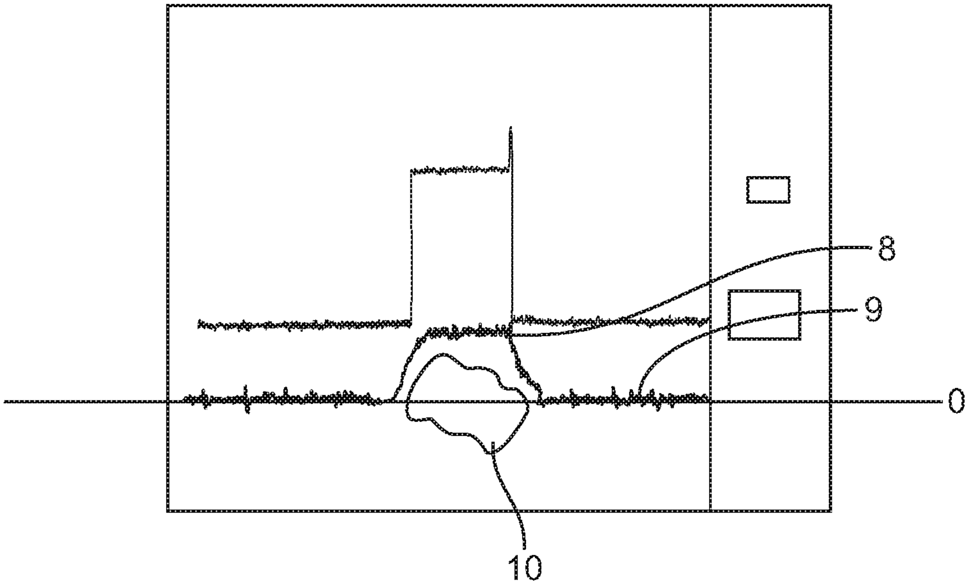
FIG. 20 is another schematic representation of the brightness of a light unit with LED when controlled with a comparatively low first voltage signal.

In comparison, FIG. 20 illustrates an operating state in which a control signal 8 with a comparatively low voltage, in this case 2.0 V, is applied to the lighting unit. The reduced control signal 9 in this case has a voltage of at least almost 0 V. The brightness of the light spot, which is determined by the average light output of the lighting unit during a period, is significantly lower than in the operating state shown in FIG. 19. The lighting unit and the LEDs used for it are thus operated at a comparatively low brightness level at which they can be dimmed as required.

Figure 21:
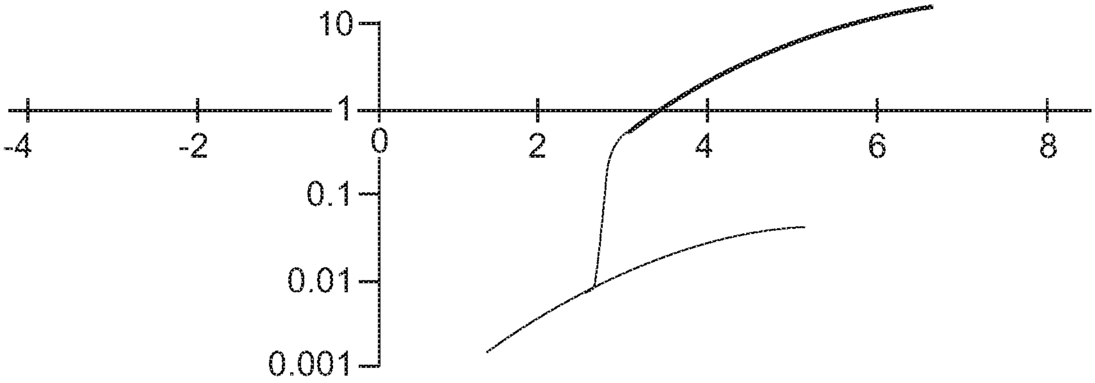
FIG. 21 is a diagram showing the average light output of a lighting unit with LED as a function of the voltage selected for the capacitor voltage according to some aspects of the concept presented here.

Finally, FIG. 21 shows in a graphical representation how the electrical energy conducted through the LEDs during a period, sometimes also referred to as the amount of current, behaves as a function of the voltage signals applied to a lighting unit during the first and second time periods of a period. The x-axis is the voltage during the first time period, and the y-axis is the current during a period.

It can be seen that when a control signal with comparatively low voltage is applied, in particular with a voltage up to about 3V, the total current flowing through the LEDs is caused by this control signal. Only when control signals with voltages greater than 3V are applied does the voltage of the reduced control signal also increase. Most importantly, in this operating state, a current flows through the LEDs of the lighting unit that, due to the length of the second period of time, has a significant effect on the amount of total current flowing through the LEDs during the period and thus on the average light output or brightness of a lighting unit with at least one LED.

FIG. 21 also shows that a lighting unit controlled in this way can be operated at two different brightness levels depending on the voltage selected for the control signal. On the two brightness levels it is again possible to change the brightness of the lighting unit continuously within a dimming range limited by a lower and an upper voltage value for the control signal. The course of the two characteristic curves shown in FIG. 21 can be adapted as required with the support of a suitable circuit design, in particular by selectively determining the capacitances of the capacitor and the gate-source capacitance of the transistor used as the switching element. Furthermore, it is conceivable to specify the voltage levels, the control signal and the reduced control signal by suitable selection and dimensioning of the electronic components used.

As the explained embodiments show, the control circuit implemented according to the invention makes it possible in a comparatively simple manner to operate a lighting unit, which has at least one LED, at at least two brightness levels. In this context, it is taken into account in particular that, depending on the level of the voltage of the control signal, either the current flowing through the LED during the first time period or the second time period of a period is decisive for the total current flowing through the LED as well as for the average light output and the brightness of the LED that can be perceived by an observer.

Another aspect deals with the question of how a feedback effect on the control of a current source can be reduced in a PWM control of the same. In pulse width modulation, the current source is switched on and off in rapid succession for contrast and brightness adjustment. The frequency is thereby some 100 kHz up to the MHz range. With control loops within the current source, the switching processes lead to spikes or other behaviour, which can bring the control loop out of its control range.

Figure 22:
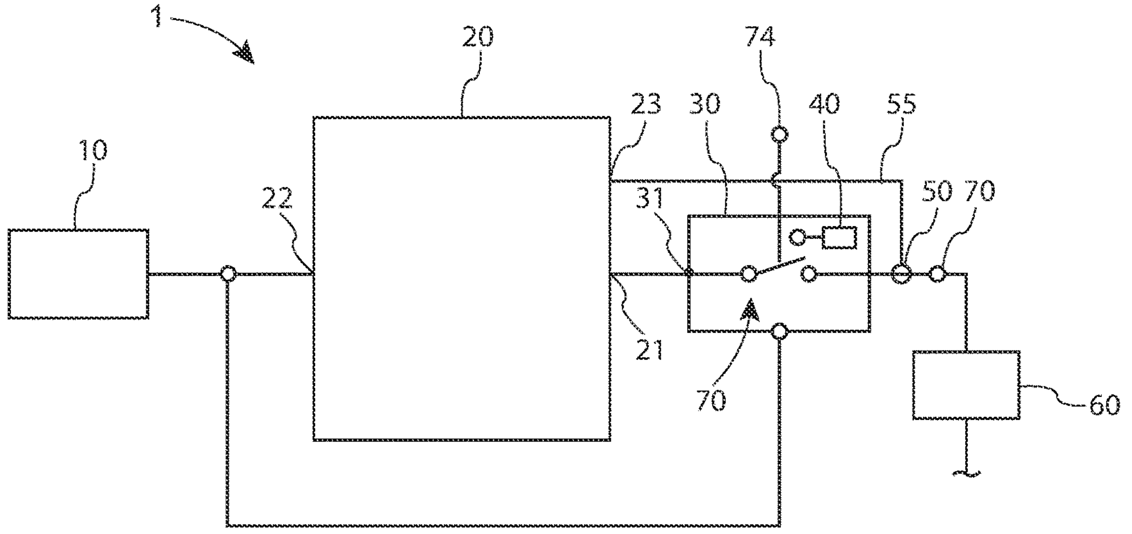
FIG. 22 shows a block diagram of the main components of a PWM supply circuit for LEDs.

FIG. 22 represents a schematic block diagram for a regulated current source for LEDs, which remains stable even during switching operations. This power source can be used in displays or other display devices such as video walls.

The supply circuit comprises a reference branch 10, which provides a reference signal and in particular a reference current or if necessary also a reference voltage. All further supply currents and, if necessary, voltages are derived from the reference signal. Further reference signals can also be generated from it. The reference signal, i.e. the reference current, is characterized by high temperature stability but also stability against process fluctuations during production. If necessary, it can include one or more correction circuits which together provide an accurate and stable reference signal, for example a reference current.

In the present case, the reference branch 10 is connected to a reference input 22 of an error correction detector 20 and to a controllable supply source 30. In addition to the reference input, the error correction detector 20 also comprises an error signal input 23 and a correction signal output 21. The detector 20 is designed to compare an error signal at the input 23 with a reference signal at the input 22 or a signal derived therefrom, and to generate a correction signal at its output 21 therefrom.

The controllable supply source 30 includes a controllable current source, which is not specifically shown in this block diagram. In addition, the supply source includes a second substitute source 40, which provides a feedback signal to the fault detector in an operating state of the circuit. For this purpose, a switch device 70 is provided which, depending on the operating state, i.e. an operating signal at input 74, either switches the power source to the load, or disconnects it from the load and switches the substitute source 40 in. As a result, either a signal from the current source to the load or the signal from the substitute source is detected at the detector 50.

A current-voltage transformer can serve as detection or also a voltage drop detector. A voltage or a voltage drop or a current can be detected with detector 50. The detected signal is now fed back to the error correction detector 20 and compared with the reference signal or a signal derived therefrom. The resulting error correction signal is used to adjust the controllable current source. Now, when the load 60 is supplied by the current source 30, the error correction detector 20 regulates the current through the load to a value defined by the reference signal. In the case of an LED, this allows the current flowing through the diode to be precisely adjusted. If the voltage drop across the load or the current through the load now changes due to temperature effects, the error correction detector readjusts the current accordingly. This part of the circuit and its operation corresponds to a control loop.

If the load is now disconnected from the current, for example if the light emitting diode is switched off in the case of PWM modulation, the control loop would first attempt to readjust, but would then run out of the control range. Therefore, according to the invention, it is provided to supply a substitute signal to the error correction detector 20. This is substantially the same or at least very similar to the nominal signal when the load is switched on. As a result, the error correction detector 20 is operated in its optimum range regardless of the operating state of the load and the control loop is not moved out of its modulating range. This results in very fast control and prevents the detector 20 from falling outside its control range.

The proposed supply circuit thus includes a correction circuit as part of a control loop for high-precision control of a current or voltage source as well as a substitute source. The correction circuit is now fed either a signal derived from the current or voltage source or the signal from the substitute source. The supply of the latter enables the current source to be switched off without the control loop running out of its control range.

Figure 23:
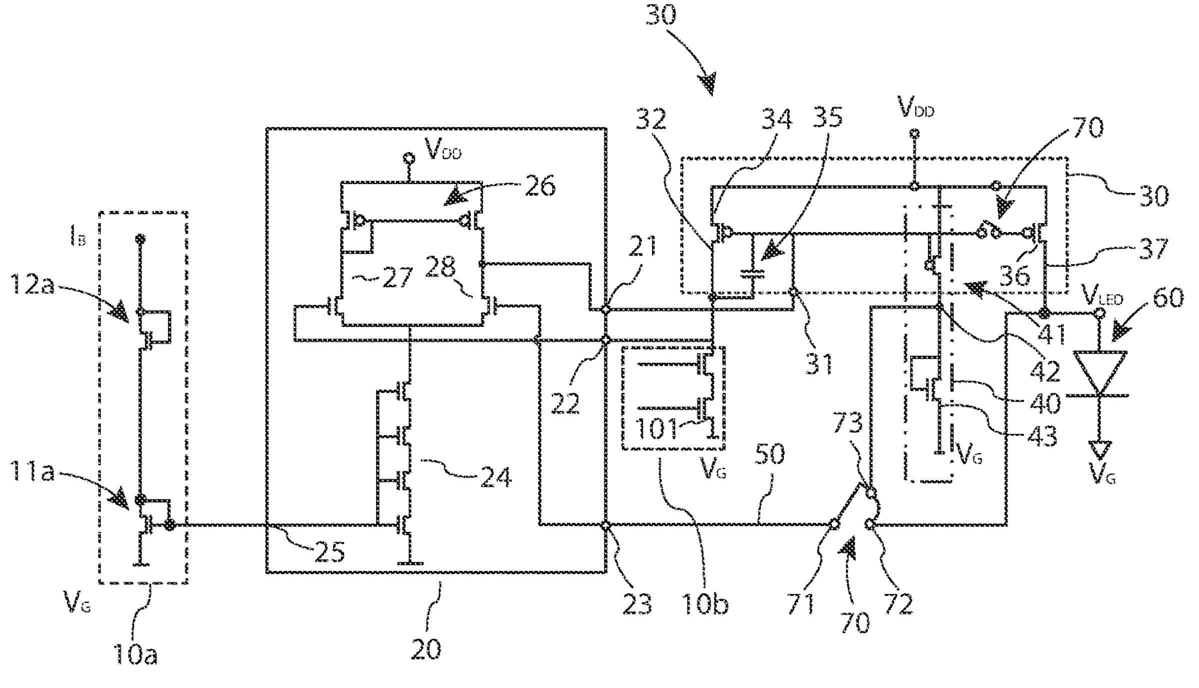
FIG. 23 is an embodiment of a PWM power supply circuit for LEDs according to the proposed principle.

FIG. 23 shows a specific embodiment for controlling a current source for a power supply to a light emitting diode 60. The light emitting diode 60 is part of a pixel matrix not shown here, for example a display, video wall or other application where a high-precision power supply is required. In the case of light emitting diodes, changing temperatures also change a current through the diode, which can result in a change in color temperature in addition to a change in brightness. By regulating the current source, this effect is compensated. Displays, pixel matrices for image or video applications are often operated with pulse width modulation, where the light emitting diodes are switched on and off with high frequencies. The ratio between the two states gives the brightness of the respective light emitting diode.

The power supply circuit shown below is essentially MOS circuitry. Some field effect transistors are of n-type, others of p-type as shown. In this case, the supply circuit is connected between supply potential VDD and load. By exchanging the channel types of the field effect transistors and an arrangement between load and reference or ground potential VG, an alternative embodiment is created. It is also possible to replace individual transistors with bipolar transistors, or to form assemblies such as the current mirrors with such. Bandgap references can be used to generate accurate voltages, which then provide a current via a converter.

The supply circuit includes a combined reference branch 10 consisting of two parts 10*a* and 10*b*, which provide a reference current. They form part of a current mirror. The reference branch 10*a* for a first reference current comprises two series-connected transistors, an n-field effect transistor 12*a* and a p-field effect transistor 11*a*. The former is connected to a supply terminal, while the latter is connected to the reference potential. The gate of transistor 12*a* is connected to the drain terminal and thus imprints a constant current. Transistor 11*a* mirrors the current through the reference branch into the four series-connected transistors 24, which form the fixed current source for a differential amplifier. The differential amplifier forms a component of the error correction detector 20 and, in addition to the current source from transistors 24, includes an inverting input transistor and a non-inverting input transistor, each in a branch connected to the supply potential VDD through another current mirror 26 consisting of two p-type transistors an. The non-inverting input transistor 27 forms the reference signal input 22, the inverting transistor 28 leads to the error signal input 21. The two transistors, like the transistors of the mirror 26 in this embodiment example, have the same dimensions. In embodiments, however, different gain factors may already be provided by geometric dimensions such as channel width or length. This may be necessary if there is also an inherent factor between the error signal and the reference signal, as described further below. Such an inherent factor results from the design of the current source 30 and the signals (error signal and reference signal) tapped for the detector 20, as described below.

The controllable current source 30 comprises a current mirror with an output branch and a reference branch, which also forms the substitute source 40. The reference source 10*b* is connected to a reference branch input 32. Similarly, this input 32 is connected to the non-inverting transistor 27 and to the reference signal input of the error correction detector 20. An accurate current is thus imprinted on the reference branch of the current mirror, with a defined voltage drop fed through the center tap to the input 22 of the error detector. The reference branch 10*b* comprises two series-connected transistors for setting the current flow through the reference branch of the current mirror of the current source 30 and for defining the reference voltage or the reference signal to the input 22. The gate of transistor 101 is connected to the gate of transistor 11*a* (but not shown here) and is thus part of the current mirror of the reference source 10. The controllable current source 30 comprises a supply input to which the supply potential VDD is applied and a p-type current mirror transistor 34. This is located between the supply input and terminal 32. A capacitor 35 is connected between the gate and terminal 32 so that the voltage in the reference branch is coupled to the gate. This voltage also forms the reference signal for the error detector.

The reason for using a positive-feedback capacitor instead of the ordinary lead in current mirrors is due, among other things, to additional frequency compensation for the additional control signal terminal 31 that connects the gate of transistor 35 to the error correction output 21 of detector 20. The gate is thereby also supplied with the error correction signal.

The gate of the transistor is also connected to the gate of an output transistor 36 via a switching device 70. This is arranged between supply potential VDD and output. This mirrors the current of the reference branch into the output branch 37 of the current source. By appropriately dimensioning the two transistors 34 and 36, the ratio of the output current to the current through the branch with transistor 34 can be adjusted accordingly. For example, if the channel width of output transistor 36 is 10 times that of transistor 34, then, as a simple approximation, the current is also increased by the same factor. In the illustration of FIG. 23, the output transistor 36 is a single transistor. However, it can also take the form of several transistors arranged in parallel.

The switching device 70 in the current source 30 is designed, in response to a signal, to connect the gate of the output transistor 36 either to a fixed potential, in this case the supply potential, or to the gate of the current mirror transistor 34. In the former case, the output transistor 36 is de-energized because the potential VDD blocks the gate of the p-type transistor. Since in this case the transistor does not conduct current, transistor 36 is also said to be open. In the second case, the output transistor 36 is closed, and current is mirrored through the current mirror transistor 34 by the above factor into the output and fed to the light emitting diode 60.

The output of the current source 30 is connected both to the load 60 or light emitting diode and to a second switching device 70, which applies either the voltage at the output of the current source to the fault signal input of the fault detector 20, or a substitute signal. This is provided by the substitute source 40, which is formed by a p-type output transistor 41 and a transistor 43 connected in series therewith. The series connection of the two transistors 41 and 43 is arranged between supply potential VDD and ground potential VG. A central node 42 forms the output for the substitute signal. The gate of transistor 43 is connected to its drain terminal and thus to node 42. The gate of the p-type output transistor 41 is connected to the gate of transistor 34. Thus, a current mirror is also formed from transistors 34 and 41. However, here a different factor is selected by a correspondingly suitable dimensioning of the output transistor 41, so that the current through this branch is significantly lower than that through the output branch.

The two switching devices 70 operate substantially synchronously and are configured so that the output of the current source 30 is connected to the error signal input 23 of the detector 20 when the gate of the transistor 36 is connected to the gate of the transistor 34. On the other hand, when the output transistor of the current mirror is de-energized, the substitute signal from the substitute source is present at the error signal input, i.e., the tap 42 is connected to the input 23.

In the embodiment shown here, the substitute source is always activated, i.e. the output transistor always forms a current mirror with transistor 34 and a current flows through the branch of the substitute source. In an alternative embodiment, a switch may also be provided here that operates in the opposite direction to the switching device 70, i.e., it de-energizes the substitute source, for example, when a voltage is applied to the load or a current is provided by the current source 30.

Now, in one operation of the supply circuit, let the switching device 70 be connected so that the node 71 is connected to the node 72 and simultaneously the gates of the transistors 34 and 36 are connected together. The power source then provides an output current to the load. This carries a voltage drop across the light emitting diode 60, which is in the order of a few volts, for example 2 to 3 volts. The voltage drop is detected as an error signal by the differential amplifier of the detector 20 and compared with the reference signal. If the current through the light emitting diode now changes, for example due to a change in temperature, the error signal also changes and the detector generates a correction signal for the current mirror at the correction signal output 21 and feeds this to the control signal terminal 31.

The correction signal is now also applied to the gate of output transistor 36, so the current is adjusted accordingly. The error detector 20 controls the output current mirror so that saturation voltage of both inverting and non-inverting transistors 27 and 28 is the same. Using the error detector 20 and the current mirror connected to the output, a load-independent current source is formed.

Since light emitting diodes are often operated with pulse width modulation, the current through the diode changes at defined intervals, i.e. the diode is switched on or off with high frequency. The pulse width gives the brightness of the diode 60, and the switching device 70 in the current mirror is used for this purpose. However, if the current is switched off, the fault detector 20 counteracts this for the first time. This can cause it to periodically run out of its optimum modulation range. The same happens when the current is switched on. Here, the differential amplifier needs some time until it reaches its normal control range. In addition, oscillation or overshoot can occur, which reduces the life of the diode, but can also be visible to a user. The second switching device 70 prevents this by using the substitute source to keep the error detector in its modulating range.

Figure 24:
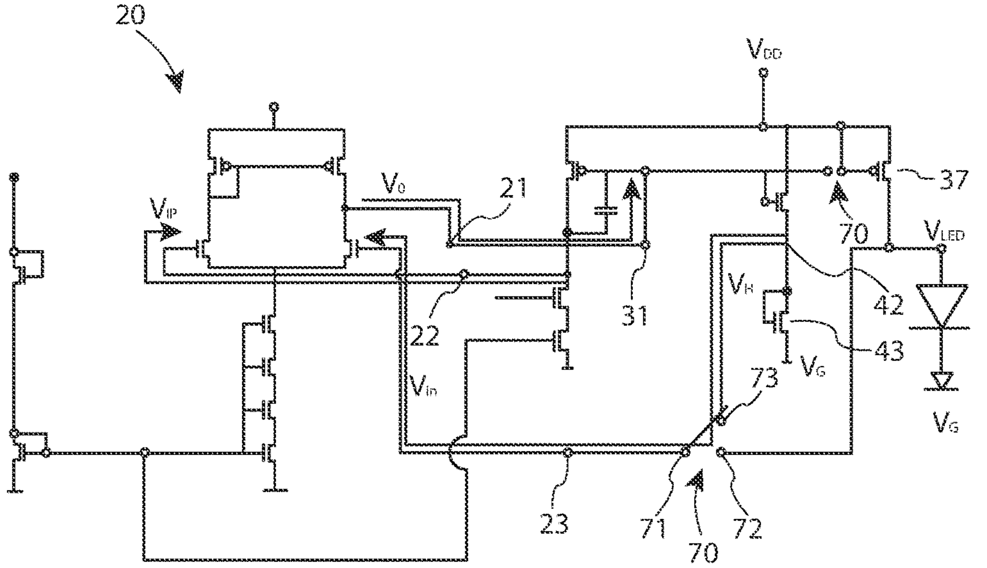
FIG. 24 shows the version of FIG. 23 in an operating state with additional information on the signal flow.

FIG. 24 shows a diagram with the main signal flows. With a diode off, the gate of the p-type field effect transistor 36 of the output branch is directly connected to the supply potential VDD. The lower switching device 70 connects the tap 42 of the substitute source 40 to the error signal input 23 of the detector 20. The substitute source mirrors the current with a lower ratio and the second transistor connected in series serves for the necessary voltage generation. This is selected to be close to the expected voltage drop of the load during normal operation. This keeps the fault detector in its modulating range and the control loop in its steady state.

Figure 25:
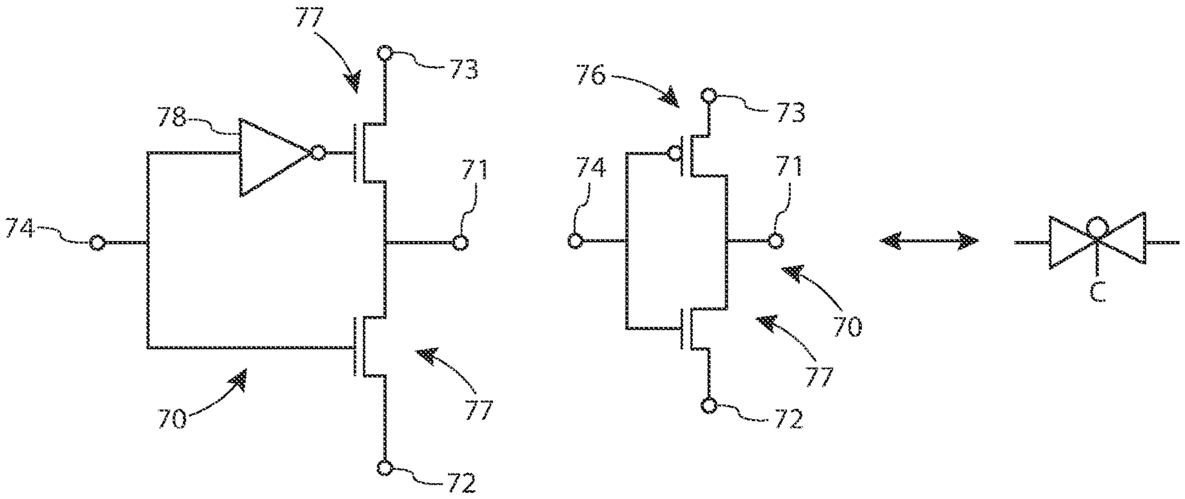
FIG. 25 shows two schematic diagrams of two simple switch devices.

FIG. 25 shows two schematic diagrams of two simple switch devices. Besides these, other switches can also be used. In addition, they can be easily operated with the PWM signal, which can be used to adjust the brightness of the light emitting diode. In other applications, other suitable switches are used.

The switching device 70 is similar in construction to a known inverter with the difference that the transistors shown here again represent transmission gates. The output 71 is connected to the error signal input. Input 74 forms the switching input to which the switching signal, for example the PWM signal, is fed. Two transmission gates of different types are connected in series, with output 71 between the two transmission gates. The gate 73 of the p-type forms the connection to the substitute source with its terminal 73. The terminal 72 of the second transmission gate forms the connection for the voltage signal.

Figure 26:
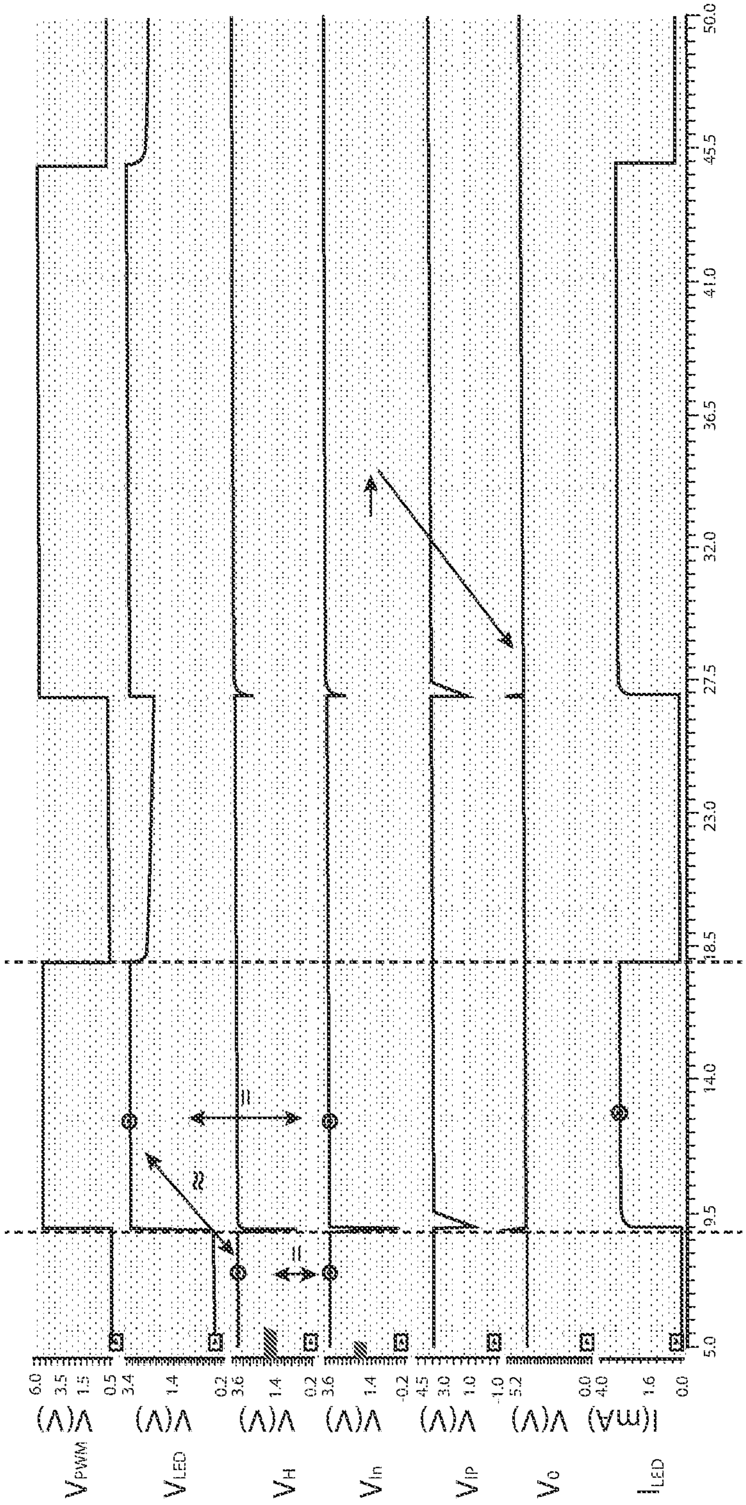
FIG. 26 illustrates a signal-time diagram of the proposed embodiment with the signal points shown in FIG. 23.

FIG. 26 shows a signal-time diagram for various signals in the power supply circuit in the various operating states. $V_{PWM}$ describes the pulse width modulation signal to operate the light emitting diode 60. This signal is also applied to the circuit devices 70. It is a logic signal and alternates between two states "High" and "Low". In the High state from about 8 μs to 18 μs and then between 26 μs and 44 μs, the light emitting diode is on, and at other times it is off. The current through the light emitting diode follows these switching times as can be seen from the lowest curve marked $I_{LED}$.

In contrast, the voltage VLED changes only slightly between the on state and the off state. The voltage drops continuously and would reach the onset voltage of approx. 1.4V with the passage of time, a current no longer flows, i.e. the light emitting diode is switched off. When the light emitting diode is switched on, i.e. at the time 8 μs, the voltage drop across the light emitting diode essentially corresponds to the substitute voltage or substitute signal $V_H$. At the switch-on time, a small voltage drop can be seen in the substitute signal, which may be process-related and depends, for example, on the parameters of the field-effect transistors used. Since different types (p- or n-mos) are used, their switching behavior is not always the same, so that residual currents could still flow during the switchover time.

$V_{in}$ shows the signal waveform at the inverting input, i.e. the error signal input 23. Before the switching time 8 μs, the voltage $V_H$ is equal to the voltage at the error signal input because of the position of the switching device 70, after switching on it is equal to the voltage $V_{LED}$. This is illustrated by the sign "=" in FIG. 26. $V_H$ is again chosen to be as similar as possible to the LED voltage $V_{LED}$ expected in normal operation.

The error correction detector 20 now compares the voltages $V_{in}$ at the error signal input 23 and Vip at the reference input 22 and generates a correction signal Vo from them. At the switching time 8 μs there is a small dip in the voltage $V_{ip}$ at the non-inverting input, which increases a small peak in the correction signal. This is possibly a simulation artifact, but may also be caused because of a sudden change in load on the current source branch. In any case, the correction signal is so small and fast that it has no effect.

The second switching time at 18 μs shows none or if only a significantly lower behavior. Nevertheless, the control at the switch-on time does not significantly affect the fault detector in its modulation behavior, but provides a precise correction signal due to the fast feedback, so that the output current and voltage is quickly controlled to the desired value and then remains constant. In this context, the simulation of FIG. 26 shows a regulation of less than 0.5 μs.

The proposed supply circuit provides a highly accurate current source that is particularly suitable for precise and color-true control of light-emitting diode applications. Thereby, the already known PWM can be further used for contrast adjustment of the individual light emitting diodes in a pixel matrix, display or similar. The impact of switching operations during pulse width modulation on the current source is reduced by the proposed measures. As a result, even small variations in the operating current, which are only a few percent above the nominal value of the input voltage, can be realized without the stability being affected by the switching operations.

In an implementation, it is also advisable to build the transistors of the current source spatially close to each other, so that they are strongly thermally coupled to each other. The substitute branch can be equipped with Si-pn diodes or other measures, such as amplifiers, etc., to bring the substitute signal closer to the voltage that drops across the load during operation.

To control LEDs or pixels in general in a display or video wall, the switching ratio can be controlled digitally in addition to setting the current through the LEDs. With a digital driver circuit with low own power consumption a large number of optoelectronic elements and LEDs in particular can still be driven despite the low power consumption.

Figure 9:
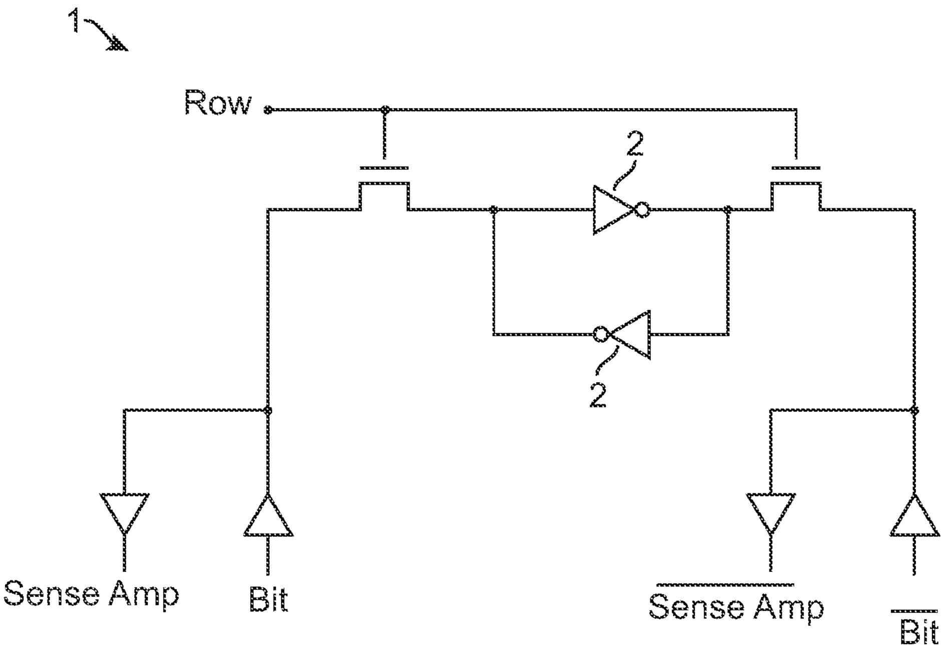
FIG. 9 shows a circuit diagram of an SRAM 6 T cell to illustrate some aspects.

FIG. 9 illustrates a schematic circuit diagram of an embodiment of a 6-T static random access memory cell, SRAM-6-T memory cell 1, which includes two cross-coupled inverters 2 as a 1-bit memory. The SRAM-6-T memory cell 1 has a compact memory size in the range of 1.08 μm2 to 1.7 μm2 per bit in 65 nm CMOS technology and low power in the range of 0.26 μm to 0.37 μW per bit.

Figure 10:
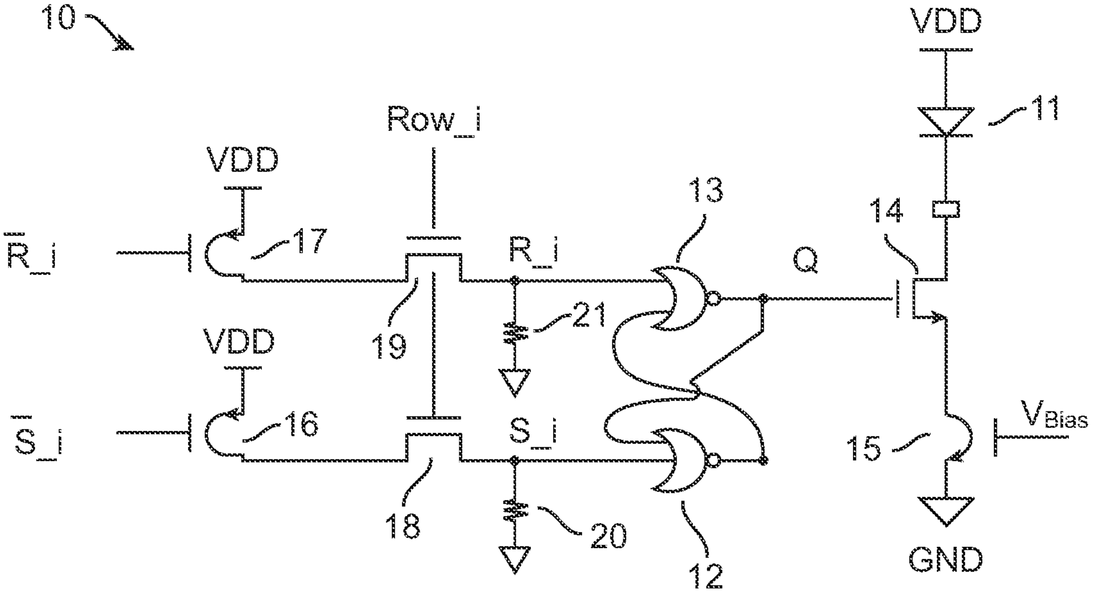
FIG. 10 shows a circuitry version of a driver circuit to illustrate some aspects.

FIG. 10 illustrates a schematic circuit diagram of one embodiment of a driver circuit 10 configured to drive an optoelectronic element, which is an LED 11. The driver circuit 10 is fully digital and is fabricated using CMOS technology. In this context, FIG. 10 shows only the circuit diagram. The LED 11 is fabricated in a material system suitable for producing light of the desired wavelength, and the circuit may be fabricated in another material system. For the functionality shown, both elements are electrically contacted. Possibilities for this are disclosed in this application.

The driver circuit 10 includes two cross-coupled NOR gates 12, 13 that form a first memory cell or latch used to control current through the LED 11. The driver circuit 10 includes additional first memory cells not shown in FIG. 10. The additional first memory cells have the same structure as the first memory cell shown in FIG. 9 and are used to control current through additional LEDs.

Each of the NOR gates 12, 13 has two inputs and one output. The output of each NOR gate 12, 13 is coupled to one of the inputs of the other NOR gate 12, 13. The other input of NOR gate 12 receives a set signal S_i, and the other input of NOR gate 13 receives a reset signal R_i. The NOR gate 13 generates a signal Q at its output, which controls the gate of a transistor 14. The circuit shown consisting of the two NOR gates 12 and 13 with their inputs R_i, S_i and the output Q corresponds to an RS flip-flop. Accordingly, the NOR gates connected in this way can be replaced in the circuits shown.

Depending on its gate voltage, transistor 14 switches a current through LED 11 on or off. The current is generated by a transistor 15. LED 11 and the channels of transistors 14, 15 are connected in series between a supply voltage VDD and ground GND. The driver circuit 10 further includes two pull-up PMOS transistors 16, 17, each coupled to transistors 18, 19. The transistors 16, 17 receive a non-S_i signal and a non-R_i signal, respectively, at the gate terminals.

LED 11 is arranged together with other LEDs in a pixel array. Each of the LEDs is connected to a driver circuit, as shown in FIG. 10. To enable the selection of a row i, transistors 18, 19 are respectively coupled to NOR gates 12, 13. Transistors 18, 19 are controlled by a row select signal row i at the gate terminals. Pull-down resistors 20, 21 are also provided to hold back states of the cross-coupled NOR gates 12, 13. When the set non-signal S_i (active low set) is received by the NOR gate 12, the output of the NOR gate 13 is triggered to a high state. The cross-coupled NOR gates 12, 13 hold the high state until they are reset to a low state by the reset non-R_i (active low set) signal received by NOR gate 13.

Figure 11:
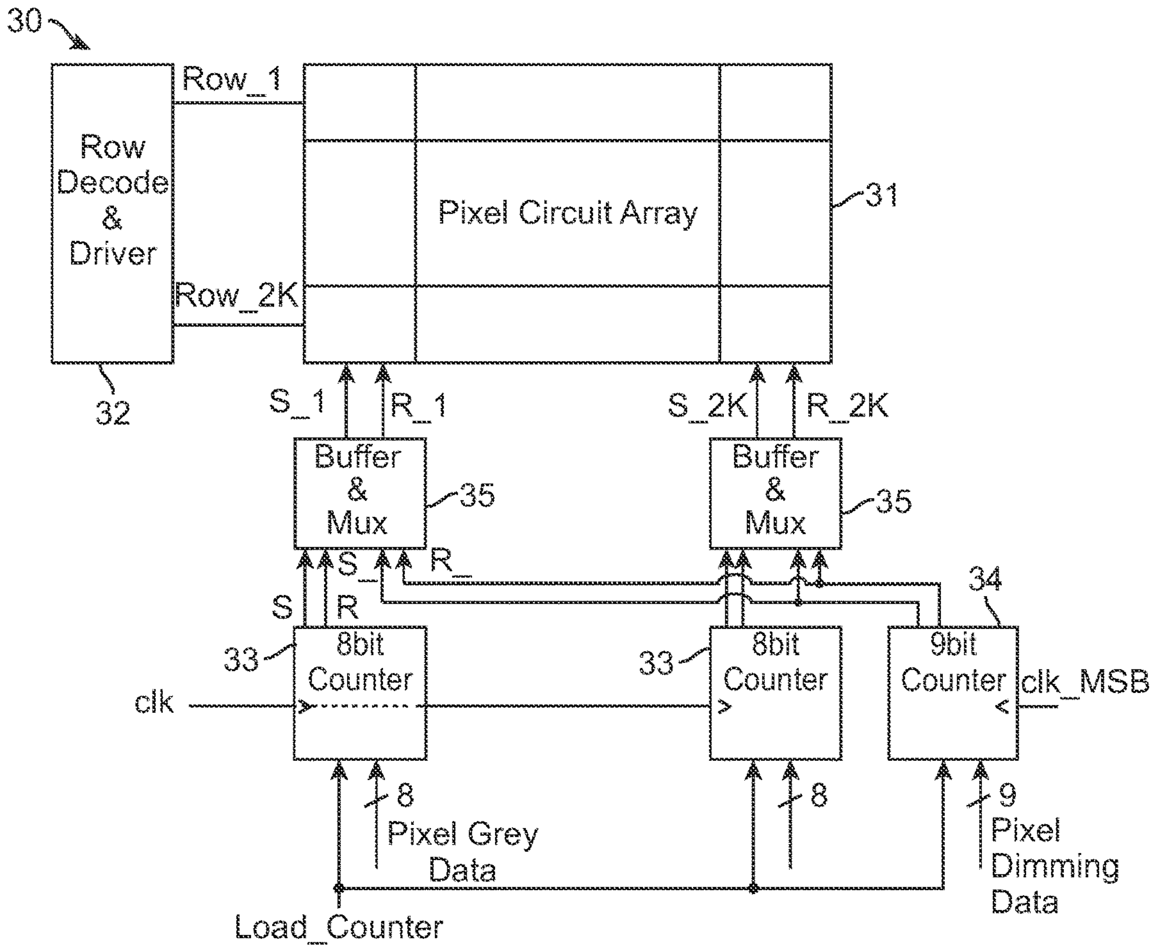
FIG. 11 is a schematic representation of a display having digital elements and the pixel array according to some of the proposed aspects.

FIG. 11 shows a schematic circuit diagram of one embodiment of an optoelectronic device 30. The optoelectronic device 30 includes a pixel circuit array 31 comprising an array of LED driver circuits 10, as shown in FIG. 10. As an example, the array includes 2K rows and 2K columns. Each driver circuit 10 is connected to a respective LED. In addition, the LED array is made of a different III/IV material chip and each LED in the array is connected to each pixel driver circuit at the drain of transistor 14 in FIG. 10.

A line decoder and driver 32 selects lines line_1 to line_2K in sequence. The PWM signals that control the current through the LEDs are generated by N loadable 8-bit counters 33, where N is 2K for this example. The N counters 33 generate the set signals S_i and the reset signals R_i (or alternatively the non-S_i and non-R_i signals) for N columns of pixels simultaneously per selected row. When pixel pulse width values, i.e., 8-bit pixel gray data, are loaded into the counters 33, the set signals S_i are activated to turn on the pixel stream, and the counters 33 start at a pixel clock frequency of, for example, between 40 MHz to 100 MHz. When the counters 33 reach the pixel data values, the reset signals R_i are activated to turn off the pixel stream.

Further, there is a 9-bit (MSB) counter 34 that generates the global or common dimming for the pixel array. The 9-bit pixel dimming data loaded into counter 34 thus determines the brightness of the background of the pixel array. If the dimming pulse width is zero, then a row scan is performed so that the pixels in the rows light up. Otherwise, global pixel illumination is performed first, followed by line-by-line scanning. The set signals S_i and reset signals R_i generated by the counters 33 and the global or common dimming signals generated by the counter 34 are supplied to N buffers and multiplexers 35, which pass the signals to the columns of the pixel circuit array 31.

The global dimming data can also be combined with the grayscale data in the video/image signal processor IC or by the LED driver IC so that no separate global dimming pulse is needed and then only the grayscale data is updated line by line. The counters 33, 34 are controlled by a load counter signal. Furthermore, the counters 33 receive a clock signal clk. The counter 34 receives a clock signal clk-MSB.

Figure 12:
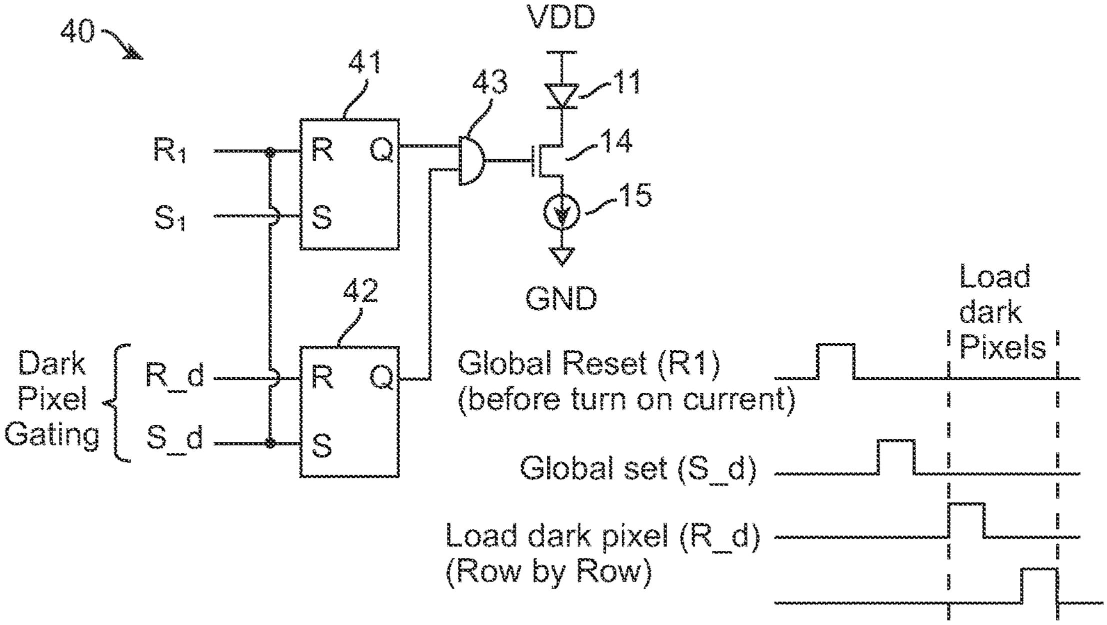
FIG. 12 shows a circuit to illustrate the clock curve for dark pixels.

To pattern out dark pixels, the driver circuit may include a second memory cell or latch for each LED. FIG. 12 illustrates a schematic circuit diagram of an embodiment of a driver circuit 40 based on the driver circuit 10 illustrated in FIG. 10. The driver circuit 40 includes a first memory cell 41 and a second memory cell 42. Both the first memory cell 41 and the second memory cell 42 include a set input S, a reset input R, and an output Q. Further, the reset input R of the first memory cell 41 is connected to the set input S of the second memory cell 42. The outputs Q of the first and second memory cells 41, 42 are connected to inputs of an AND gate 43. The output of the AND gate 43 is connected to the gate of the transistor 14.

Figure 13:
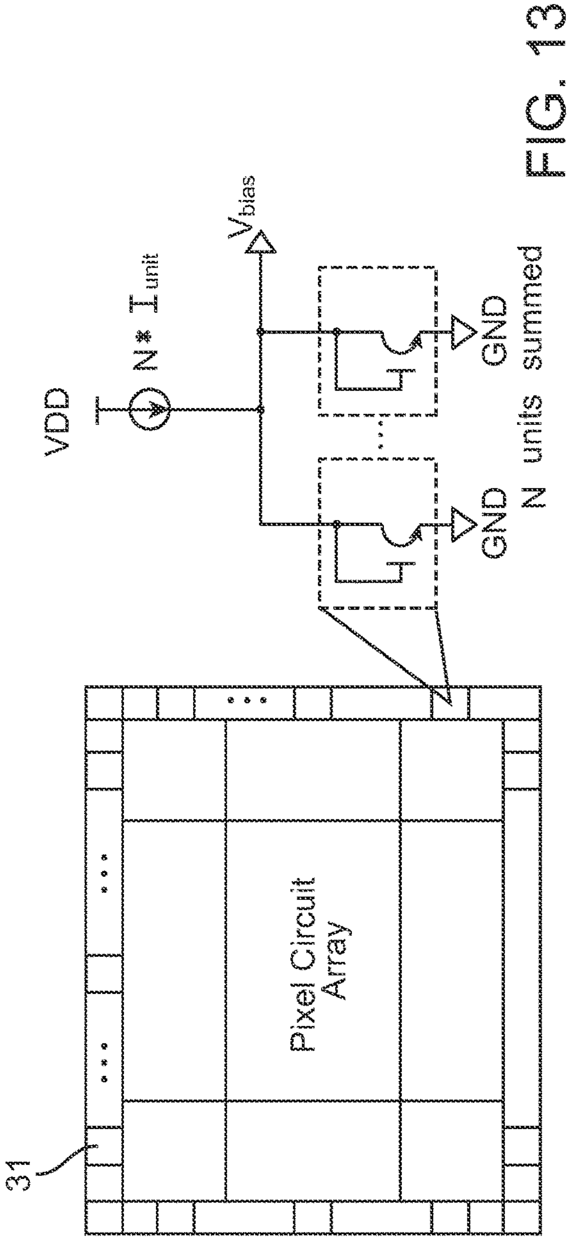
FIG. 13 is a representation of a global bias for the pixel stream according to some aspects.

As can be seen from the function timing diagram shown in FIG. 12, a global reset is performed at the beginning of each frame so that all pixels are dark. Then a global set signal S d is applied to the set inputs S of the second memory cells 42 to make all pixels "normal pixels". Then, the second memory cells 42 of the pixel circuit array are loaded or reset row by row to implement selective dark pixels. One embodiment of the optoelectronic device includes a spatial averaging pixel bias current. The optoelectronic device includes an N-bit global digital-to-analog converter, DAC, covering a pixel current range of, for example, 22 nA to 1 μA. As illustrated in FIG. 13, peripheral identical bias currents are summed to produce a spatial averaging bias.

Figure 14:
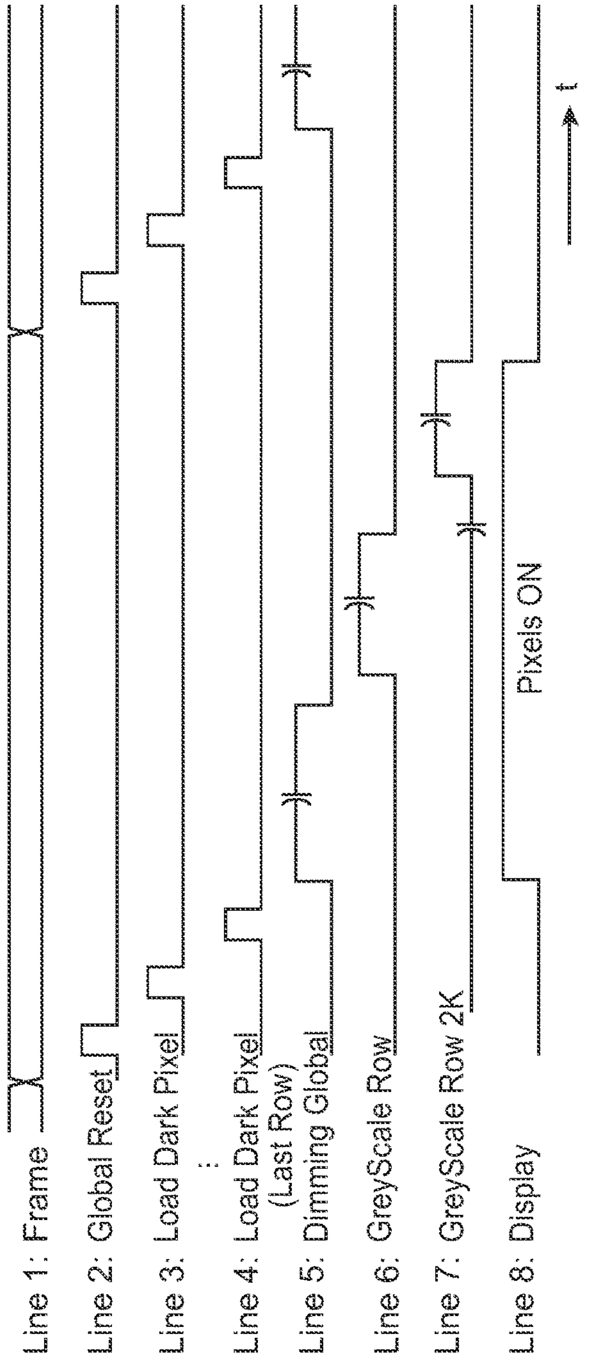
FIG. 14 shows a signal-time diagram with some signals according to the embodiment of FIG. 11.

The switching on and off of the pixel current is controlled by the state of the second memory cell or latch for dark pixels and the PWM signal for normal active pixels. FIG. 14 illustrates a functional timing diagram of the optoelectronic device. Line 1 of the function time diagram shows the duration of one frame. During the frame, a content, for example a video sequence, is shown on the display.

Figure 15:
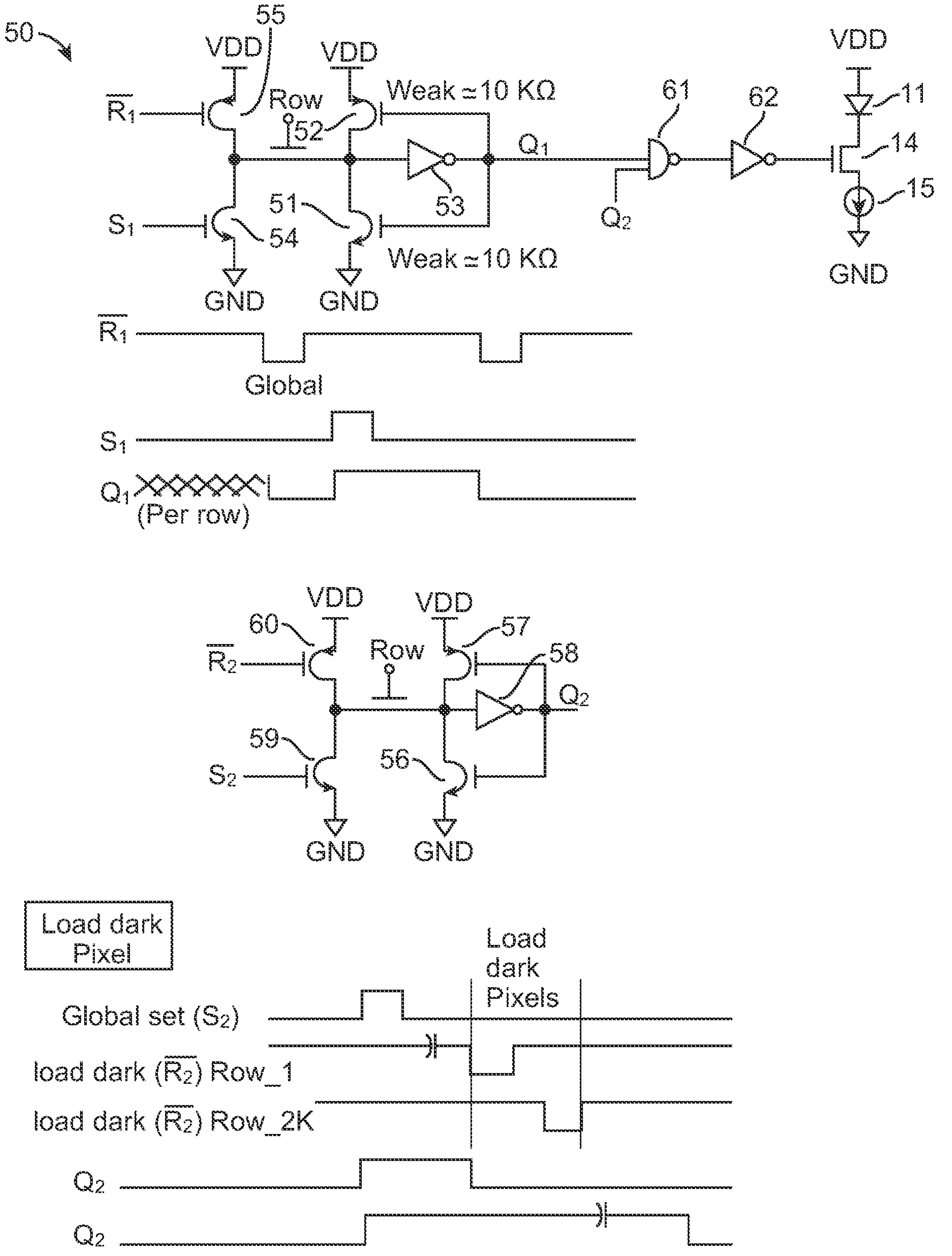
FIG. 15 shows another embodiment of a driver circuit with reduced space consumption.

At the beginning of the frame, a global reset is performed so that all pixels of the display are dark (see line 2). Then dark pixels are loaded line by line so that these pixels are permanently dark during this frame (see lines 3 to 4). Then, global dimming is applied to ensure that the background has the same brightness (see line 5). Then grayscale data is loaded to create the PWM signals that start at line_1 and end at line_2K (see lines 6 to 7). Finally, line 8 shows when the pixels are turned on. After the frame ends, the next frame begins. FIG. 15 illustrates a schematic circuit diagram of another embodiment of a driver circuit 50 configured to drive LED 11. The driver circuit 50 is fully digital and requires even less area than the driver circuit 10 shown in FIG. 10.

In the driver circuit 50, the first memory cell includes an NMOS transistor 51 and a PMOS transistor 52 connected in series between the supply voltage VDD and ground GND, which means that the channels of the two transistors 51, 52 are connected in series. In addition, an input of an inverter 53 is connected between transistors 51 and 52. The output of the inverter 53 is connected to the gates of the transistors 51, 52.

Furthermore, an NMOS transistor 54 and a PMOS transistor 55 are connected in series between the supply voltage VDD and ground GND. The transistors 54, 55 receive a set signal S1 and a reset signal non-R1, respectively, at their gate terminals. To pattern out dark pixels, driver circuit 50 includes a second memory cell or latch having the same structure as the first memory cell and also illustrated in FIG. 15. The second memory cell includes an NMOS transistor 56 and a PMOS transistor 57 connected in series, an inverter 58, and an NMOS transistor 59 and a PMOS transistor 60 connected in series.

The transistors 59, 60 receive a set signal S2 and a reset signal non-R2, respectively, at their gate terminals. The output of the inverter 53 of the first memory cell generates a signal Q1 and the output of the inverter 58 of the second memory cell generates a signal Q2. The signals Q1 and Q2 are fed into the inputs of a NAND gate 61. An inverter 62 is located downstream of the NAND gate 61, and the output of the inverter 62 is coupled to the gate of the transistor 14 that turns the current through the LED 11 on and off depending on its gate voltage.

The functional timing diagram of FIG. 15 shown above makes it clear that a global reset is first performed by applying the reset signal non-R1 to the first memory cell. Then the set signal S1 is applied to trigger the first memory cell to the high state at the output Q1. The first memory cell holds the high state until it is reset to the low state by the reset signal not-R1. A lower function timing diagram of FIG. 15 shows the function of the second memory cell during dark pixel loading. First, a global set signal is applied by signals S2. Then dark pixels are loaded line by line by the reset signal non-R2.

Figure 16:
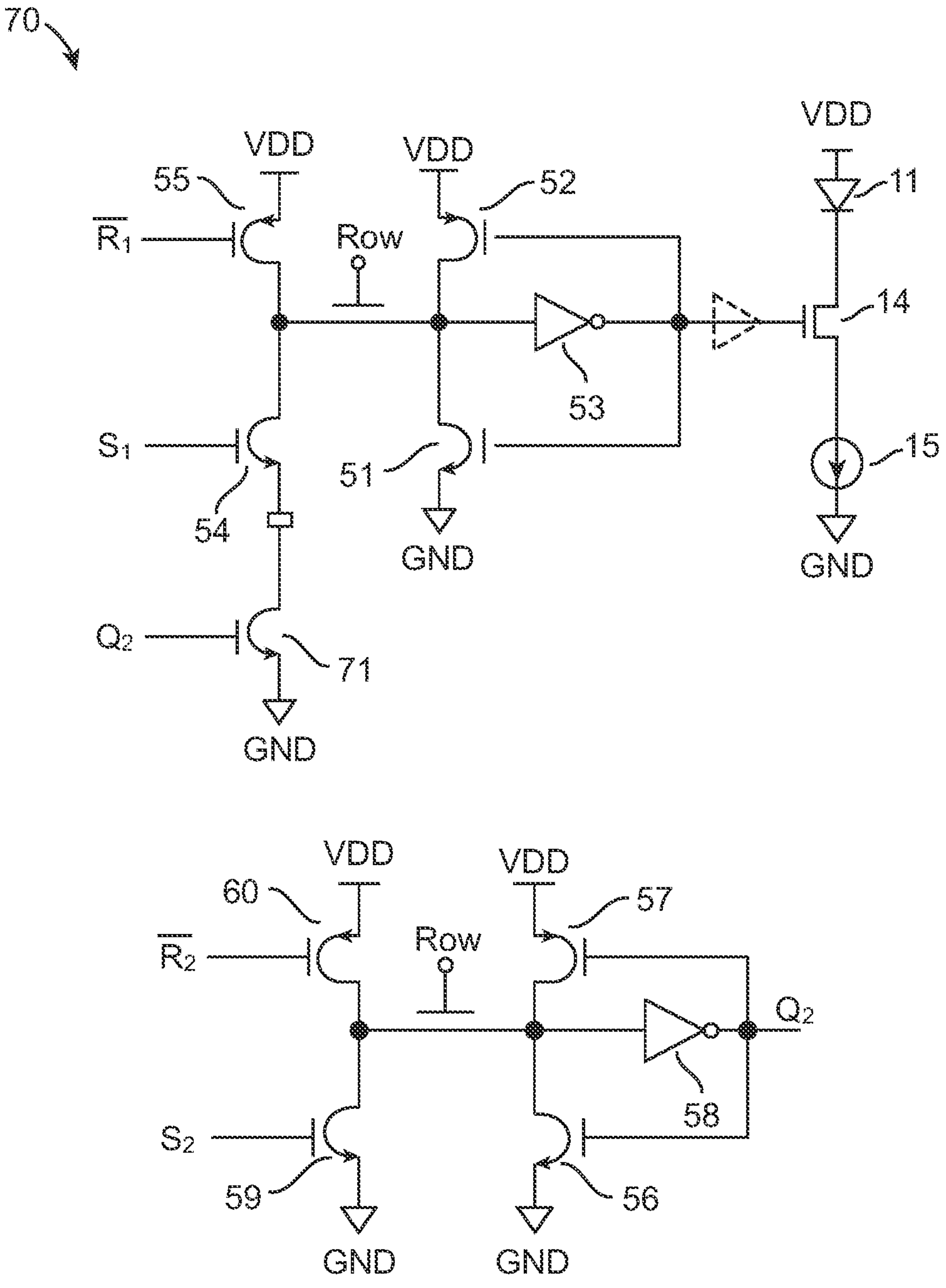
FIG. 16 shows embodiments of a further driver circuit which also has reduced space consumption.

FIG. 16 illustrates a schematic circuit diagram of another embodiment of a driver circuit 70 that is a variation of the driver circuit 50 shown in FIG. 15. The driver circuit 70 includes the same first and second memory cells as the driver circuit 50, but the driver circuit 70 does not include a NAND gate for combining the outputs of the first and second memory cells. Instead, the driver circuit 70 includes an additional NMOS transistor 71 connected in series with the transistor 54. In particular, the transistor 71 is arranged between the transistor 54 and ground GND. The gate of the transistor 71 is controlled by the output signal Q2 of the second memory cell.

Figure 27:
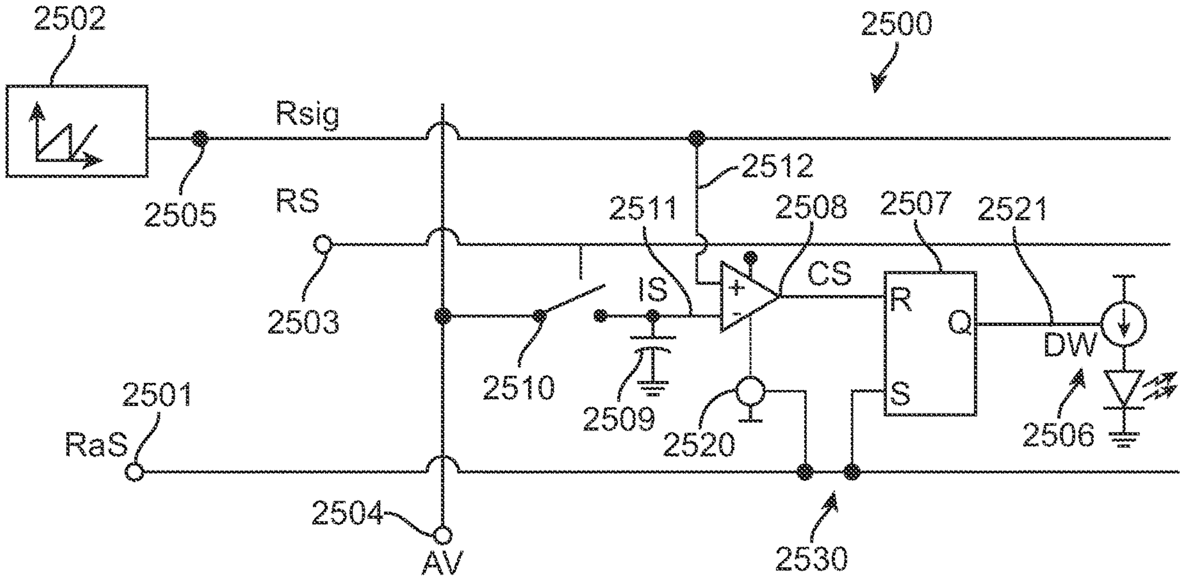
FIG. 27 shows an illustrative embodiment of an analog ramp-based control circuit suitable for controlling the on/off ratio for light emitting devices in an LED display.

FIG. 27 illustrates one embodiment of an analog ramp for current control in the form of a control circuit 2500 that includes a pixel driver. It is built in a semiconductor material and uses various techniques described herein. One such concept is based on a analog ramp for light control is realized with a small number of components and shows hysteresis in operation, which will reduce noise as well as make double buffering possible. Double buffering allows longer duty cycles, which reduces overall power consumption. This aspect can be advantageous, especially when combined with other power saving features.

The control circuit comprises a pixel driver as a combination of a pulse generator 2530 with a column data buffer as an input stage. A common ramp generator 2502, which can also be used for multiple pixels 2506, e.g., of a row or column, is part of the control circuit in this embodiment. The control circuit has its output 2521 coupled to a control input of a customizable current source of an LED pixel. The current source can be selectively enabled and disabled based on a pulse signal DW applied to the control input of the adaptable current source. In response to the pulse signal DW, the LED is turned on or off. In an alternative embodiment, the current source may be replaced by a switch or similar element to ensure that the LED is selectively turned on or off. The pulse length of signal DW corresponds to the brightness of the LED element of the pixel.

The control circuit 2500 includes a row selection input 2503 for the row selection signal RS and a column data input 2504 for the data signal AV. These inputs are similar to the conventional approach and, in fact, may be used in a similar manner. The control circuit also comprises a trigger input 2501 for a trigger or "ramp start" signal RaS and a ramp signal input 2505 for a ramp signal.

Figure 42:
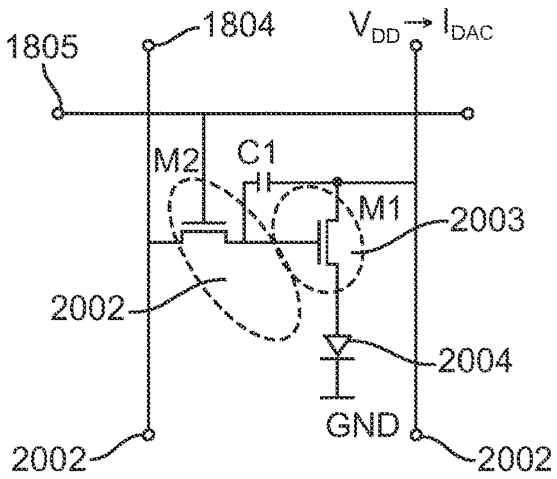
FIG. 42 illustrates a conventional approach to a driver circuit for an LED in a pixel of a display.

Similar to the conventional cell shown in FIG. 42, the column data input is connected to a capacitor 2509 via a switch 2510 to store data information corresponding to the brightness of the LED within the capacitor 2509.

Switch 2510 is implemented as described here as a field effect transistor in Si technology or also in Ga or In technology. The gate or control input of switch 2510 is connected to the line select input to obtain the line select signal RS. However, while the conventional approach, uses the charge stored in the capacitor to control the current directly through the light emitting device, capacitor 2509 is used together with switch 2510 as an input buffer. The output 2511 of the input buffer, and in particular the capacitor and switch, are connected to the pulse generator 2530 to generate a pulse.

Pulse generator 2530 comprises a comparator 2508 that includes, for example, a differential amplifier and an output buffer stage 2507 implemented as an RS flip-flop whose behavior can be expressed using NOR and NAND gates.

The differential amplifier is implemented using the same technology as the switch 2510. For this purpose, it may comprise, for example, transistors as described in this application. The inverting input 2511 of the comparator is connected to the capacitor 2509, and the non-inverting input 2512 is connected to the ramp input signals 2505. Comparator 2508 can be selectively turned off to reduce power consumption as explained in detail later.

Comparator 2508 provides a status signal or comparison result CS at its output. The output of the comparator is directly connected to the reset input R of the RS flip-flop 2507. The set input S is connected to the trigger input 2501.

Figure 28:
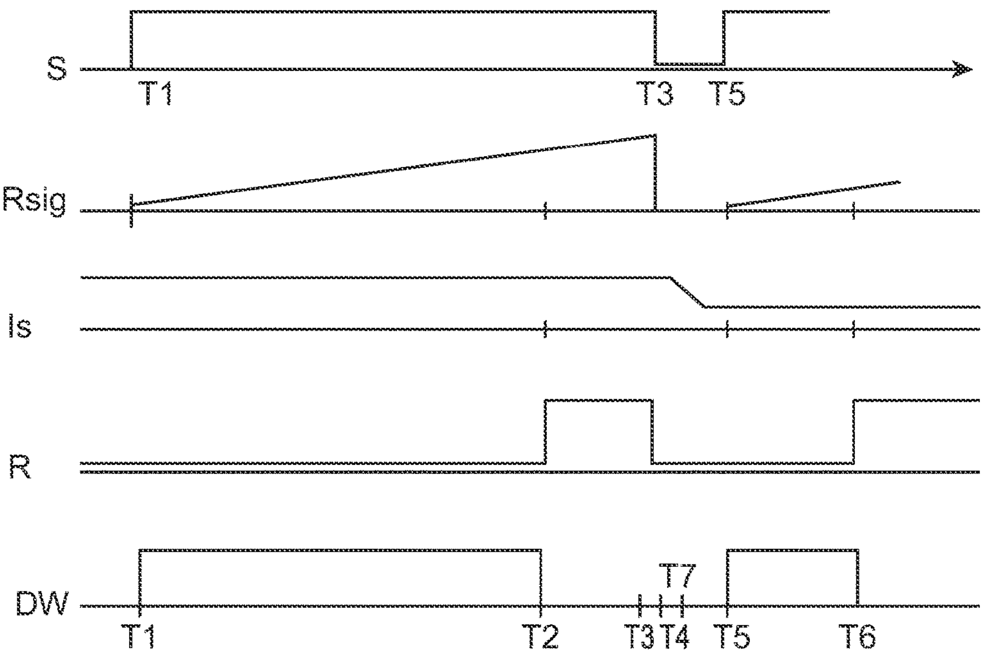
FIG. 28 illustrates a signal time diagram with different signals of the concept according to FIG. 27.

The operation of the control circuit is explained in more detail with reference to the various signals illustrated over time in FIG. 28. Assume that the line select signal RS is applied and a constant charge is applied to the capacitor 2509. A constant signal IS is applied to the non-inverting input of the comparator (corresponding to reference 2512). Signal IS corresponds to the brightness of the LED associated with the control circuit.

At time T1 the trigger signal RaS changes from a low level LOW to a high level HIGH and subsequently the set input S of the RS flip-flop 2507 also goes HIGH. At time T3, the trigger signal RaS will change back to the level LOW. Ramp signal Rsig is applied at the same time T1. Ramp signal Rsig is linearly increasing over the time the trigger is HIGH. That is, ramp signal Rsig starts from a first value corresponding to LOW and rises to a second level, i.e., the HIGH level. Ramp signal Rsig is also applied to the non-inverting input of the comparator. During the time period from T1 to T2, the comparator compares the signal IS buffered in capacitor 2509 with ramp signal Rsig. As long as the signal at the non-inverting input is lower than the inverting input, the output signal applied to the reset input R of the RS flip-flop remains LOW. At time T2, the reset input R receives the rising edge of the result signal CS when the output of the comparator changes from LOW to HIGH. At the time, the ramp signal becomes higher than the buffered signal IS.

As a result of this transition, the output Q of the RS flip-flop resets the control signal DW for the current source to LOW value from the time T2. It can thus be seen that the time T2 at which the output signal DW switches the current source off again thus depends on the charge stored in the capacitor 2509, provided that a uniformly increasing ramp Rsig is assumed. Thus, the ramp signal RSig and the signal IS define a pulse whose length essentially corresponds to the time duration from T0 to T2.

At time T3 the trigger signal goes from HIGH to "LOW". At the same time the ramp signal is turned off, which causes the comparator to output a "LOW" signal. Therefore, both signals at the R and S input will transition to LOW. Because of a small hysteresis in the comparator, the transition for the trigger signal at the S input will be a little faster, causing the flip-flop to leave the output signal DW off LOW regardless of the transition of signal CS at the R input. At time T5, trigger signal RaS repeats at input S. Likewise, ramp signal Rsig starts again at its initial value.

The period between time T3 to T5 is the blanking time used for reprogramming the corresponding columns in each row. For this purpose, the row selection signal is triggered at time T7, which connects the column data line to the capacitor via switch 2510. Capacitor 2509 is then charged or discharged to a new value. In the present example, capacitor 2509 is discharged to a much smaller value corresponding to a different (lower) brightness. Recharging is initiated at time T7 and ends at time T4, at which time the row select signal RS goes LOW again, opening the switch. Another row can be addressed and reprogrammed while the cycle for the present row restarts at time T5.

Because of the lower level for signal IS, comparator 2508 now changes its output much earlier at time T6 in the new cycle. Consequently, output Q drops to "LOW" at time T6, which is much shorter than for the previous time period of trigger signal RaS. Output Q with its control signal DW controls the current through the LED coupled to it. The longer the output signal DW remains HIGH, the longer a current flows through the LED, resulting in a large brightness for the corresponding color. Comparator 2508 and perhaps the RS flip-flop may be turned off during the reprogramming and blanking period to reduce power consumption. For this purpose, at least the comparator comprises a power control unit 2520 connected to the trigger input. As long as the trigger signal Rsig is HIGH, the comparator 2508 is powered to perform its operation. During the sampling period, it is OFF in response to the trigger signal.

Since in some examples the sampling time can be significantly longer than the current time for the trigger signal, the whole pulse generator can be switched off.

In an alternative embodiment, reference is again made to time T2 in FIG. 28. The comparator switches its output signal CS from LOW to HIGH as soon as the ramp signal reaches the threshold of the buffered signal IS. Trigger signal S is still HIGH, which causes the RS flip-flops to switch the output signal to LOW. As can be seen, the output Q remains LOW regardless of the level at the reset input R. Therefore, the comparator could be turned off after a reset because of the transition of the signal at input R. In some embodiments, the power control unit 2520 may be coupled to the output Q to control the power supply to the comparator based on the state of the output Q.

Segmentation and additional ramps can be used when addressing different lines. This would allow spatio-temporal multiplexing to be implemented, reducing the generation of current spikes and resulting in less varying power consumption. While in the present example signals were applied to specific inputs on the comparator, the skilled person can see that the design of this principle can be modified. For example, inverting and non-inverting inputs can be interchanged, resulting in inverse behavior. The RS flip-flop requires two transistors and resistors, which implements a small asymmetry during the design in the RS flip-flop (e.g., by adjusting the value of one resistor), adjusts the switching behavior and will prevent undefined states.

Some displays or video walls may have single pixel errors where the LEDs are damaged. Such errors cannot be avoided. However, repairing a display or video wall is only possible at great expense. Therefore, it is suggested not only to design subpixels redundantly, i.e. to provide more than one subpixel of the same color, but provide redundant LED branches with selection fuse. These redundant pixels can also be connected to the same power source. The functionality of each LED is now checked in a test. If the test results in two functional LEDs, one of them can be specifically deactivated to compensate for color changes or brightness loss of the other Led due to the different current flow. If, on the other hand, a fault is detected, the redundant LED continues to be used.

Figure 29:
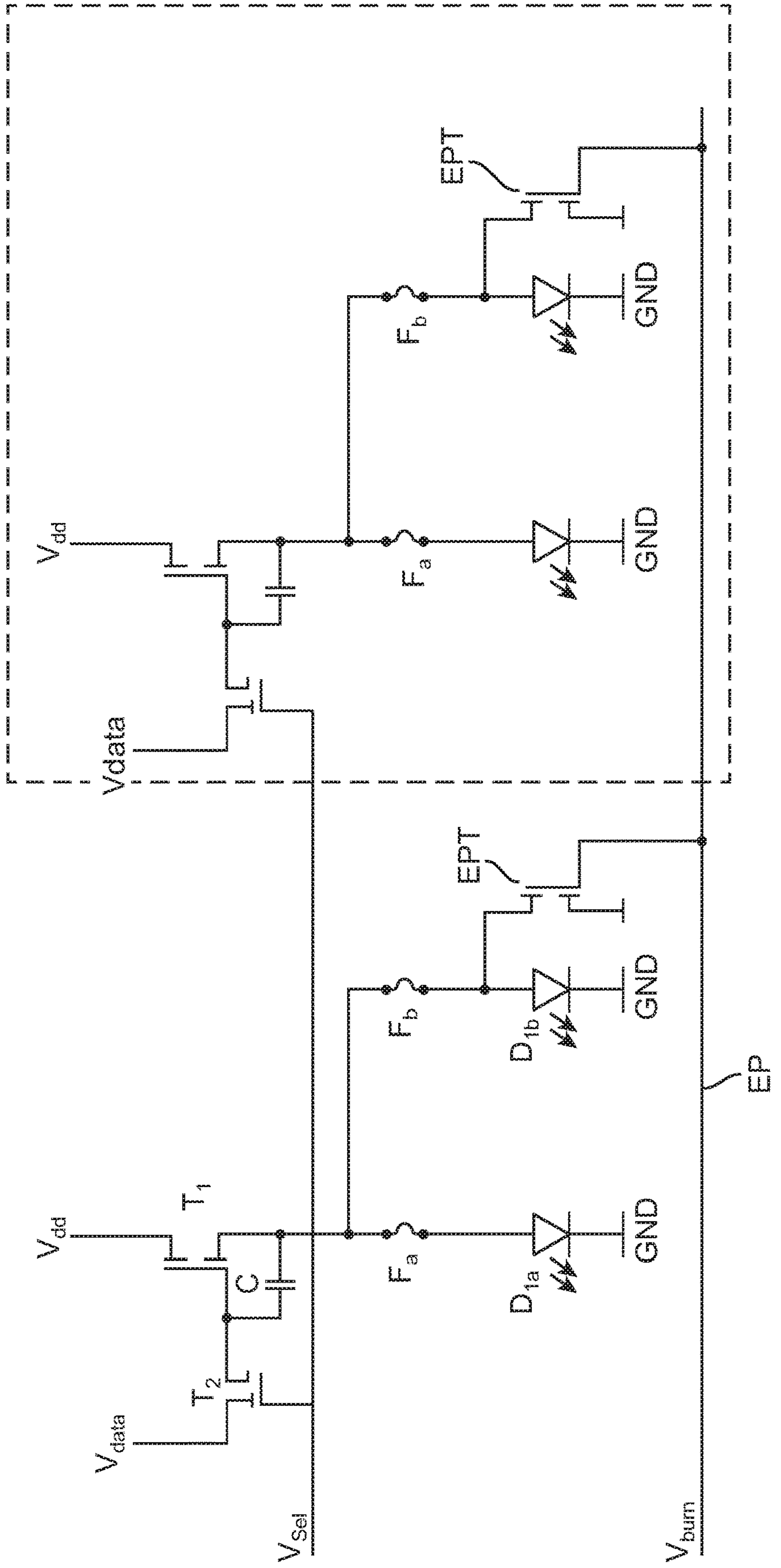
FIG. 29 shows a circuit diagram of a pixel cell with redundant LEDs and fuses to separate one LED.

FIG. 29 shows an example of a proposed device that provides such redundancy while ensuring selection. The illustration shows two pixel cells, each with a first and second branch, each with an LED D1*a* and D1*b*, respectively. LEDs D1*a* and D1*b* are connected to a common reference potential terminal GND. Their other terminals are each connected to an electronic fuse Fa and Fb. These are, for example, a fuse, which melts when the current through the fuse becomes large enough. The second branch, i.e. the branch with the fuse Fb and the LED D1*b* also shows an imprint component EPT. This is of the MSOFET transistor type with its drain connected between the fuse and the LED. Its source contact goes to the common reference potential, and the gate can be supplied with the selection signal Vburn via the imprint signal line EP die. Basically, lines or alternatively columns can be addressed, controlled or selected by means of the imprint signal line EP, depending on the wiring.

In addition, the pixel cell comprises a 2T1C circuit with a current-driving transistor T1. This is connected to the supply potential on the one hand and to the first and second branches and their fuses Fa and Fb on the other. A charge storage C is electrically connected to the gate of the first transistor T1 as well as to the source terminal of the first transistor T1. Furthermore, the "t1C cell also includes a transistor T2 connected between the data terminal Vdata and the gate of the transistor T1. The selection signal can be applied to its gate.

For each color of a pixel, two LEDs D1*a* and D1*b*, each electrically connected in series to an electrical fuse Fa and Fb, can be provided. In this way, redundancy is created for all subpixels for each pixel.

In the event that LEDs are electrically connected along a row and along a column respectively to a common imprint signal line EP, each pixel cell of a column, for example, can be electrically connected and addressable to the supply potential connection VDD by means of a common supply line to a switching transistor arranged on a common carrier outside the active display. Fuses of a column can thus be tripped or caused to melt.

In the following, the operation of this circuit is explained in more detail.

In the first case, one of the two LEDs is defective in such a way that it is "OPEN", i.e. there is no current flow through the defective LED. Then the test gives a corresponding result and the other LED is used automatically. On the other hand, there can also be a "SHORT", i.e. a short circuit. due to the short circuit the resistance through the shorted diode is very low, so that the current through the respective fuse becomes significantly larger. This means that the fuse is also cut in the event of a SHORT.

A third case concerns the situation when both LEDs work as expected. In this case, the current of the current source is divided between both branches, which can lead to a color error. The dominant wavelength depends on the selected current. Therefore, in such a case, the signal Vburn (high potential, e.g. VDD) is applied so that the imprint component EPT becomes conductive. Thus, with transistor T1 simultaneously fully switched through by a corresponding signal on the data and selection lines, a high potential is applied to the fuse. The resulting high current flow destroys the fuse Fb so that the diode D1*b* is safely disconnected.

In a PMOS technology design, the potential and signals reverse polarity accordingly.

The fuse can be formed as a metal strip with different widths. For example, a length may be 33 [μm], a width may be 20 [μm] at one longitudinal end, 9 [μm] at the other longitudinal end, and 2 [μm] in a 12 [μm] long central region. The longitudinal ends may be created square and rectangular and have passages. The square longitudinal end may be formed towards the transistor T1 and the rectangular longitudinal end may be formed towards a light emitting diode. A material may be IGZO, for example.

Instead of the above-mentioned metal strips, a thin-film transistor can also be used, especially in a diode circuit in which the gate and source are permanently electrically connected. Each LED can be provided with its own thin-film transistor. This can function both as a controllable current source and as an electrical fuse. The thin-film transistor can be pulled to zero potential by a signal, for example, so that it burns out as a result of the increased current flow and the LED is switched off. In principle, all known electrical fuse types can be used. Activation or tripping need not destroy the fuse, but in any case must safely de-energize the associated LED.

In this way, an end-of-line test can be performed without additional process steps such as laser cutting or the like. It is also possible to combine them with single-imprint diodes as single-imprint components.

FIG. 29 shows a neighboring cell of a first pixel cell on the right side. For each line, a selection signal line Vsel, an imprint signal line EP and a data signal line Vdata can be connected. The selection signal line uses Vsel and Vdata to generate a signal for selecting the relevant line for activating the associated fuses. The imprint signal line EP provides a fusing voltage V_burn for generating a fusing current I_burn.

Figure 30:
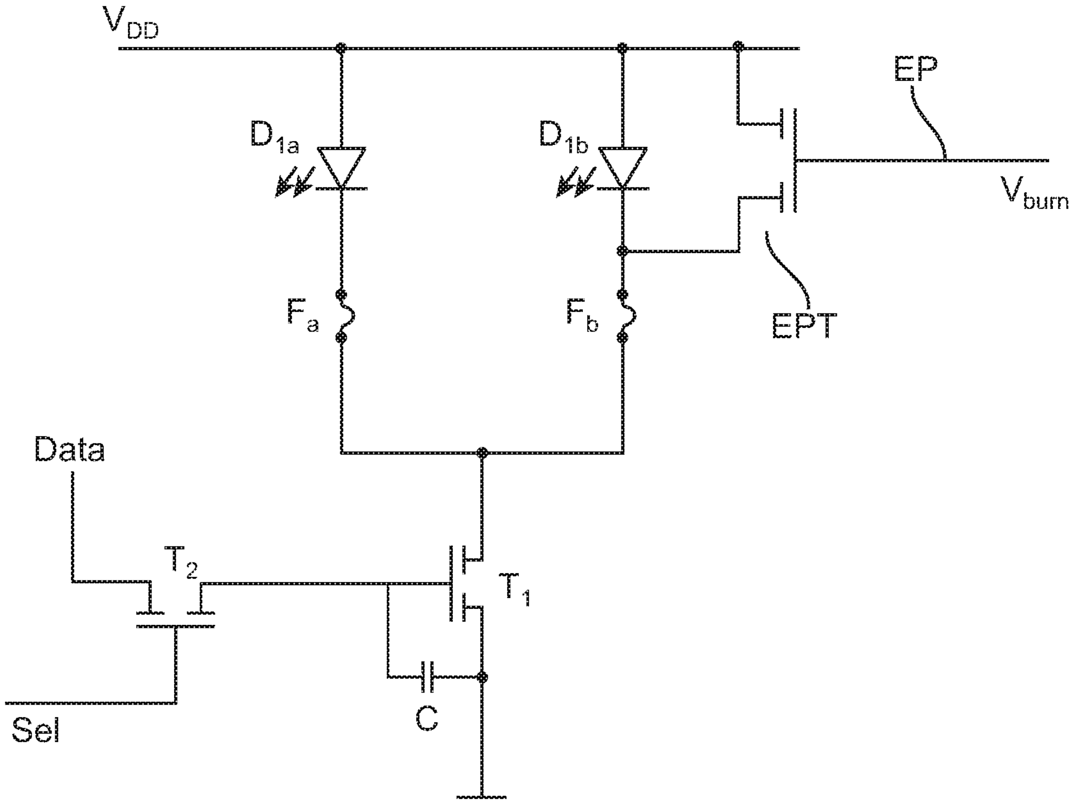
FIG. 30 shows another embodiment of a circuit with redundant LEDs, in which a defect of one LED can be compensated.

FIG. 30 shows a second embodiment of a proposed device in which the arrangement between the current source and the LEDs are reversed. While FIG. 29 shows an embodiment with a common cathode, FIG. 30 shows a common anode arrangement with the LEDs.

The anode terminals of LEDs D1*a* and D1*b* are connected to the supply potential terminal VDD. A first current line contact of a first transistor T1 is connected to the reference potential terminal GND. The drain terminal of the first transistor T1 leads to the common terminal of the electrical fuses Fa and Fb. The selection hold circuit comprises a charge storage C connected to the control contact of the first transistor T1 and to a source terminal of the first transistor T1.

The operation of this arrangement is similar, but the transistor EPT is connected between the fuse Fb and LED D1*b* and the supply potential. A voltage V_burn can be applied to the gate of the imprint transistor EPT via an imprint signal line EP and thus cause the electrical fuse Fb, which is a fuse, to melt.

Figure 31:
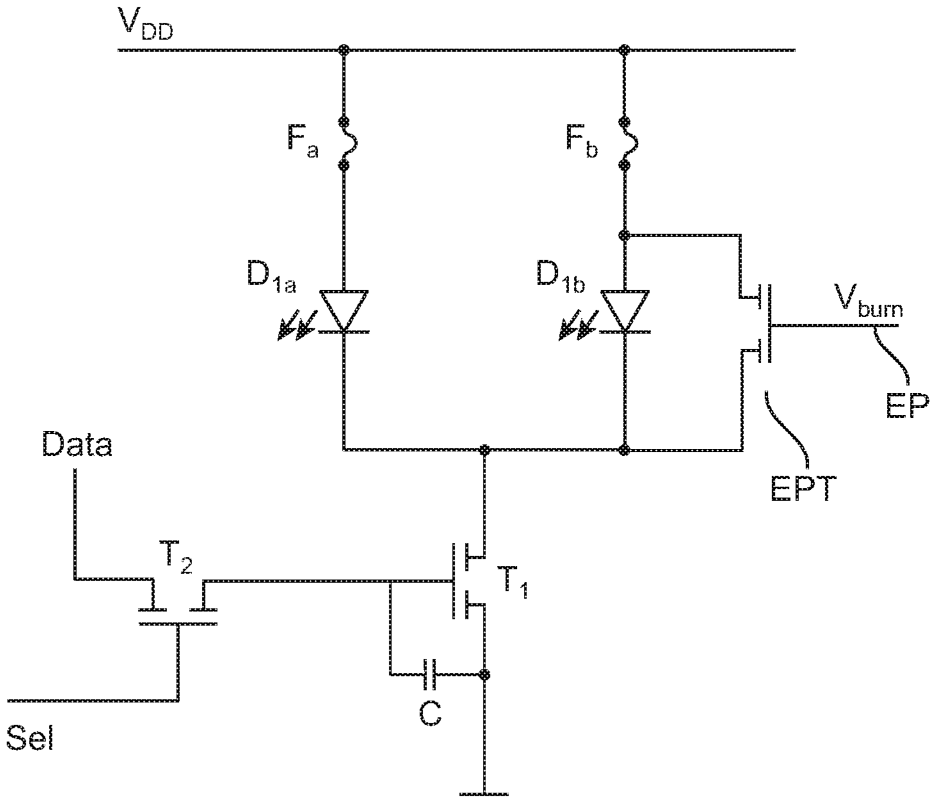
FIG. 31 shows a third embodiment of a circuit with redundant LEDs according to some aspects of the presented concept.

FIG. 31 shows a third example of a device with redundant branches of LEDs which can be selected by means of a selection fuse. In contrast to the embodiment in FIG. 31, the series connection of fuse and LED in each branch is reversed. Thus, the fuse is directly connected to the supply potential terminal, and the LED of each branch is connected on the cathode side to a common base point and to the current driving transistor T1. Furthermore, the imprint transistor EPT is connected with its drain terminal between fuse Fb and LED D1*b*. Its source connection also leads to the common base point for the LEDs the current driving transistor T1. The 2T1C cell is constructed the same as in the previous figure. To melt the fuse, the diode D1*b* is bypassed with the imprint transistor EPT and the signal Vburn, so that a high current melting the fuse flows through the fuse Fb.

Since the LEDs are not connected together here to the potential connections for VDD or GND, it is not possible to implement a common electrode for the LEDs, i.e. one electrode for several pixels. This arrangement is suitable, for example, if no common electrode is required for process reasons.

Figure 32:
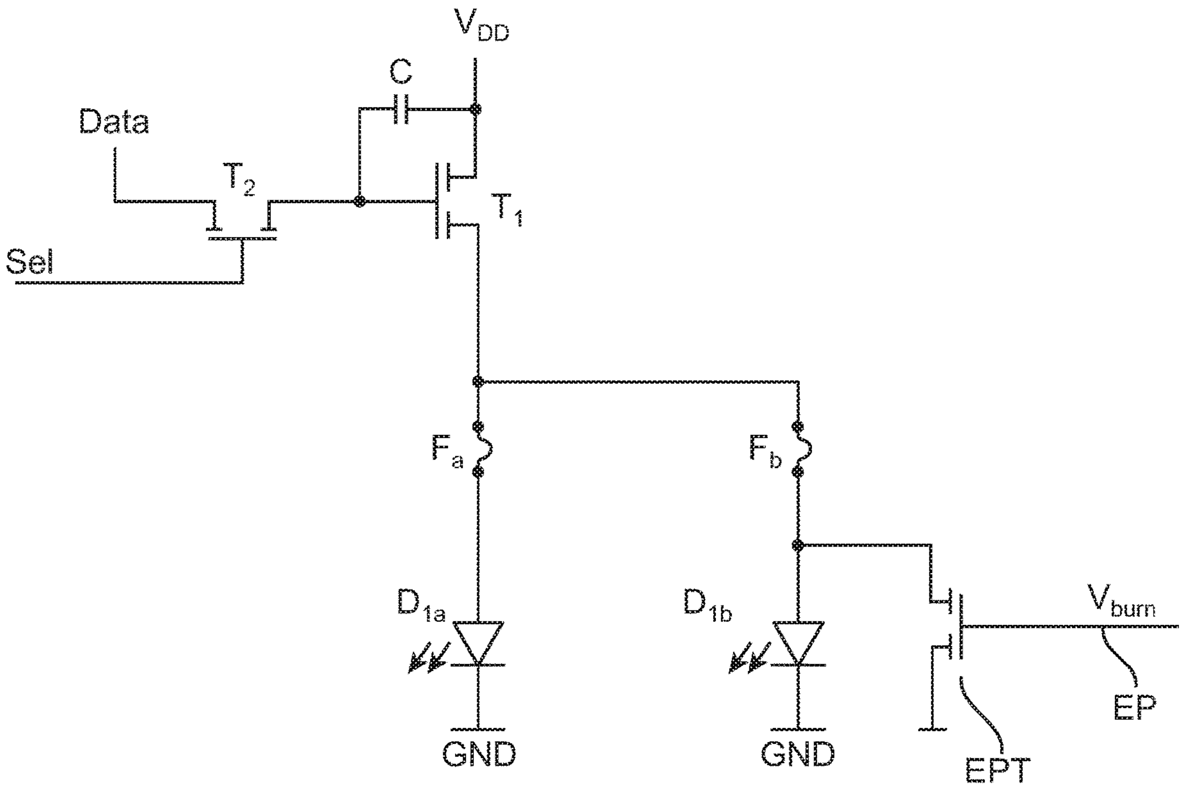
FIG. 32 shows a fourth embodiment of a circuit with redundant LEDs, in which a defective LED can be replaced.

FIG. 32 shows a slight modification of the embodiment of FIG. 29, where the transistors are PMOS (especially transistor T1) and the charge storage is connected between the gate and the fixed supply potential. The advantage of this embodiment is the independence of the voltage across the charge storage in contrast to the R-design of FIG. 29, where the voltage across the charge storage C may vary slightly due to the forward voltage or changes thereof due to temperature variations. The same advantage of independence from temperature variations is also shown in the embodiment of FIG. 30.

Figure 33:
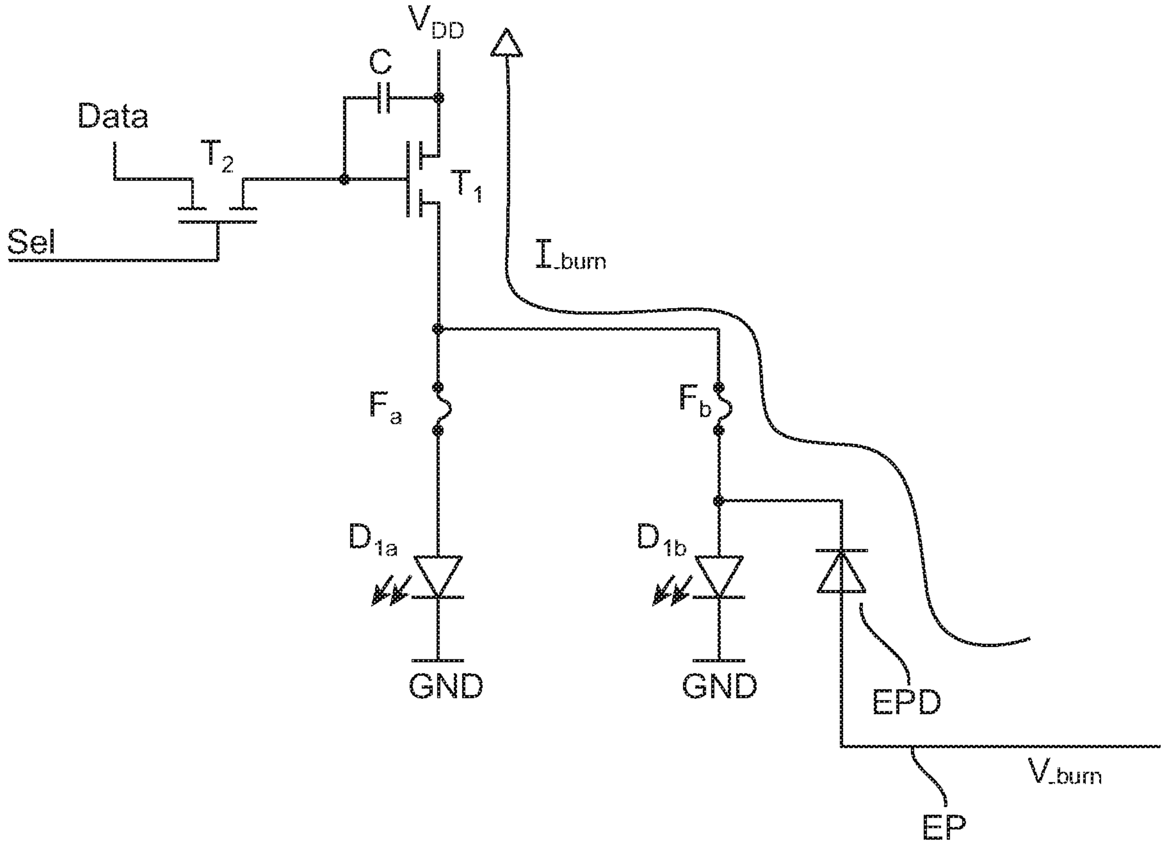
FIG. 33 shows a fifth embodiment of a circuit with redundant LEDs.

FIG. 33 shows another alternative embodiment of the embodiment of FIG. 32. The imprint component is here an imprint diode EPD, which is connected with one terminal to a second terminal of LED D1*b*, to which the imprint diode EPD is assigned, and whose other terminal is connected to an imprint signal line EP, by means of which addressing can be performed. According to FIG. 33, a first terminal of the imprint diode EPD is connected between fuse Fb and LED D1*b*, and a second terminal of the imprint diode EPD is connected to the imprint signal line EP. The fusing voltage V_burn, with which the electrical fuse melts, is also applied to the latter.

In operation, a selection of an electrical fuse Fb to be triggered is made by means of a switching through of the first transistor T1. For this purpose, an appropriate programming is carried out by the data line Data and the selection line Sel of a voltage to the charge memory C. The VDD terminal is applied to 0 volts or a negative voltage in contrast to normal operation. A voltage V_burn, which is more positive than the voltage at VDD, is then applied to the imprinted signal line EP. In this way, a high current IF or I_burn flows through the imprint diode EPD via the electrical fuse Fb and the conducting first transistor T1, blowing the fuse Fb in the selected pixel cell. The fuse Fb melts and the associated light emitting diode D1*b* is turned off. In addition, the potential at the first potential terminal GND should ideally also be greater than 0 volts, for example equal to the melting voltage V_burn, so that no large current flows across the light-emitting diode D1*b* or D1*a* and can damage it.

According to this embodiment, the current (IF, I_burn) necessary for tripping the electrical fuse Fb flows in the opposite direction as it would flow during "normal operation". According to this procedure in the context of an EOL test, no additional process steps, such as laser cutting or the like, are required.

Figure 34:
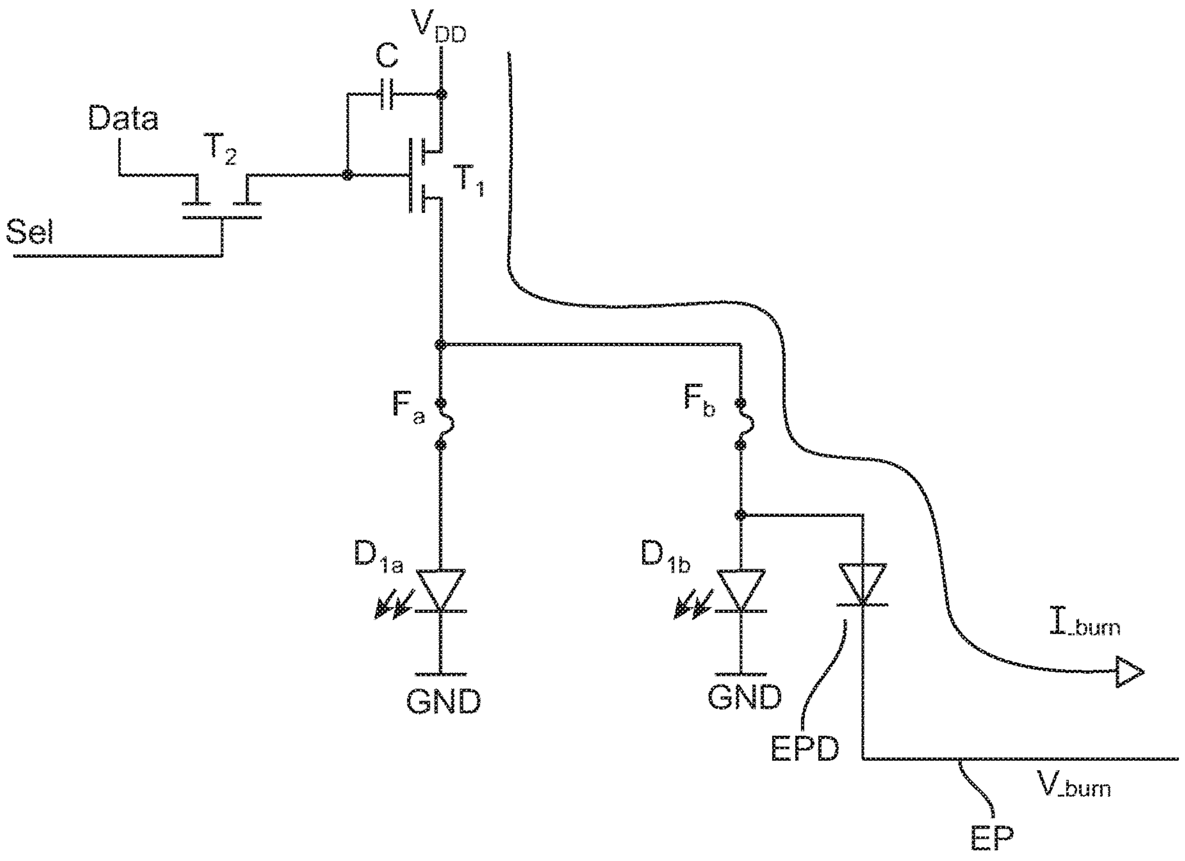

FIG. 34 shows a modification of the version shown in FIG. 33, in which the impression diode has merely been reversed. It is now connected on the anode side between fuse Fb and LED D1*b* of the second branch. The arrangement according to FIG. 34 is created using PMOS thin-film transistors as current driver transistors T1 and a common cathode arrangement for the LEDs. All imprint signal lines EP of a line of a display are connected together here. A selection of the electrical fuse Fb to be triggered is made by switching through the first transistor T1. For this purpose, the charge storage C is set to o V or another voltage so that T1 becomes conductive. A voltage of 10 volts or another positive voltage is applied to the VDD terminal. The voltage V_burn applied to the imprint signal line EP is here more negative than the voltage at the supply potential terminal VDD and is, for example, 0 volts. In this way, a high current I_burn flows across the imprint diode EPD, across the electrical fuse Fb and the conductively connected first transistor T1, whereby the fuse Fb in the selected pixel cell is triggered and thus melted.

Meanwhile, the potential at the first potential terminal GND should ideally be just as high as the potential at the second potential terminal VDD so that the light emitting diodes D1*a* and D1*b* are connected in the reverse direction and so that, despite the first transistor T1 being conductive, no high current flows via the light emitting diode D1*b* or D1*a* and can damage it. According to this embodiment example, the current (IF) I_burn required to blow the fuse Fd flows in the same direction as it would flow in "normal operation" of the arrangement.

Figure 35:
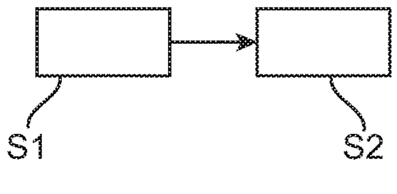
FIG. 35 shows an embodiment of a method for testing and configuring a pixel cell driven by one of the circuits presented above.

FIG. 35 shows an example of a method for the electronic configuration of a plurality of LEDs. In a first step S1 the LEDs of the first branch and the second branch are tested for their functionality. This results in several possibilities, of which the following is probably the most common. In this case both LEDs work as expected. If this is the case, in a second step S2 an imprint signal is applied to the electronic imprint device. A current is then provided by the current driver or current source, which flows across the now conductive current imprint element. The current is selected in such a way that the LEDs are not damaged, but the fuse of the respective branch is destroyed. This deactivates the corresponding branch. On the other hand, in case of a fault, only one of the two branches is still functional. The other is either "OPEN" i.e. no current at all flows through the faulty branch or "SHORT" i.e. there is a short circuit. In the latter case, the increased current and low resistance in this branch can destroy the fuse in the faulty branch, causing it to change from SHORT and OPEN, which no longer affects the function of the entire arrangement.

By using the method described above, the imprint signal line can be implemented as a global line, i.e., a line connected to all pixels. Addressing takes place via the supply line using transistor circuits on a panel outside an active display as well as via the selection lines and corresponding programming of the charge memories of the 2T1C cells.

This reduces the amount of wiring required. The number of layers required can also be reduced, which can lead to a reduction in costs. However, the switching transistors must be designed in such a way that they can carry the current of a column. Furthermore, there is an increased power loss in the panel or in the common carrier during this process.

Figure 36A:
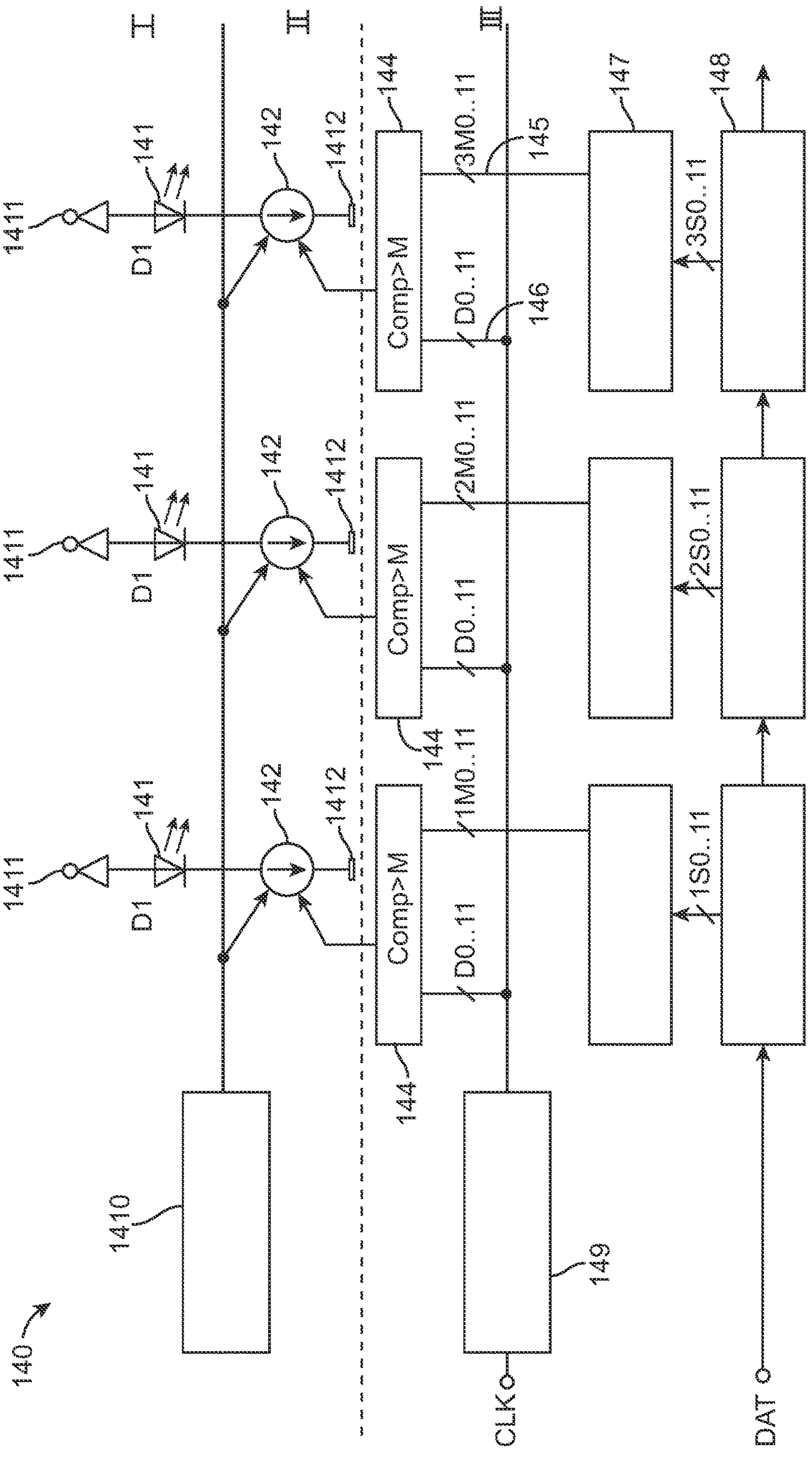
FIG. 36A illustrates a schematic for a control circuit of one or more LEDs, taking into account geometry and size requirements.

FIG. 36A illustrates a general overview of the digital and analog concepts of the three essential parts of an LED display arrangement with their main functionality. Sections I and II concern analog ranges of the display or a video wall, respectively, with a plurality of pixels arranged in rows and columns. Each pixel 141 may be either sub-pixels of different colors. Alternatively, displays with pixels of similar size may be used to provide the different colors. In this embodiment, the LED display is implemented as a monolithic display comprising a first substrate carrier on or in which the LED pixels are integrated. However, other embodiments are conceivable, in particular the embodiments disclosed herein.

In some cases, the first substrate carrier also includes the circuitry for the analog section II. In an alternative, the substrate of the LED is thinner and comprises a plurality of contacts on its underside. The contacts on the underside are then bonded or otherwise attached to a carrier that includes the analog section II. Alternatively, the analog section II can be grown on a thinned substrate that also carries the LED pixels on the other side. Such an approach can reduce misalignment between the analog section and the LED pixels. On the other hand, a material system suitable for integrating an analog circuit is required.

The analog section II of the arrangement contains the control for the current through the respective pixels. For this purpose, each pixel 141 is brought into contact with its anode contact with a common source potential 1411. The respective cathode of the LED pixels is connected to an adjustable driver, which in the present case is implemented as a current source 142, which in turn is connected to the terminal 1412 integrated in section II. In this embodiment, a common anode contact is thus realized. Cover electrodes as disclosed in this application can provide such a function. In addition, however, the other case of a common cathode also exists. Here, the LED is arranged between the cathode potential terminal 1412 and the current source. The advantage of such an arrangement is that the supply voltage can be somewhat lower and the LED does not have to handle a large input voltage.

Section II also includes a reference current source 1410, such as a temperature stabilized current mirror or the like, to provide the same reference current to respective current sources 142. While only one current source is shown in this example, multiple reference current sources may be used to provide a respective reference current to different pixels. For example, each pixel line may be associated with one reference current source. If such reference current sources are switchable, the current sources for each row can be periodically turned on or off, thereby reducing power consumption. In embodiments, section II is fabricated in polysilicon, which thus comprises a different material system than that used to implement the LEDs in section I.

Aside from the reference current supplied to each of the power sources 142, the power sources also include a switching input to selectively operate with each power source and then with each pixel separately. Switching the current sources using PWM techniques to adjust the brightness of each pixel, as explained, further reduces the overall power consumption. The PWM signal is generated in the digital section III of the array.

Digital section III includes a clock input CLK and a data input DAT. The data input DAT is coupled to 12-bit shift registers 148 connected in series. The shift register receives the incoming data stream and provides a corresponding word to a 12-bit memory 147 for storage. The 12-bit memory may include flip-flops or similar circuitry to store the 12-bit words in memory. The memories are each coupled to the other input of a comparator 144. In this manner, an entire range of brightness values can be temporarily stored in the flip-flops of memory 147 with one data stream.

The clock signal at input CLK defines the clock for a counter 149 that provides a 12-bit counter word D0 . . . D11. The counter word D0 . . . d11 is applied to the respective comparators 144, which are connected to the current sources 142 of each LED pixel. In an alternative embodiment, other components may be used, for example, a combination of different gates, if necessary, to check whether the counter word D0 . . . D11 is less than the word of the memory associated therewith.

In operation of such an arrangement, the comparator 144 compares the counter word D0 . . . D11 with the memory word, i.e., the contents of the 12-bit memory. Depending on the result, for example, whether the comparison with the comparator indicates whether the counter word D0 . . . D11 is larger or smaller than the memory word, the current source is switched on or off. In other words, the comparison with the comparator results in a pulse width based on the clock signal in the counter 149 for driving each pixel. For example, the first pixel in the illustrated chain is said to have a dark value, i.e., be off, and the second pixel is said to have a light value or be fully on. The data stream then has the following relevant string of zeros and ones in two words, strung together in the form of "000000000001111111111".

After the words are each stored in one of the two memories 147, they are passed in inverted form to the comparator 144 described above. In the comparator, the comparison is made. As long as the counter word D is smaller than the memory word M, the driver remains switched on (in the example with the inverting comparator, "1111111111" and "0000000000" are thus compared with the counter word).

The LED display array or video wall includes different parts that have different requirements and constraints, which makes it difficult to be implemented in a single semiconductor material.

Figure 36B:
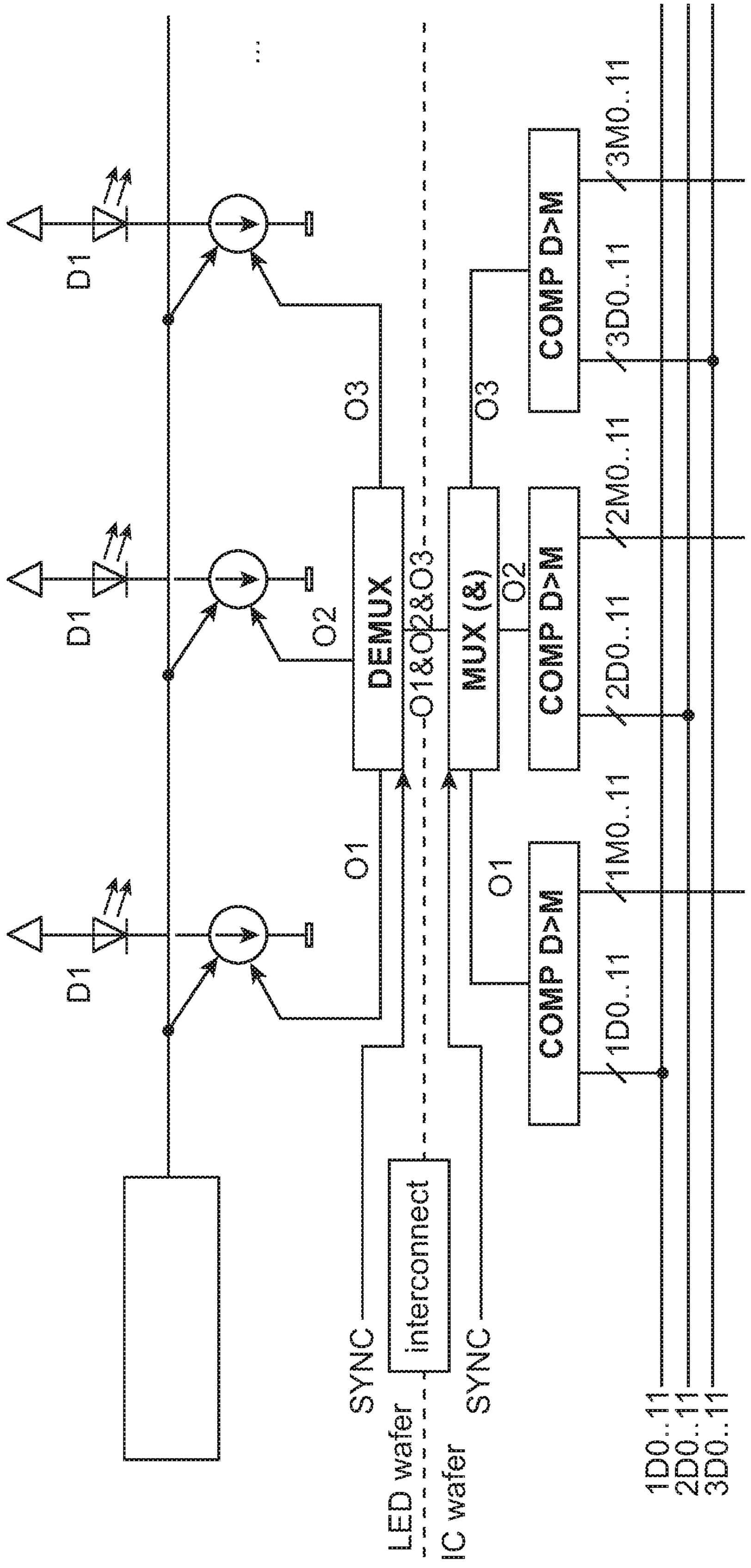
FIG. 36B shows an alternative embodiment of a schematic representation of a driver circuit for multiple LEDs, taking into account geometry and size requirements.

FIG. 36B shows another embodiment over the three sections of an LED display arrangement with its main functionality. While the first section is essentially the same as the corresponding section I of FIG. 36A, section II is slightly different. Section II now includes a demultiplexer DEMUX that switches between the different pixels using a higher clocked synchronization signal Sync. The frequency of this signal Sync has a higher frequency than the refresh rate and depends in the number of signals O1 to O3 generated by the demultiplexer DEMUX. In one embodiment, the demultiplexer controls all pixels of a row or a column. In an alternative, a demultiplexer may also be used for each subpixel of a pixel. Combinations of these are also possible. This allows the number of necessary contact areas between section II and section III to be reduced.

Section III again comprises a multiplexer between the outputs of the respective comparators Comp D>M and the demultiplexer of the second section II. The synchronization signal Sync is the same as for the demultiplexer in section II and is generated jointly. Another change compared to the execution of FIG. 36A is that the PWM modulation determining counter word (D0 . . . D11) for the individual comparators is fed to them individually directly and not together. In contrast to the embodiment of FIG. 36A, the implementation of a multi- and demultiplexer has the advantage that the number of interconnects, i.e. the connections between the purely digital section III and section II can be reduced. On the other hand, an additional higher-frequency synchronization signal must be routed between sections III and II via one of these interconnects.

Figure 36C:
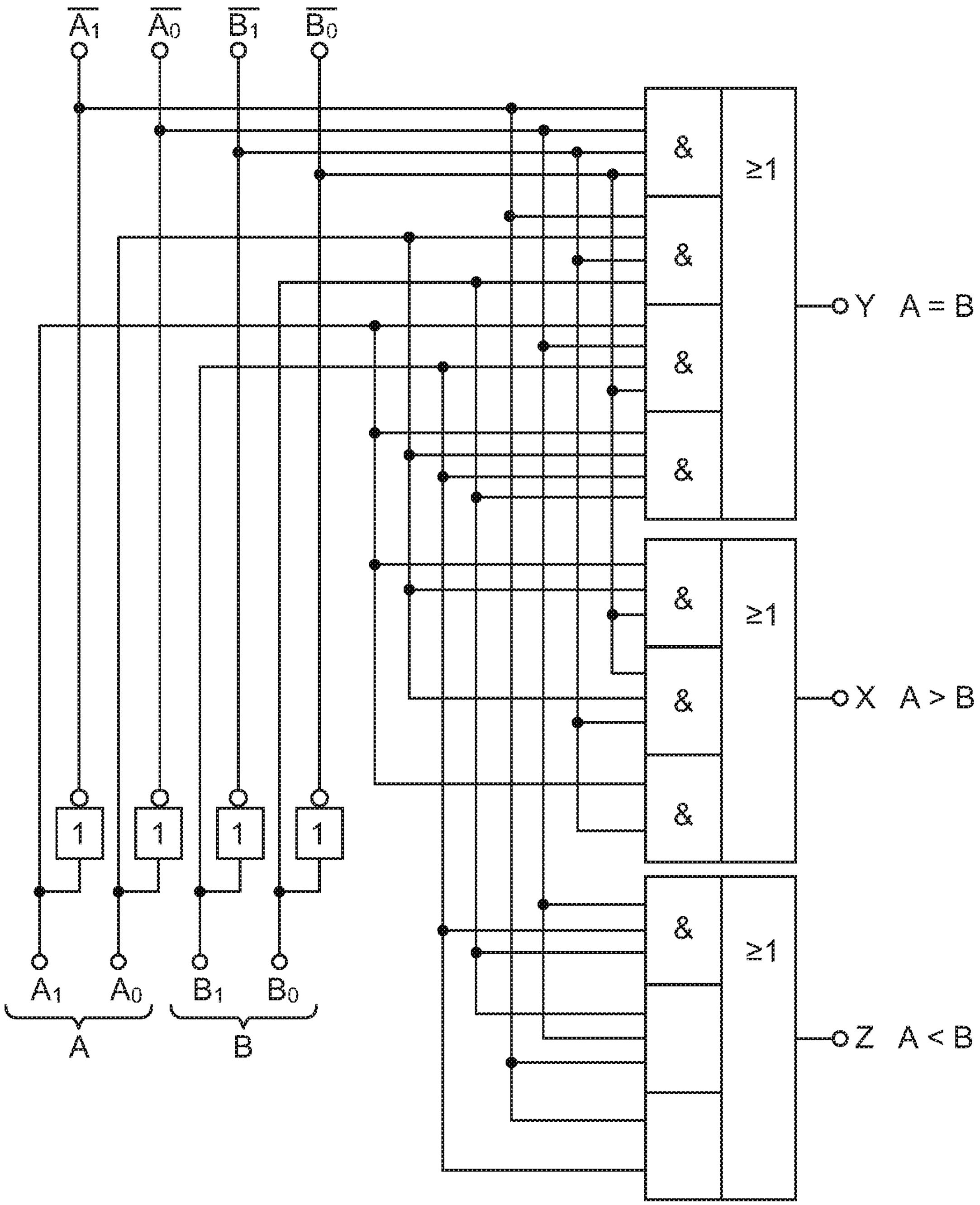
FIG. 36C shows an embodiment of a comparator circuit such as can be used in a comparator instead of an OR gate as used in FIG. 36A.

FIG. 36C shows a functional circuit diagram of an embodiment of a known comparator, as it can be used in principle in parts in the embodiment of FIGS. 36A and 36B. The circuit represents a 2 BIT comparator, but can be extended to several bits. In the practical realization, the inverting inputs can also be omitted. Furthermore, since a comparison with the counter word takes place, it is sufficient to make an implementation of the circuit part A>B or A<B.

Figure 36D:
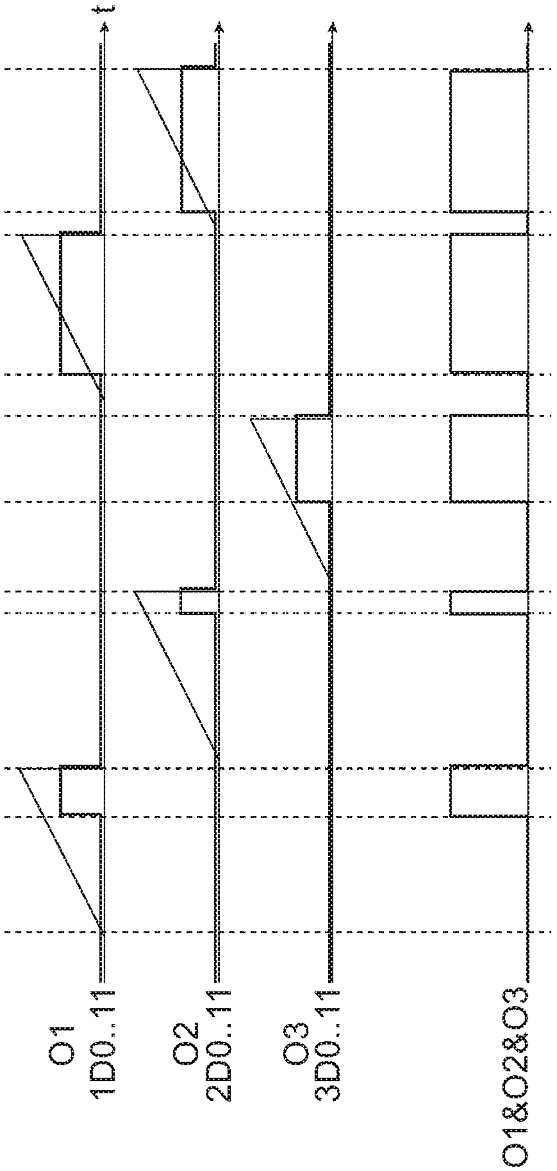
FIG. 36D shows a timing diagram for the various counter words 1D to 3D and the memory registers as they are used to generate the output signal.

FIG. 36D shows a timing diagram for the various counter words 1D to 3D and the memory registers as they are used to generate the output signal. The counter words D0 . . . D11 are time-shifted, so that each time word starts when the previous one has run through. The comparator or an OR function is used to generate the output signal O1 to O3, which is then fed to the multiplexer.

The display device includes different parts with different requirements and constraints that make it difficult to be implemented in a single semiconductor material.

Figure 37A:
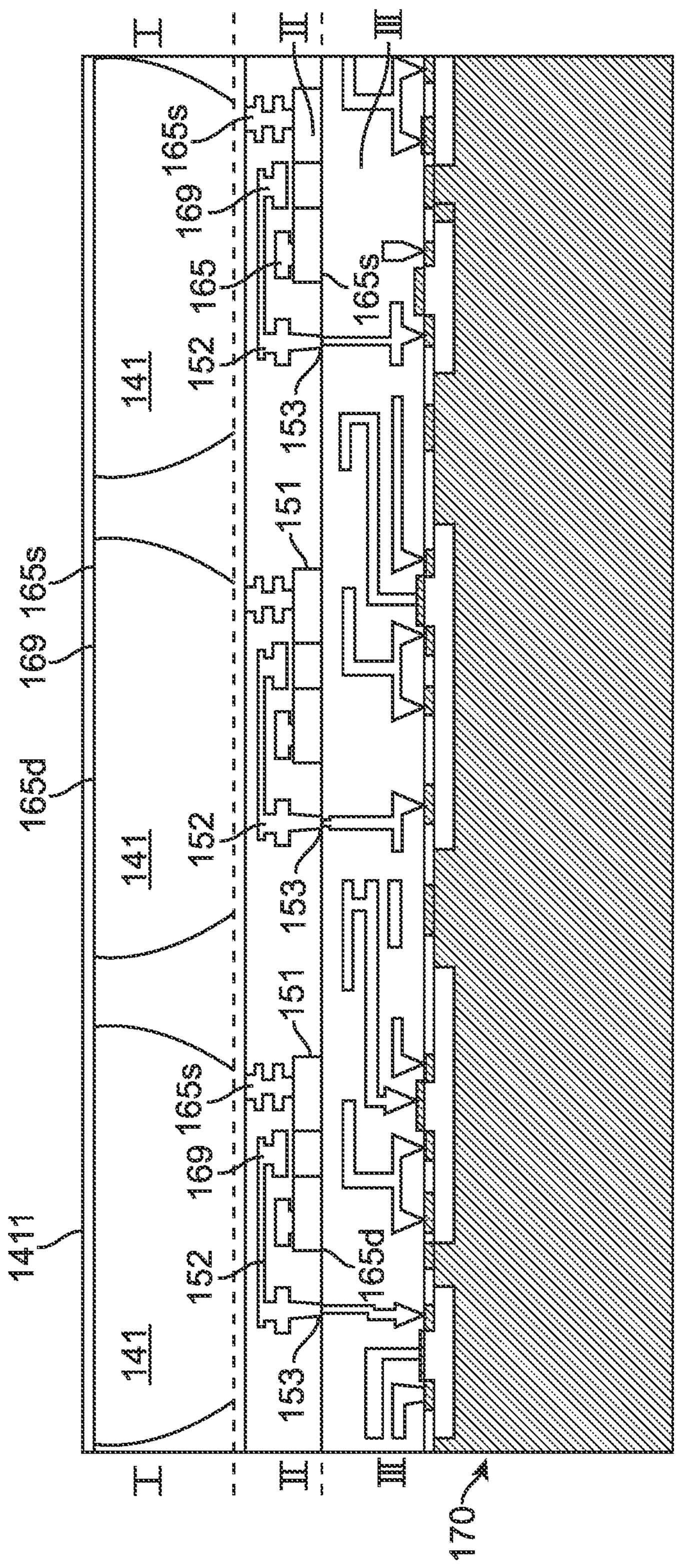
FIG. 37A shows a sectional view of an LED display assembly.

FIG. 37A shows an exemplary sectional view of a display or video wall to illustrate various aspects of contacting and routing of the individual sections. Similar to FIGS. 36A and 36B, the display includes an LED section I, an analog section II, and a digital section III. The LED section is based on GaN, InGaP, or other semiconductor material capable of emitting light of blue, red, or green color. The LED portion I includes the common cathode or anode (+) contact layer 1411 extending on the top surface and connecting each of the active regions of the LED pixels 141. Not shown is an additional outcoupling or light shaping structure on the surface of the layer 1411, which may include photonic structures, converters, or the like.

The pixels are arranged in a substrate and are optically and electrically separated from each other so that their emission does not interfere with adjacent LED pixels and the pixels can be controlled separately. For example, the LED pixels 141 can be implemented using the current-limiting doping described above. In this case, the current flow is limited to a smaller region by doping. The doping alters the band gap so that the charge carriers are effectively confined. Examples of such confinement or other structural measures to improve quantum efficiency and/or radiation patterns are disclosed in the other sections. The pixels may also include LED nanorods arranged in a slotted antenna structure. Also conceivable are bars or the other LED structures disclosed in this application.

The underside comprises an insulating material in areas to prevent leakage current. The surface is shaped in such a way that area II is aligned so that the elements are primarily located below the respective pixel element. Each LED pixel comprises a contact surface facing the area II, which forms the connection with the area II of the LED display.

The analog section II of the display of FIG. 37A may be implemented from or based on the same semiconductor material system. For example, active and passive components used for the power sources may be implemented in GaN InGaP or InAlP systems. In such cases, forming of the components can be achieved using several conventional deposition techniques. This has the advantage that contacts of the LED pixels in the interface of section I can be easily aligned with the traces within section II. Stresses and strains due to different temperature coefficients can also be minimized. Alternatively, section II is formed with a different semiconductor material. For example, polycrystalline silicon or amorphous silicon structures are suitable and are understood to form small devices. Both sections can be formed separately, aligned and bonded together. As another alternative, polysilicon material can be deposited on the bottom surface layer by various growth processes to subsequently form the required circuit components. One or more sacrificial layers can also be implemented to reduce stress. In addition, the polysilicon layer can be formed first, and then the LED pixels can be formed using the desired material system. In the present example, although different material systems are used for region II and I, the expansion and other parameters are adjusted so that joint fabrication is possible.

To this end, Section II is fabricated with polycrystalline silicon. Polycrystalline silicon or amorphous silicon structures are well understood for forming particularly small-dimensioned components. For this purpose, polysilicon material is deposited on a suitable substrate and the necessary components are formed therein. To reduce the thermal expansion, several intermediate or sacrificial layers are provided, which do not perform any further function, but adjust the thermal or due to the different crystal structure. Such layers are also located between area II and area I. There, a change of the material system to the material system intended for LED pixel production takes place. Subsequently, the LED pixels are formed.

Alternatively, all sections can be formed separately, aligned and then bonded together.

Depending on the complexity, section II includes one or more transistors that are part of a power source or switch, as illustrated in FIG. 37A by elements 151 and interconnection layers 152. Interconnection layers 152, located in some layers of section II, connect contacts on the surface of section II to various components in section II. For example, contact 165*s* of transistor 152 is connected via an interconnection layer to the top surface contact and to the corresponding LED. Similarly, gate contact 169, which controls transistor switching or resistance behavior, is coupled to contact interface 153 on the bottom surface from the portion adjacent to digital section III.

Digital section III is based on silicon and features some digital circuits 170. It is usually molded separately and then electrically connected to the analog section II in a bonding process. Molding the digital and analog sections separately allows on the one hand to use optimized manufacturing techniques and on the other hand to test the analog and LED sections before bonding them to the digital section. Similar to the analog section, the digital section III contains some intermediate connections for digital and analog signals. Power supply may also be provided via the digital section III.

Figure 39:
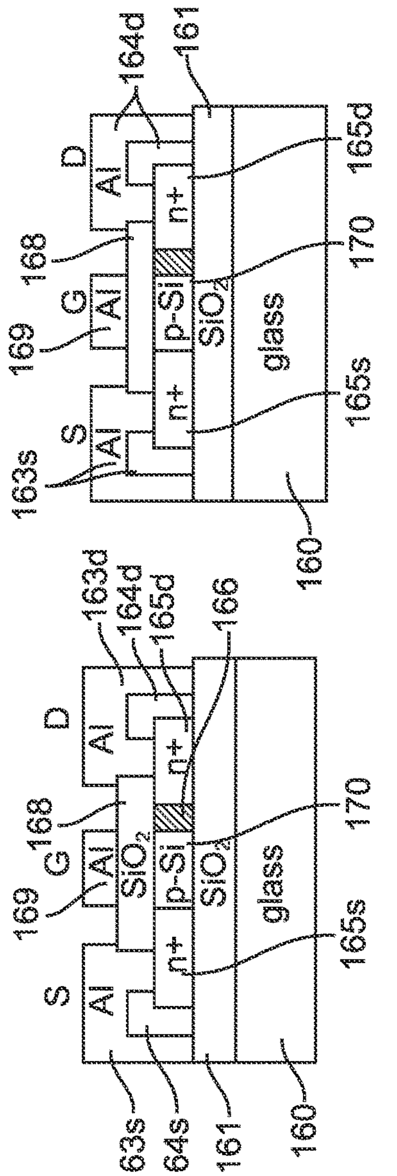
FIG. 39 illustrates some examples of polysilicon transistors suitable for an LED driver circuit.
Figure 38:
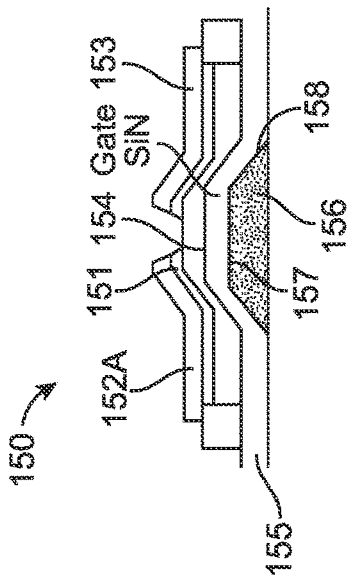
FIG. 38 shows an example of an inverted transistor of the offset type using amorphous silicon for use in the analog portion of an LED driver.

Various setups and implementations can be, in one aspect, integrating transistors within the analog portion to form the current source and control circuitry. FIG. 38 and FIG. 39 illustrate various examples of the implementation of field effect transistors in the semiconductor material.

FIG. 38 illustrates an inverted stacked amorphous silicon formed transistor. The transistor comprises an insulating gate layer 155 formed of SiN over the gate contact 156. The gate contact 156 is formed by a small bump such that the gate layer 155 follows the bump, which has a central region 157 and two inclined sidewalls 158. A layer of amorphous silicon 154 is formed over the gate layer, thus also forming a central region and two sloped sides. The surface of the amorphous layer 154 may be highly n-doped so as to form a highly n-doped layer of amorphous silicon 151 having a high conductivity. Alternatively, the highly n-doped layer 151 is deposited on layer 154. Finally, a metal layer is deposited on the n-doped layer 151, which also extends to the side edges of the silicon layer 154 and SiN layer 155. A gap in the metal layer and layer 151 divides the structure, forming a source and a drain contact. In particular, metal layer 152 forms a drain contact, while metal layer 153 forms the source contact of the field effect transistor. The conductive channel is then formed in the polysilicon layer in the central region between the source and drain. The highly n-doped polysilicon layer 151 provides a good electrical connection to the channel in layer 154. This structure allows the gate to be contacted from a side other than the source and drain, using very little space.

FIG. 39 shows two examples of space-saving polysilicon transistors. The transistors are formed on a glass substrate with a grown SiO2 layer as the base substrate. Each transistor comprises two highly n-doped polysilicon regions 165*s* and 165*d* separated by an undoped polysilicon layer 170 disposed between the regions 165*s* and 165*d*. Adjacent to the drain region is a lightly doped drain region 166 disposed between polysilicon 170 and drain region 165*d*.

Alternatively, a gold-doped region 167 is formed between polysilicon 170 and drain region 165*d*. The source 165*s*, drain 165*d* and undoped regions 170 are then completely covered by an SiO2 layer extending on the sidewalls of regions 165*s* and 165*d*, respectively. Holes are etched over areas 165*s* and 165*d* to gain access to the source and drain areas. The holes are filled with a metal, for example Al, to provide electrical contacts. The contact also runs across the sidewall of the SiO2 layer, creating a larger area for contacting. A gate is formed in the center above the polysilicon layer 170 by applying an aluminum layer 169 to the insulating SiO2 layer. Gate 169 is electrically isolated from the metal contacts for source and drain, respectively.

In conventional circuits for controlling LED displays, the pixels are arranged in addressable rows and columns. Each pixel consists of an LED of a particular color or, alternatively, a triplet of three different LEDs. In the latter case, it is also possible to refer to a pixel containing three subpixels, each of which has an LED of a particular color.

Figure 37B:
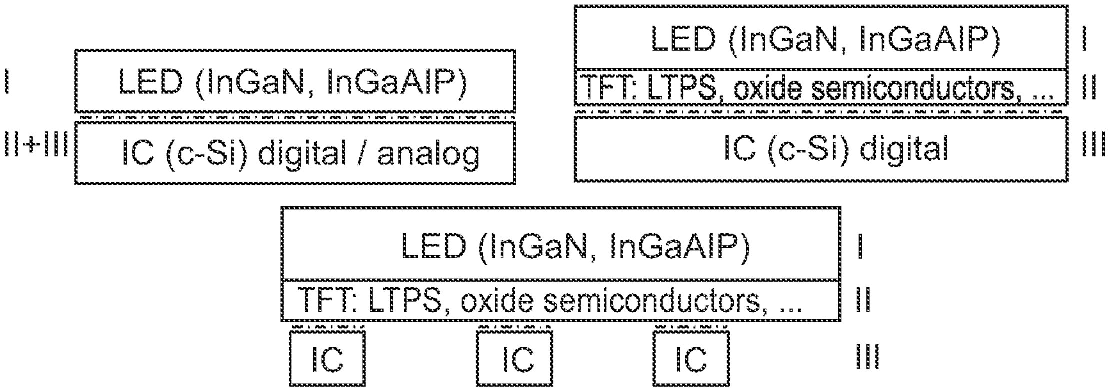
FIG. 37B illustrates various examples of a connection of the various sections according to the embodiment of FIGS. 36A and 37A.

Referring again to the example of FIG. 36A or 36B, FIG. 37B shows various embodiments for connecting LED structures to digital circuit sections. The two sections may be based on different material systems or technologies. The upper first section comprises the LED elements or pixels or subpixels arranged in rows and columns. Depending on the desired color, different material systems and technologies are used, for example the materials InGaN and InGaAlP. In a first example, the wafer or LED structure is bonded to a wafer based on crystalline silicon using a W2 W (wafer to wafer) process, which includes the digital circuit section and also any necessary analog sections. In the example of FIG. 36B, section I is realized by the upper wafer, the lower wafer comprises sections II and III. In the second example of FIG. 37B, thin film layers of polycrystalline silicon are deposited on the bottom of the first wafer with the first section at low temperatures. In this section, either pure interconnects are provided to connect to the digital section III, or additional driver circuits or other components are accommodated to drive the LEDs. In these two examples, the wafers are interconnected together to fabricate the desired display or matrix. In contrast, an alternative embodiment is shown in the third example, in which individual chips containing digital circuits are provided and are operatively connected to section II. The chips include, for example, rows and column drivers for driving portions of the display.

Figure 41:
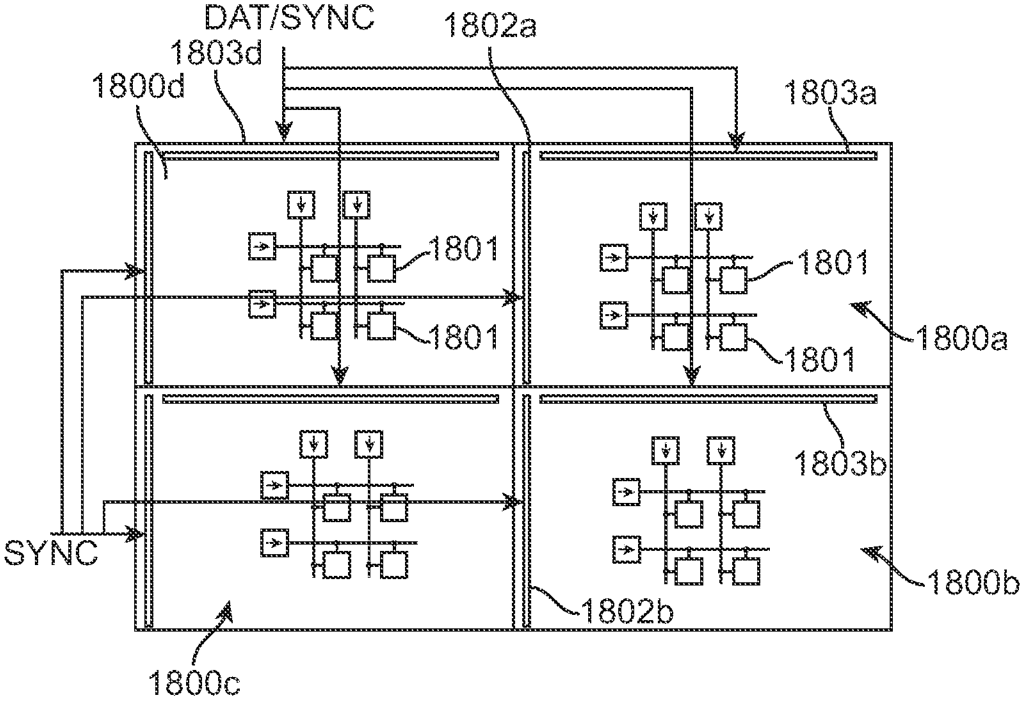
FIG. 41 shows a schematic of an LED display segmented into different submatrices.

FIG. 41 shows an embodiment described in more detail below. In this way, individual parts of the display can be controlled separately. In addition, such a separation in production allows individual defective circuits to be eliminated without having to replace the entire wafer in the event of a defect in an element of the digital circuit in section III.

Among the analog sections are additionally new concepts for the implementation of digital control concepts required. In conventional circuits for controlling LED displays, the pixels are arranged in addressable rows and columns. The same principle can be applied here. Each pixel comprises one LED of a certain color or alternatively a triplet of three different LEDs. In the latter case, it can also be called a pixel if it contains three subpixels, each of which comprises an LED of a particular color.

Figure 40:
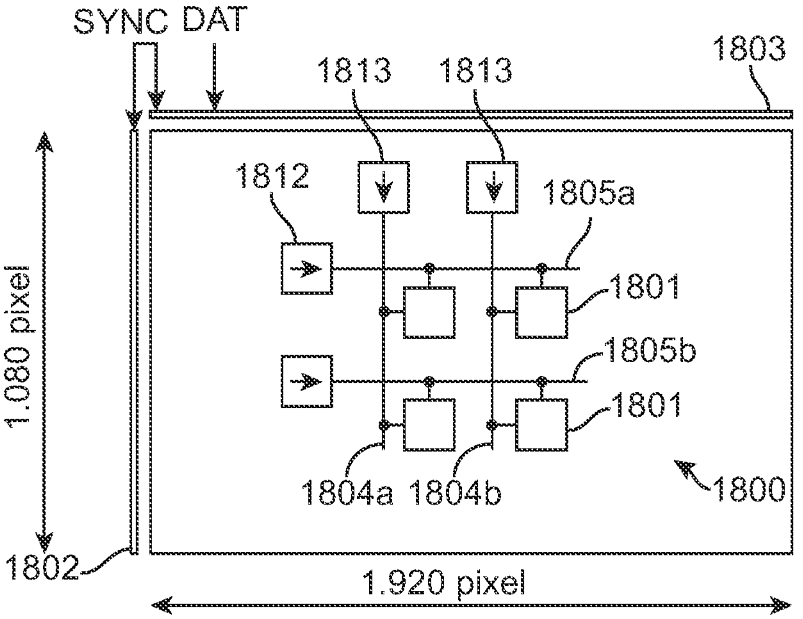
FIG. 40 shows a circuit diagram of an LED or LED display.

FIG. 40 shows a schematic with the elements required to address a conventional LED display. For simplicity, only one color type is shown, although each pixel contains three LEDs with different colors. The pixels are arranged in addressable columns and rows. The display features a pixel matrix 1800, which has 1920 pixels per row and 1020 rows. The pixel matrix was built as a monolithic matrix. The display has multiple row drivers 1802 and multiple column drivers 1803 to address each pixel in the pixel matrix individually. Both types of drivers can be integrated into the matrix or provided as external components coupled to the matrix via an interface. A combination is also possible.

Each of the row drivers 1812 has an individual driver device coupled to and driving current through a corresponding line 1805*a*, 1805*b*. Similarly, each column driver comprises a driver element 1813, each driver element being connected to a data line 1804*a*, 1804*b*. Pixel drivers 1801 are disposed on the intersections of the rows and columns. The pixel driver 1801 is connected to the rows and columns and drives the associated pixel.

The display includes some control and address signals from external components, two of which are specially marked here, namely DATA and SYNC. The latter signal SYNC is used to synchronize the row and column drivers with each other to avoid artifacts and ensure clean programming. By addressing a corresponding row, the pixels associated with the corresponding row are selected. Then the DATA signal is applied to the corresponding columns to program each of the pixel drivers 1801 in the selected rows.

In the case of a display with a large number of pixels, the clocking for conventional display programming may result in high frequencies for the programming signal. For example, in the display of FIG. 40, the frequency for the programming frequency per bit and row may be in the range of several MHz depending on the color depth of each sub-pixel. For example, with a luminance depth of 10 bits, corresponding to 1024 different illumination values, the programming frequency for 1080 display lines and a frame rate of 60 Hz is about 66 MHz.

The table below shows the frequency of the programming signal and the programming time per bit and row in μs. With an increasing color or illumination depth the PWM time units for programming grow and therefore the programming frequency.

| Color bits | PWM units | Programming time in μs | Programming freq. (MHz) |
|---|---|---|---|
| 8 | 255 | 0.06 | 17 |
| 10 | 1023 | 0.02 | 66 |
| 12 | 4096 | 0.00 | 265 |
| 14 | 16383 | 0.00 | 1062 |

The very small programming time, especially for high color or illumination bits (i.e. 12 bits or 14 bits) leads to a high load for the corresponding row and column drivers. In the extreme case of a change from white to black or vice versa of a single pixel, the column driver has to reprogram (reload) the pixel in a few ns. For comparison, state-of-the-art DDR4 rams run at an internal frequency of about 800 MHz to 1.5 GHz, i.e. in the range of the programming frequency of 14 bit illumination depth.

In order to reduce the programming frequency, the rising and falling clock edges can be used for programming, similar to RAM memories. It is also possible to segment the display and divide the display matrix into different segments. Depending on the production technique, segmentation allows individual segments to be tested separately and thus replaced in the event of errors.

FIG. 41 shows an example in which a 1920×1080 pixel display is segmented into a 2×2 matrix with subdisplays. Each subdisplay 1800*a* to 1800*d* contains a 960×540 pixel matrix. Similar to the display in FIG. 40, each subdisplay has its own column and row drivers 1802*a*, through 1802*d*, and 1803*a* through 1803*d*. DATA and SYNC signals are also supplied to the respective segments. The smaller number of lines reduces the programming frequency accordingly. The further segmentation of the columns as shown in FIG. 41 will also reduce the demand on the column drivers and the load with each programming cycle is reduced. The following table shows an example of programming time and programming frequency for 108 display lines per segment (there are 10 such segments in total, again with a refresh rate of 60 Hz.

| Color bits | PWM units | Programming time in μs | Programming freq. (Mhz) |
|---|---|---|---|
| 8 | 255 | 0.61 | 1.7 |
| 10 | 1023 | 0.15 | 6.6 |
| 12 | 4096 | 0.04 | 26.5 |
| 14 | 16383 | 0.01 | 106 |

As shown, the reduced number of lines due to segmentation reduces the programming time and frequency requirements by roughly the factor of segmentation. Each of the segments is implemented in a similar manner. Each pixel matrix 1800, 1800*a* to 1800*d* contains lines and rows on which the pixel drivers and light emitting devices are arranged.

FIG. 42 shows an example of a conventional pixel driver such as a 2T1C structure in which the current through the LED is controlled by a charge programmed during the blanking period of the display. The driver is arranged at the intersection of a row line 1805 and a data line 1804. Further, a supply line 2002 that provides a supply voltage $V_{DD}$ and a current $I_{DAC}$ is coupled to the light emitting device 2004 via a driver transistor 2003. The driver transistor 2003 thus operates as a controllable current source. The current through the driver transistor 2003 is controlled by the 1T1C structure 2002. In particular, a field effect transistor M2 has its gate connected to the line selection line for programming and acts as a switch.

When activated by a "HIGH" signal on the line selection line, transistor M1 closes and data line 1804 charges capacitor C1 to the desired level. During this programming, the supply line may be off that the light emitting device is essentially off. This will prevent various artifacts during programming. After reprogramming, transistor M2 is open again and the charge stored in the capacitor drives current transistor M1 so that a current flows through the light emitting device. The current corresponds to the stored charge and thus to the desired illumination level.

Figure 43:
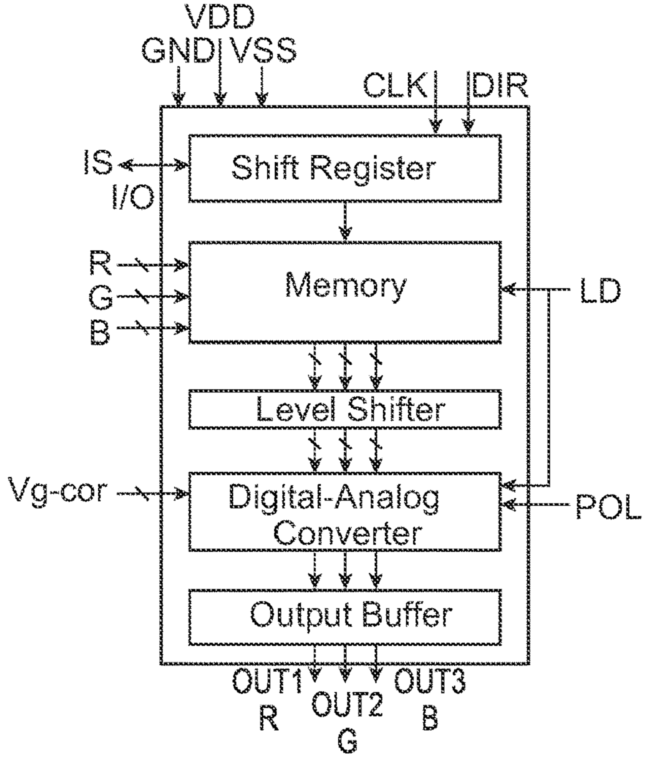
FIG. 43 illustrates one embodiment of a conventional slit driver suitable for use in a display.

FIG. 43 shows the circuit diagram for a conventional column or data driver. The driver has a digital section and an analog section to drive the corresponding data lines. Alternatively, the output can drive dedicated drivers for the data lines. Apart from power supply connection in GND, VDD and VSS, other control signals CLK and DIR are provided. Digital values R, G and B for the different colors are stored in a buffer. They are forwarded and processed by a level shifter and then fed to a digital-to-analog converter. The DAC can also correct some values by using a separately generated correction signal Vg-cor. After conversion to analog signals, they are stored in an output buffer and then applied to an output buffer. The analog rgb signals are then applied to the data lines. Although only 3 data output lines are shown here, the column data driver provides signals for all data lines in the display matrix.

Figure 44:
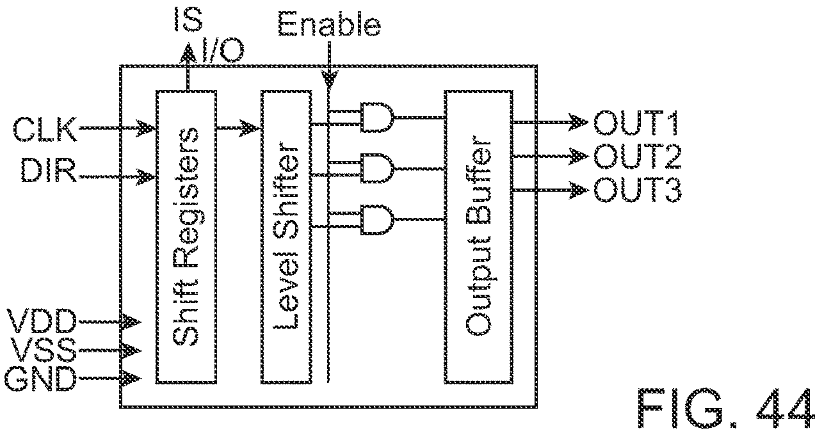
FIG. 44 shows an embodiment of a conventional line driver suitable for use in a display.

FIG. 44 shows an example of a conventional line driver. The driver comprises a shift register that receives the CLK and DIR signals, and is coupled via a level shifter to a plurality of logical AND gates. The gates also receive an ENABLE signal to which the corresponding outputs in the output buffer go HIGH. In operation, the shift register shifts bits with each CLK signal to selectively apply a HIGH signal to one of the corresponding gates.

The ENABLE signal is required to globally activate the line selection during reprogramming.

In the following, various devices and arrangements as well as methods for manufacturing, processing and operating as a Items listed again by way of example. The following items present various aspects and embodiments of the proposed principles and concepts that can be combined in various ways. Such combinations are not limited to those indicated below:

1. Device for the electronic control of a LED pixel cell, in particular created with NMOS technology, comprising:
 - a data signal line, a threshold signal line and a selection signal line;
 - an LED electrically connected in series with a dual-gate transistor and together with the latter between a first and a second potential terminal;
 - wherein the dual-gate transistor is arranged with its current line contacts between a terminal of the LED and one of the potential terminals, and a first control gate of the dual-gate transistor is connected to the threshold line;
 - a select hold circuit having a charge storage coupled to a second control gate of the dual gate transistor and to a current line contact of the dual gate transistor, and a control transistor having its control terminal connected to the select signal line.

2. Device according to item 1,
 - wherein the dual gate transistor comprises a back gate transistor, in which the back gate forms the first control gate.

3. Device according to item 1 or 2, wherein the first control gate of the dual-gate transistor is designed to set a threshold voltage.

4. Device according to one of the preceding items,
 - in which the dual-gate transistor comprises a thin-film transistor with two opposing control gates.

5. Device according to one of the preceding items,
 - which is configured in such a way that a switching signal (PWM signal) is applied to the threshold line during operation.

6. Device according to any one of the preceding items, wherein a first terminal of the LED is connected to the first potential terminal; and wherein the dual-gate transistor, with its current conducting contacts, is disposed between a second terminal of the LED and the second potential terminal; and the charge storage, is connected to the second control gate of the dual-gate transistor and to the second terminal of the optoelectronic device.

7. Device according to any one of the preceding items, wherein. the first terminal of the LED is connected to a second current line contact of the dual gate transistor and the second terminal thereof is connected to the second potential terminal;
 - the dual gate transistor is arranged with its current conducting contacts between a first terminal of the LED and the first potential terminal;
 - the charge storage is connected to the second control gate of the dual-gate transistor as well as to the first potential terminal.

8. Device according to any one of the preceding items, wherein.
 - the first terminal of the LED is connected to the first potential terminal;
 - the dual gate transistor is arranged with its current conducting contacts between a second terminal of the LED and the second potential terminal;
 - the charge storage is connected to the second control gate of the dual gate transistor as well as to the second potential terminal.

9. Device according to any of the preceding items, in which the selection hold circuit comprises a further control transistor which is connected in parallel with the LED and whose control terminal is connected to the selection signal line.

10. Device according to item 9, with
 - in which the dual-gate transistor is formed only as a transistor with a gate providing the second control gate.

11. Device according to any one of the preceding items, wherein.
 - the charge storage is connected to the second control gate of the dual-gate transistor and to the first potential terminal, and further comprising:
 - a temperature compensation circuit having a negative feedback based on the detection of a forward voltage by the LED, wherein the temperature compensation circuit is configured to output a signal on the threshold line.

12. Device according to item 11, in which
 - the temperature compensation circuit comprises a control path arranged in parallel with the dual-gate transistor and having two paths connected in series.

13. Device according to item 11, in which
 - from a node between the two controlled paths provided by means of a third control transistor and a fourth control transistor, the threshold line is connected to the first control gate of the dual-gate transistor.

14. Device according to item 13, in which
 - the control terminal of the fourth control transistor is connected to the second potential terminal.

15. Device according to any one of items 11 to 14, in which the temperature compensation circuit comprises a second charge storage connected to a control terminal of a control transistor providing one of the two paths and to the first potential terminal.

16. Device according to item 15, in which
 - a second data signal line is configured for programming a negative feedback factor coupled to the second charge storage device and the third control transistor.

17. Device according to item 16, in which
 - the coupling is created via a fifth control transistor controlled by means of a second selection signal line.

18. Device according to any one of items 11 to 14, in which the temperature compensation circuit is connected to the second potential terminal via its third control transistor.

19. Device according to any one of items 11 to 14, in which
 - a fifth control transistor is connected in parallel to the LED, at whose control terminal a switching signal (PWM signal) is applied during operation.

20. Device according to any of the preceding items, in which the transistors are field-effect transistors using NMOS technology.

21. Method for operating a device according to one of the previous items, wherein an analog data drive signal for color control of the LED is applied to the LED via the selection hold circuit by means of the selection signal, and brightness control of the LED is effected by means of a coupled-in pulse width modulation signal.

22. Driver circuit for driving a plurality of optoelectronic elements, comprising:
 - a plurality of first memory cells each comprising a set input, a reset input, and an output,
 - wherein each first memory cell is triggered to a first state at the output by a set signal at the set input and holds the first state until reset to a second state at the reset input, and
 - wherein the output of each first memory cell is configured to control a respective one of the optoelectronic elements.

23. Driver circuit according to item 22, wherein each first memory cell provides a pulse width modulation, PWM, signal at the output, and the PWM signal controls a switch configured to turn on and off a current through the respective optoelectronic element.

24. Driver circuit according to any of the preceding items, wherein each first memory cell comprises two cross-coupled NOR gates or two cross-coupled NAND gates.

25. Driver circuit according to any one of the preceding items, wherein each first memory cell comprises an NMOS transistor and a PMOS transistor connected in series, and an inverter having an input connected between the NMOS transistor and the PMOS transistor and an output connected to the gates of the NMOS and PMOS transistors.

26. Driver circuit according to any one of the preceding items, further comprising a plurality of counters each configured to activate a set signal when a data value is loaded into the respective counter and to activate a reset signal when the respective counter reaches the loaded data value.

27. Driver circuit according to any of the preceding items, further comprising a common counter configured to generate a common dimming signal for the plurality of optoelectronic elements.

28. Driver circuit according to any one of the preceding items, further comprising a plurality of second memory cells, each second memory cell coupled to a respective one of the first memory cells and configured to override an output signal of the respective first memory cell when necessary to cause the respective optoelectronic element to be turned off.

29. Optoelectronic device comprising:
- a variety of optoelectronic elements, and
- a driver circuit for driving the plurality of optoelectronic elements according to any one of the preceding items.

30. Method of operating an optoelectronic device according to item 29, comprising the following steps performed in the specified order during a frame:
- switch off all optoelectronic elements;
- controlling the optoelectronic elements that go dark during framing by means of the second memory cells; and
- controlling the current through the optoelectronic elements by means of the first memory cells.

31. The method of item 30, wherein a common dimming of the optoelectronic elements is performed before the current through the optoelectronic elements is controlled by means of the first memory cells.

32. Control circuit for adjusting a brightness of at least one LED, comprising a current driver element with
- a control terminal whose first terminal is connected to a first potential;
- a charge storage connected between the control terminal and the first potential and forming a capacitive voltage divider with a defined capacitance between the control terminal and the first terminal;
- a control element configured to apply a control signal to the control terminal during a first time period, based on which a current flowing through the at least one LED is adjustable during the first time period;
- wherein during a second time period subsequent to the first time period, a current flowing through the LED is determined by a reduced control signal formed by the control signal during the first time period and the capacitive voltage divider; and the control element is arranged to provide a first or a second control signal during the first time period to operate the LED at at least two different brightness levels.

33. Control circuit according to item 32, wherein the current driver element comprises a field effect transistor whose gate forms the control terminal and the defined capacitance is a gate-source capacitance predetermined by design.

34. Control circuit according to any one of the preceding items, wherein the reduced control signal applied to the control terminal during the second time period is derived from the control signal during the first time period and the ratio of a capacitance of the charge storage and the sum of the capacitance of the charge storage and the defined capacitance.

35. Control circuit according to one of the preceding items, characterized in that the control element is arranged to operate the first and second time periods at a repetition frequency of 60 Hz or more.

36. Control circuit according to any one of the preceding items, wherein the control element comprises a control transistor, at the control terminal of which the first and second time periods are adjustable by means of a signal.

37. Control circuit according to any one of the preceding items, wherein a ratio of the second time period to the first time period is in the range of 300:1 to 100:1, in particular in the range of 100:1.

38. Control circuit according to any one of the preceding items, configured to operate the LED at a first, darker brightness level when a voltage of the first control signal is within a first voltage interval, and to operate the LED at at least a second, brighter brightness level when a voltage of the second control signal is within a second voltage interval that is at least partially above the first voltage interval.

39. Control circuit according to item 38, characterized in that the first voltage interval is in the range of 1.3 V to 4.5 V.

40. Control circuit according to item 38 or 39, characterized in that said second voltage interval is in the range of 4.0 V to 10.0 V.

41. Method of adjusting a brightness of at least one LED connected to a current driving element having a control terminal, a first terminal of which is connected to a first potential and in which a charge storage device is connected between the control terminal and the first potential so as to form a capacitive voltage divider with a defined capacitance between the control terminal and the first terminal, comprising the steps:
- applying a control signal to the control terminal during a first time period, thereby adjusting a current flowing through the at least one LED during the first time period; and
- turning off the control signal during a second time period subsequent to the first time period, whereby the current flowing through the LED is adjusted by a reduced control signal formed by the control signal during the first time period and the capacitive voltage divider.

42. Method of item 41, wherein the reduced control signal applied to the control terminal during the second time period is derived from the control signal during the first time period from the ratio of a capacitance of the charge storage device and the sum of the capacitance of the charge storage device and the defined capacitance 43. Method according to any one of the preceding items, wherein a ratio of the second time period to the first time period is in the range of 300:1 to 100:1, in particular in the range of 100:1.

44. Method according to any one of the preceding items, wherein the LED is operated at a first, darker brightness level when a voltage of the first control signal is within a first voltage interval, and the LED is operated at at least a second, brighter brightness level when a voltage of second control signal is within a second voltage interval that is at least partially above the first voltage interval.

45. Method according to any one of the preceding items, wherein the control signal is derived from a digital control word having a number n of bits, the n bits corresponding to the second control signal and the least significant m bits corresponding to the first control signal.

46. Use of a control circuit according to any one of the preceding items for driving an LED, LED array, or LED module according to any one of the preceding objects.

47. Supply circuit, comprising:

an error correction detector with a reference signal input, an error signal input and a correction signal output;

a controllable current source having a current output and a control signal terminal, the control signal terminal being connected to the correction signal output to form a control loop for the controllable current source, wherein the current source is adapted to provide a current at the current output in response to a signal at the control signal terminal;

a substitute source having an output and being adapted to provide a substitute signal;

a switching device which is designed to supply, as a function of a switching signal, either a signal derived from the current at the current output or the substitute signal to the error signal input with additional isolation of the current output from the current source.

48. Supply circuit according to item 47, wherein the equivalent signal is substantially the same as the signal derived from the current signal.

49. Supply circuit according to any one of the preceding items, wherein the controllable current source comprises a current mirror having a switchable output branch connected to the current output.

50. Supply circuit according to item 49, in which the output branch comprises an output transistor, the control terminal of which is connected via the switching device in dependence on a switching signal to a fixed potential for opening the transistor.

51. Supply circuit according to any of the preceding items, wherein the controllable current source comprises an input branch to which a reference current can be supplied and which has a node connected to the reference signal input of the error correction detector.

52. Supply circuit according to any one of the preceding items, wherein the controllable current source comprises a current mirror, the control signal terminal being connected to the control terminal of an output transistor of the current mirror.

53. Supply circuit according to any one of the preceding items, wherein the error correction detector comprises a differential amplifier whose two branches are connected together to a supply potential via a current mirror.

54. Supply circuit according to item 53, in which the two branches of the differential amplifier each comprise an input transistor, which comprise different geometrical parameters.

55. Supply circuit according to any one of the preceding items, wherein the substitute source comprises a voltage generating element coupled to the output such that the backup signal substantially corresponds to the signal derived from the current signal.

56. Supply circuit according to any one of the preceding items, wherein the substitute source comprises a series circuit of a current providing element and a voltage providing element, the output being disposed between the two elements.

57. Supply circuit according to any one of the preceding items, wherein the substitute source comprises a transistor having its control terminal connected to the control terminal of the current mirror transistor of the current source.

58. Supply circuit according to any one of the preceding items, wherein the switching device comprises one or more transmission gates.

59. Supply circuit according to any one of the preceding items, comprising a reference current mirror adapted to supply a current defined on the input side to the error correction detector and to the current source on the output side.

60. Method of powering an LED, comprising:

Detecting a supply current through the LED;

Comparing the supply current with a reference signal and deriving a correction signal from the comparison Changing the supply current in response to the correction signal to control the supply current to a reference point;

Switching off a supply current through the LED and simultaneously supplying a substitute signal for the comparison step.

61 Method of item 60, wherein the substitute signal substantially corresponds to a supply current through the LED or a signal derived therefrom.

62. Use of a supply circuit according to any one of the preceding items for supplying an LED or LED arrangement, in particular according to any one of the preceding objects, which is operated by a signal modulating the power supply pulse-width.

63. Control circuit for a display matrix comprising a plurality of light-emitting devices arranged in rows and columns, comprising:

a row selection input for a row selection signal and a column data input for a data signal;

a ramp signal input for a ramp signal having a level between a first value and a second value and a trigger input for a trigger signal;

a column data buffer configured to buffer the data signal in response to the row select signal;

a pulse generator coupled to the column data buffer and the ramp signal input and configured to provide a buffered output signal to control the on/off ratio of at least one of the plurality of light emitting devices in response to the trigger signal, the data signal, and the ramp signal.

64. Control circuit according to item 63, wherein the pulse generator comprises.

a comparator device to compare the buffered data signal with the ramp signal; and an output buffer coupled to an output of the comparator device and the trigger input.

65. Control circuit according to item 64, wherein the output buffer comprises a flip-flop, in particular an RS flip-flop with its input coupled to the output of the comparator device and the trigger input, respectively.

66. Control circuit according to any one of items 63 to 65, wherein the column data buffer comprises a capacitor to store the data signal and a switch disposed between the capacitor and the column data input.

67. The control circuit of any one of items 63 to 66, wherein the comparator device comprises a power control input coupled to the trigger input to adjust its power consumption based on the trigger signal.

68. Control circuit according to any one of items 63 to 67, wherein the comparator device is coupled to the output buffer to control its power consumption based on an output state of the output buffer.

69. Control circuit according to any one of items 63 to 68, wherein the comparator is coupled to the data column buffer with its inverting input and coupled to the ramp signal input with its non-inverting input.

70. Control circuit according to any one of items 63 to 68, further comprising:

a ramp generator to provide the ramp signal to the ramp signal input, the ramp generator configured to generate a signal varying between an initial value and a final value in response to the trigger signal.

71. Method of controlling the illuminance of a light emitting device in a matrix display having a plurality of light emitting devices arranged in addressable rows and columns, the method comprising:

Providing a data signal for a selected row and at least one light emitting device;

Supplying a trigger signal;

converting a level of the data signal to a pulse with respect to a trigger signal; and Control of the on/off ratio of the light emitting device with the pulse.

72. Method of item 71, wherein the step comprises converting a level of the data signal:

Generating a ramp signal between a first value and a second value;

Comparing the data signal with the ramp signal to generate a comparison signal;

Generating of a pulse based on the trigger signal and a change in the comparison signal.

73. Method of item 71, wherein generating a pulse comprises setting a level of an output signal to a first value in response to a trigger signal and resetting the level of the output signal to a second value in response to the change in the comparison signal.

74. Method of item 72 or 73, wherein the ramp signal is generated in response to the trigger signal.

75. Method according to any one of items 71 to 74, wherein supplying a data signal comprises pre-buffering the data signal, in particular pre-buffering the data signal in a storage device.

76. Device for electronic control of a plurality of LEDs, comprising a first and at least one second branch, each having an LED connected therein and an electronic fuse arranged in series with the LED, the first and the at least one second branch having one side connected to a potential connection;

a driver circuit having a data signal input, a selection signal input, and a driver output connected to the other side of the first branch and the at least one second branch;

an imprint component associated with the at least one second branch, the imprint component being adapted to generate a current flow that triggers the series-arranged electronic fuse.

77. Device according to any of the preceding items, characterized in that the imprint component comprises an imprint transistor which is electrically connected with its current line contacts in parallel with the LED to which the imprint transistor is assigned and whose control contact is connected to an imprint signal line.

78. Device according to any of the preceding items, characterized in that the imprint component comprises an imprint diode having one terminal connected to a second terminal of the LED with which the imprint diode is associated and the other terminal connected to an imprint signal line.

79. Device according to any of the preceding items, characterized in that first terminals of the LED are connected to a reference potential terminal;

a first transistor is arranged with its current conducting contacts between a common terminal of the fuses of the LED and a supply potential terminal;

a charge storage device is electrically connected to a control contact of the first transistor and to a first current line contact of the first transistor.

80. Device according to any of the preceding items, characterized in that second terminals of the LED are connected to a supply potential terminal;

a first current line contact of a first transistor is connected to a reference potential terminal and a second current line contact of the first transistor is connected to a common terminal of the electrical fuses;

a charge storage device is connected to a control contact of the first transistor and to the first current line contact of the first transistor.

81. Device according to any of the preceding items, characterized in that second terminals of the LED are each connected to the fuse assigned to the LED;

a first current line contact of a first transistor is connected to a reference potential terminal and a second current line contact of the first transistor is connected to first terminals of the LED;

a charge storage device is connected to a control contact of the first transistor and to the first current line contact of the first transistor.

82. Device according to any of the preceding items, characterized in that first terminals of the LED are connected to a reference potential terminal;

a first transistor is arranged with its current conducting contacts between a common terminal of the fuses of the LED and a supply potential terminal;

the charge storage device is electrically connected to a control contact of the first transistor and to a second current line contact of the first transistor.

83. Device according to any of the preceding items, characterized in that first terminals of the LED are connected to a first reference potential terminal;

a first transistor is arranged with its current conducting contacts between a common terminal of the fuses of the LEDs and a supply potential terminal;

a charge storage device is electrically connected to a control contact of the first transistor and to a second current line contact of the first transistor, wherein a first terminal of the imprint diode is connected to a second terminal of the LED and a second terminal of the imprint diode is connected to the imprint signal line.

84. Device according to any of the preceding items, characterized in that first terminals of the LEDs are connected to a reference potential terminal;

a first transistor is arranged with its current conducting contacts between a common terminal of the fuses of the LEDs and a supply potential terminal;

a charge storage device is electrically connected to a control contact of the first transistor and to a second current line contact of the first transistor, wherein a second terminal of the imprint diode is connected to the second terminal of the LED and a first terminal of the imprint diode is connected to the imprint signal line.

85. Device according to one of the preceding items, characterized in that the driver circuit comprises said first transistor, a second transistor and said charge storage device, wherein said selection signal line is applied to a control contact of said second transistor and said data signal input is applied to a current line contact of said second transistor, and a first or a second current line contact of said first transistor provides said driver output which is connected to said LEDs of said first branch and a second branch to provide a power supply.

86. Display or display module comprising a plurality of the devices according to any one of the preceding items, wherein pixel cells of the display are each electrically connected along a row and/or along a column to a common imprint signal line, and each pixel cell of a column is electrically connected to the supply potential connection by means of a common supply line to a switching transistor arranged on a common carrier outside the display.

87. Method of electronically configuring a plurality of LEDs according to any one of the preceding items, comprising the steps of:

testing a function of the LED of each of the first branch and the second branch;

if there is no error in the LED in the first and in the second branch:

applying an imprint signal to the electronic imprint component;

imprinting in the second branch of a current flow triggering the fuse connected in series with the LED of the second branch.

88. Display arrangement with a display having a plurality of pixels arranged in rows and columns, comprising:

a first substrate structure with LEDs arranged therein or applied thereto, which form the pixel structure arranged in rows and columns, wherein the LEDs are individually controllable; and a plurality of contacts are arranged on the surface of the first substrate structure opposite to a light emission direction;

a second substrate structure comprising on a surface a plurality of contacts corresponding to the contacts of the first substrate structure and having a plurality of digital circuits for addressing the optoelectronic devices;

wherein the first and second substrate structures are interconnected and the plurality of contacts are electrically connected to the corresponding contacts; and wherein the first substrate structure is formed with a first material system and the second substrate structure is formed with a second material system different therefrom.

89. Arrangement according to item 88, wherein the first material system comprises at least one of the following compounds: GaN, GaP, GaInP, InAlP, GaAlP or GaAlInP, GaAs, AlGaAs, and the second material system comprises at least one of the following material systems: single crystal, polycrystalline, amorphous silicon, indium gallium zinc oxide, GaN, or GaAs.

90. Arrangement according to any of the preceding items, in which the first carrier structure comprises a plurality of switchable current sources, each of which is connected to a pixel for supplying it, and whose switching inputs are coupled to the contacts for supplying switching signals from the digital circuits.

91. Arrangement according to item 90, wherein the switchable current sources are arranged in a material system that is different from the material system used for the LEDs or from the first material system.

92. Arrangement according to any one of the preceding items, wherein the plurality of digital circuits of the second substrate structure is adapted to generate a PWM-like signal from a clock signal and a data word for each pixel.

93. Arrangement according to item 92, wherein the plurality of digital circuits, comprises a number of shift registers connected in series, each shift register having a length corresponding to the data word for a pixel, each shift register being connected to a buffer for buffering.

94. Arrangement according to any of the preceding items, wherein the plurality of digital circuits comprise a multiplexer electrically coupled to a demultiplexer in the first substrate structure for driving a plurality of optoelectronic devices.

The invention claimed is:

1. A supply circuit, comprising:

an error correction detector with a reference signal input, an error signal input and a correction signal output, the error correction detector configured to provide a correction signal at the correction signal output in response to a reference signal at the reference signal input and a signal at the error signal input;

a controllable current source having a current output and a control signal terminal, the control signal terminal being connected to the correction signal output to form a control loop for the controllable current source, wherein the controllable current source is adapted to provide a current at the current output in response to a signal at the control signal terminal;

a substitute source having an output and being adapted to provide a substitute signal; and a switching device which is configured to supply, as a function of a switching signal, either a signal derived from the current at the current output or the substitute signal to the error signal input with additional isolation of the current output from the controllable current source, wherein the switching device includes a first input terminal coupled to the current output of the controllable current source, a second input terminal coupled to the output of the substitute source, and an output terminal coupled to the error signal input of the error correction detector.

2. The supply circuit according to claim 1, wherein the substitute signal is substantially a same signal as the signal derived from the current at the current output.

3. The supply circuit according to claim 1, wherein the controllable current source comprises a current mirror having a switchable output branch connected to the current output.

4. The supply circuit according to claim 3, in which the switchable output branch comprises an output transistor, the control signal terminal of which is connected via the switching device in dependence on the switching signal to a fixed potential for opening the output transistor.

5. The supply circuit according to claim 1, wherein the controllable current source comprises an input branch to which a reference current can be supplied and which has a node connected to the reference signal input of the error correction detector.

6. The supply circuit according to claim 1, wherein the controllable current source comprises a current mirror, the control signal terminal being connected to a control terminal of an output transistor of the current mirror.

7. The supply circuit according to claim 1, wherein the error correction detector comprises a differential amplifier having two branches connected together to a supply potential via a current mirror.

8. The supply circuit according to claim 7, in which the two branches of the differential amplifier each comprise an input transistor, which comprise different geometrical parameters.

9. The supply circuit according to claim 1, wherein the substitute source comprises a voltage generating element coupled to the output such that a backup signal substantially corresponds to the signal derived from the current at the current output.

10. The supply circuit according to claim 1, wherein the substitute source comprises a series circuit of a current providing element and a voltage providing element, the output being disposed between the current providing element and the voltage providing element.

11. The supply circuit according to claim 1, wherein the substitute source comprises a transistor having its control terminal connected to a control terminal of a current mirror transistor of the controllable current source.

12. The supply circuit according to claim 1, wherein the switching device comprises one or more transmission gates.

13. The supply circuit according to claim 1, comprising a reference current mirror adapted to supply a current defined on an input side to the error correction detector and to the controllable current source on an output side.

14. A method of using the supply circuit according to claim 1 for supplying an LED or LED arrangement, which is operated by a signal modulating a power supply pulse-width.

15. A method of powering an LED, comprising:

detecting a supply current through the LED;

switching a switch to connect an output terminal to a first input terminal coupled to a current output associated with the supply current or a second input terminal coupled to a substitute output;

comparing, in response to the switch connecting the output terminal to the first input terminal, the supply current with a reference signal and deriving a correction signal from the comparing, wherein an error correction detector is configured to derive the correction signal at a correction signal output in response to the reference signal at a reference signal input and a signal at an error signal input;

changing the supply current in response to the correction signal to control the supply current to a reference point; and switching off the supply current through the LED and simultaneously supplying a substitute signal for the comparing by switching the switch to connect the output terminal to the second input terminal.

16. The method of claim 15, wherein the substitute signal substantially corresponds to the supply current through the LED or a signal derived therefrom.

* * * * *